US011093972B1

(12) United States Patent
Tietzen et al.

(10) Patent No.: US 11,093,972 B1
(45) Date of Patent: Aug. 17, 2021

(54) LINKING A TRANSACTION BETWEEN A MERCHANT AND A RESIDENT OF THE SAME VICINITY TO THE RESIDENT VIEWING THE MERCHANT BROADCAST ADVERTISEMENT

(71) Applicant: EDATANETWORKS INC., Calgary (CA)

(72) Inventors: Terrance Patrick Tietzen, Edmonton (CA); Matthew Arnold Macpherson Bates, Beaumont (CA)

(73) Assignee: EDATANETWORKS INC, Edmonton (CA)

( * ) Notice: Subject to any disclaimer, the term of this patent is extended or adjusted under 35 U.S.C. 154(b) by 0 days.

(21) Appl. No.: 16/355,162

(22) Filed: Mar. 15, 2019

Related U.S. Application Data

(60) Provisional application No. 62/644,569, filed on Mar. 18, 2018.

(51) Int. Cl.
*G06Q 30/02* (2012.01)
*H04N 21/81* (2011.01)
(Continued)

(52) U.S. Cl.
CPC ... *G06Q 30/0261* (2013.01); *H04N 21/25841* (2013.01); *H04N 21/2668* (2013.01); *H04N 21/41407* (2013.01); *H04N 21/812* (2013.01)

(58) Field of Classification Search
CPC ....................................... G06Q 30/0207–0277
See application file for complete search history.

(56) References Cited

U.S. PATENT DOCUMENTS 7,289,964 B1 * 10/2007 Bowman-Amuah ........................ G06F 9/5038
705/1.1
2003/0018969 A1 * 1/2003 Humpieman ...... G06Q 30/0239
725/34

(Continued)

FOREIGN PATENT DOCUMENTS

WO  WO 2000/062231 A9 *  6/2002  ............. G06F 17/60
WO  WO 2003/053056 A1 *  6/2003  ............... H04N 5/00
WO  WO 2010/009341 A3 *  5/2010  ............. G06Q 20/12

*Primary Examiner* — David J Stoltenberg
(74) *Attorney, Agent, or Firm* — Desandro Law Group PLLC; Bradley K. DeSandro

(57) ABSTRACT

Systems, data access management utilities, and methods generate links between local merchants and community programs, whereby the merchant may provide incentives to customers in relation to community programs. The implementations may track community programs, as well as online and offline customer transactions with merchants that make use of the incentive. Implementations may include as participants, customers, merchants, community organizations, intermediaries, and other groups or individuals. Participants may have participant identifiers, which may be linked to a payment source. Data may be collected about all participants, either expressly, or from offline or online transactions between merchants and customers utilizing a participant identifier, and the data may be stored in a data storage area. All data in the data storage area may be utilized by a logic tool, which may provide information, such as details of customers that view a broadcast of content that is interleaved with a merchant's advertisement and analytic reporting. Matches between transactions with a merchant and a customer that view a broadcast of content that is interleaved with the merchant's advertisement may be identified by the system, and a level of certainty that the match is accurate may be determined.

19 Claims, 14 Drawing Sheets

(51) Int. Cl.
*H04N 21/414* (2011.01)
*H04N 21/2668* (2011.01)
*H04N 21/258* (2011.01)

(56) References Cited

U.S. PATENT DOCUMENTS

| | | | | |
|---|---|---|---|---|
| 2003/0026404 A1* | 2/2003 | Joyce | G06Q 20/32 | 379/144.01 |
| 2004/0107136 A1* | 6/2004 | Nemirofsky | G06Q 30/06 | 705/14.36 |
| 2005/0260973 A1* | 11/2005 | van de Groenendaal | H04M 1/67 | 455/411 |
| 2007/0192784 A1* | 8/2007 | Postrel | G06Q 30/0224 | 725/23 |
| 2008/0205392 A1* | 8/2008 | Danzeisen | H04W 88/06 | 370/389 |
| 2009/0006533 A1* | 1/2009 | Guo | H04L 12/1818 | 709/203 |
| 2009/0165051 A1* | 6/2009 | Armaly | H04N 21/4316 | 725/40 |
| 2009/0265236 A1* | 10/2009 | Schultz | G06F 16/245 | 705/14.53 |
| 2010/0010887 A1* | 1/2010 | Karlin | G06Q 30/0213 | 705/14.15 |
| 2010/0030567 A1* | 2/2010 | Zalewski | G06Q 30/02 | 705/1.1 |
| 2010/0222026 A1* | 9/2010 | Dragt | H04L 51/18 | 455/412.1 |
| 2010/0312842 A1* | 12/2010 | Ladouceur | G06Q 10/10 | 709/206 |
| 2012/0079086 A1* | 3/2012 | Miettinen | H04L 51/00 | 709/222 |
| 2012/0124608 A1* | 5/2012 | Postrel | G06Q 30/0215 | 725/23 |
| 2012/0221404 A1* | 8/2012 | Ahmed | G06Q 30/0261 | 705/14.39 |
| 2012/0281673 A1* | 11/2012 | Nix | H04L 29/12528 | 370/331 |
| 2013/0024901 A1* | 1/2013 | Sharif-Ahmadi | H04N 21/4263 | 725/114 |
| 2013/0091212 A1* | 4/2013 | Rajakarunanayake | G06Q 50/01 | 709/204 |
| 2013/0091214 A1* | 4/2013 | Kellerman | G06Q 10/00 | 709/204 |
| 2013/0111520 A1* | 5/2013 | Lo | H04W 76/40 | 725/35 |
| 2013/0204717 A1* | 8/2013 | Bookstaff | G06Q 10/00 | 705/14.73 |
| 2014/0032292 A1* | 1/2014 | Donlan | G06Q 30/0213 | 705/14.17 |
| 2014/0032294 A1* | 1/2014 | Donlan | G06Q 30/0224 | 705/14.17 |
| 2014/0073288 A1* | 3/2014 | Velasco | H04W 12/06 | 455/411 |
| 2014/0156410 A1* | 6/2014 | Wuersch | G06Q 30/0261 | 705/14.58 |
| 2014/0165091 A1* | 6/2014 | Abhyanker | G06Q 50/01 | 725/27 |
| 2014/0200036 A1* | 7/2014 | Egner | H04W 64/00 | 455/456.3 |
| 2014/0257962 A1* | 9/2014 | Franzetti | G06Q 30/0226 | 705/14.31 |
| 2014/0337173 A1* | 11/2014 | Hardie | G06Q 20/3224 | 705/26.41 |
| 2015/0007213 A1* | 1/2015 | Donoghue | H04N 21/4755 | 725/21 |
| 2015/0026708 A1* | 1/2015 | Ahmed | H04N 21/44218 | 725/12 |
| 2015/0119035 A1* | 4/2015 | Ganu | H04W 36/00837 | 455/436 |
| 2015/0149277 A1* | 5/2015 | Mankoff | G06Q 30/0261 | 705/14.45 |
| 2015/0172408 A1* | 6/2015 | Sun | H04L 67/2838 | 709/223 |
| 2015/0186926 A1* | 7/2015 | Chittilappilly | G06Q 30/0243 | 705/14.42 |
| 2015/0269150 A1* | 9/2015 | Carper | H04W 4/021 | 707/724 |
| 2015/0302451 A1* | 10/2015 | Tietzen | G06Q 30/0222 | 705/14.25 |
| 2015/0317668 A1* | 11/2015 | Tietzen | G06Q 30/0276 | 705/14.39 |
| 2015/0326904 A1* | 11/2015 | Miyaki | G06Q 30/0601 | 725/23 |
| 2015/0334469 A1* | 11/2015 | Bhatia | H04N 21/251 | 725/32 |
| 2015/0339703 A1* | 11/2015 | Karlin | G06Q 30/0246 | 705/14.45 |
| 2015/0341226 A1* | 11/2015 | Griff | H04W 24/00 | 455/456.1 |
| 2016/0057732 A1* | 2/2016 | Li | H04W 36/08 | 370/331 |
| 2016/0076898 A1* | 3/2016 | Bitoun | G06Q 50/30 | 701/468 |
| 2016/0095152 A1* | 3/2016 | McDonnell | H04L 5/001 | 370/294 |
| 2016/0127802 A1* | 5/2016 | Carney | H04N 21/4438 | 725/14 |
| 2016/0162944 A1* | 6/2016 | Lawrence | G06Q 20/32 | 705/14.55 |
| 2016/0183060 A1* | 6/2016 | Seyde | G06Q 10/04 | 455/456.3 |
| 2016/0189315 A1* | 6/2016 | Anania | G06Q 50/01 | 705/319 |
| 2016/0205664 A1* | 7/2016 | Zhang | H04L 5/005 | 370/312 |
| 2016/0212626 A1* | 7/2016 | Simon | H04W 16/14 | |
| 2016/0219012 A1* | 7/2016 | Liao | H04L 51/20 | |
| 2016/0267541 A1* | 9/2016 | Breakey | G06Q 30/02 | |
| 2017/0064609 A1* | 3/2017 | Park | H04L 12/189 | |
| 2017/0109789 A1* | 4/2017 | Major | G06Q 30/0261 | |
| 2017/0201779 A1* | 7/2017 | Publicover | G06Q 30/0251 | |
| 2017/0300959 A9* | 10/2017 | Chittilappilly | G06Q 30/0246 | |
| 2017/0353827 A1* | 12/2017 | D'Alberto | H04W 4/02 | |
| 2018/0192242 A1* | 7/2018 | Lipman | H04W 4/021 | |
| 2018/0253746 A1* | 9/2018 | Tietzen | G06Q 30/0226 | |
| 2018/0357236 A1* | 12/2018 | Bundrage | G06F 16/487 | |
| 2019/0213630 A1* | 7/2019 | Mankoff | G06Q 30/0246 | |

* cited by examiner

LINKING A TRANSACTION BETWEEN A MERCHANT AND A RESIDENT OF THE SAME VICINITY TO THE RESIDENT VIEWING THE MERCHANT BROADCAST ADVERTISEMENT

CROSS REFERENCE TO RELATED APPLICATIONS

This application claims priority to US Provisional Application Ser. No. 62/644,569, filed on Mar. 18, 2018, titled "Linking a Transaction Between a Merchant and a Resident of the Same Vicinity to the Resident Viewing the Merchant Broadcast Advertisement", and is related to U.S. patent application Ser. No. 14/480,721, titled "Program, System and Method for Linking Community Programs and Merchants In A Marketing Program", filed on Sep. 14, 2014, to U.S. Pat. No. 12,944,474, titled "Program, system and method for linking community programs and merchants in a marketing program", filed on Nov. 11, 2010, now U.S. Pat. No. 9,111,295, to International Application PCT/CA2009/001605 filed Nov. 6, 2009, to U.S. patent application Ser. No. 15/001,014, titled "Next Generation Broadcast Platform Radio Frame Extensibility Broadcast/Unicast TDD In Intelligent Heterogeneous Networks", filed on Jan. 19, 2016, to U.S. patent application Ser. No. 15/679,739, titled "Band Segmented Bootstraps and Partitioned Frames", filed on Mar. 9, 2016, by the Applicant Sinclair Broadcast Group, Inc. of Hunt Valley, Md., to U.S. patent application Ser. No. 13/748,459, titled "Authorized Transaction Incented By Merchant Donation," filed on Jan. 23, 2013, and to U.S. patent application Ser. No. 11/746,502, titled "Method, System and Computer Program For Providing A Loyalty Engine For Dynamic Administration Of Charity Donations," filed on May 9, 2007, each of which is incorporated herein by reference.

FIELD

The implementations relate to linking customer transactions to broadcast merchant advertisements.

BACKGROUND

Broadcasters want to increase advertising revenue by broadcasting content that is interleaved with merchant advertisements. The advertising revenue from merchants would be likely to increase if the merchants were assured that their advertising content was broadcast so as to be viewed by potential customers who would be most likely to respond to the viewing of the advertisements by conducting transactions with the merchants. However, establishing the link between the merchant's advertising spend and resulting transactions with customers has been difficult to determine with a high degree of certainty.

To enable broadcasters to broadcast hyperlocal targeted advertisements over specific geographic areas, broadcasters use broadcast modes and duplex schemes through dynamic network topologies exploiting programmable (NFV/SDN) radio functions that can be activated, deactivated, and modified on demand depending on the specific needs of the service, and in response to consumer demand, using both licensed and unlicensed spectrum inside and outside the broadcast band. To so, technical contributions have been made to the emerging Advanced Television Systems Committee (ATSC) 3.0 standard. The ATSC 3.0 standard is based on a new Orthogonal frequency division multiplexing (OFDM) physical layer and IP as transport and an extensible OFDM framework. However, this emerging ATSC 3.0 standard is constrained to target traditional services. such as 4K UHDTV. as efficient use of spectrum.

While personalization of communication, including hyperlocal targeted advertisements, will lead to a reduced demand for legacy broadcast as is conventionally deployed, e.g. linear TV, there is a need for efficient distribution of information from one source to many destinations. There is also a need for these services to distribute content as is conventional (typically only downlink), but also to provide a feedback channel (uplink) for interactive services or acknowledgement information. Several broadcast-like use cases may be proposed for future 5G networks.

There is a need for a broadcast-like use case for TV Everywhere implementations, also known as authenticated streaming or authenticated video on-demand. In such TV Everywhere implementations, access to streaming video content from a television channel requires users to authenticate themselves as current subscribers to the channel, via an account provided by their participating pay television provider, in order to access the content. Under the TV Everywhere business model, broadcasters offer their customers the ability to access content broadcast on their channels through internet-based services and mobile apps executed by web-enabled mobile computing devices that function as a television receiver (e.g., smart phone, tablet, phablet, lap top, etc.)—either live or on-demand, as part of their subscription to the service. TV Everywhere provides the broadcast media consumer with the ability to receive a television broadcast everywhere in real time as an event occurs (e.g., live, near real time action in a football game or a soccer match). The broadcast media consumers that are located in a specific vicinity should simultaneously receive appropriate news and information regardless of the device they are using or their network connection. Also, local services are desirable that will be active at a cell level with a reach of, for example, 1 to 20 KM. Typical scenarios include services to broadcast advertisements that can be viewed only in a specific geographic area. There is also a need for broadcast-like services with a regional reach, for example, such as broadcast advertisements that can be viewed only within 1 to 100 KM. Unlike legacy broadcast services, there is a need for such broadcast-like services to provide of a feedback channel that can be used to track the delivery of the broadcast advertisements that were viewed to all or selected broadcast media consumers located in a specific vicinity (e.g., within 1 to 100 km), or to receive a survey result from a broadcast viewer who transacted with a merchant after viewing the merchant's broadcast advertisement. Thus, there is a need for improvements to existing television broadcast networks so that they are enabled for hyperlocal geo-targeting of advertisements to viewers located in a vicinity.

There is a need for systems and methods that enable a merchant having a brick and mortar store in a vicinity to measure the likelihood that a transaction with a resident of the vicinity was the result of the merchant's advertisement having been broadcast over a broadcast medium such as cable and/or satellite TV. There is a need for systems and methods that enable a merchant having a brick and mortar store in a vicinity to measure the likelihood that a transaction with a resident of the vicinity was the result of the merchant's advertisement having been broadcast over a broadcast medium such as cable and/or satellite TV, where the merchant's advertisement was broadcast over a television broadcast network enabled for hyperlocal geo-targeting of merchant's advertisements to viewers located in a vicinity.

SUMMARY

In one implementation, a merchant's advertisement is broadcast over a television broadcast network enabled for hyperlocal geo-targeting of the merchant's advertisements to viewers located in a vicinity by operating a broadcast method that has an extensible mode of communication in an intelligent heterogeneous network. This broadcast method includes the steps of: (i) using an extensibility tool to provide an extensible framing structure; (ii) combining a centralized radio access network topology with an intelligent IP core network to enable sharing of spectrum resources; (iii) providing a supplemental return channel to facilitate paging; (iv) gathering user data at the intelligent IP core network and enabling personalized services through paging based on the gathered user data, where the personalized services are further enabled based on geographical awareness or geographical location; and (v) providing a hyperlocal service based on geographical awareness via functionality enabled by the intelligent heterogeneous network.

In this implementation, there is provided a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, where one or more transactions occur between the one or more merchants and the one or more members; a transaction linking utility operable to process and analyze details of member viewing of broadcast merchant advertisements, the transaction details, and the data of the data collection server to determine the likelihood that one of the one or more transactions is the result of a broadcast using the aforementioned broadcast method through which there is broadcast the advertisements of the one or more merchants, where the advertisements are broadcast to so as to be geo-targeted for a hyperlocal viewing limited to viewers located in the vicinity; and a data mining tool operable to analyze by operation of the one or more computer processors the data collection server, the transaction details, and the data regarding the one or members and the one or more merchants, where the data mining tool is further operable to generate one or more incentives to increase the transactions, for example the number or value of the transactions, occurring between the one or more merchants and the one or more members.

In this respect, before explaining at least one implementation in detail, it is to be understood that the invention is not limited in its application to the details of construction and to the arrangements of the components set forth in the following description or illustrated in the drawings. The invention is capable of other implementations and of being practiced and carried out in various ways. Also, it is to be understood that the phraseology and terminology employed herein are for description and should not be regarded as limiting.

BRIEF DESCRIPTION OF THE DRAWINGS

The invention will be better understood, and objects of the invention will become apparent when consideration is given to the following detailed description thereof. Such description refers to the annexed drawings wherein.

Figure 1:
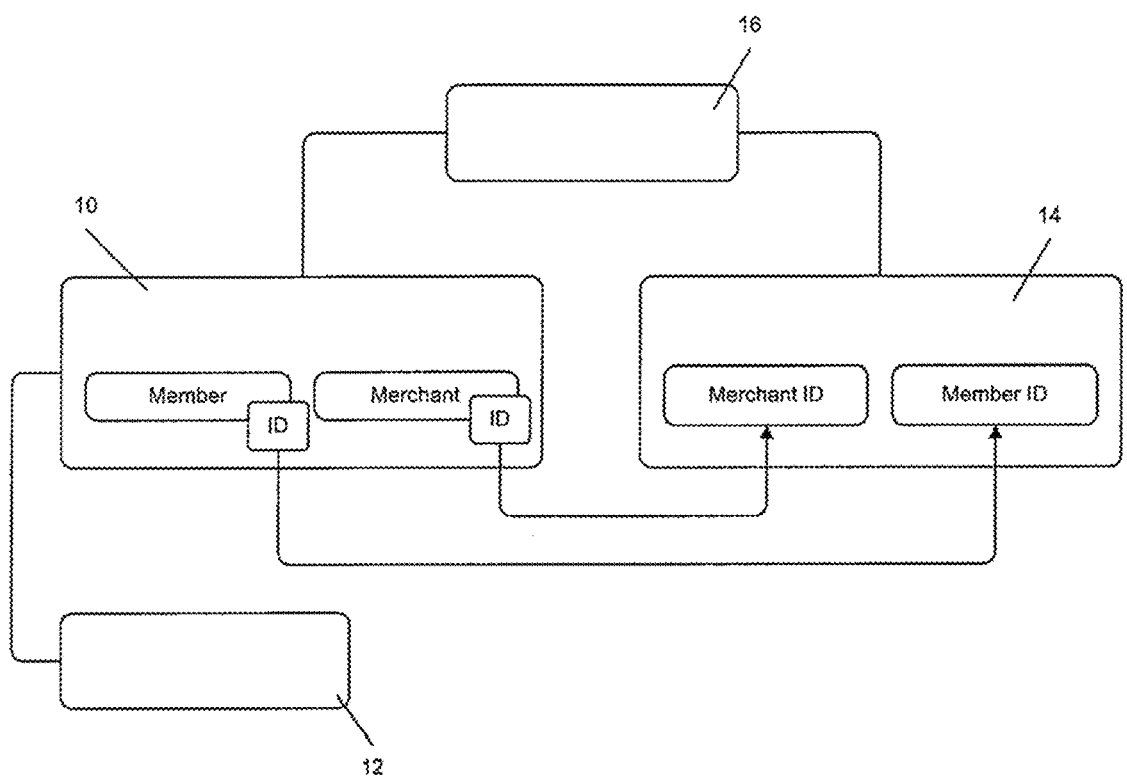
FIG. 1 is a systems view of a marketing program.

In the drawings, implementations of the invention are illustrated by way of example. It is to be expressly understood that the description and drawings are only for the purpose of illustration and as an aid to understanding, and are not intended as a definition of the limits of the invention.

DETAILED DESCRIPTION

In one implementation, a merchant's advertisement is broadcast over a television broadcast network enabled for hyperlocal geo-targeting of merchant's advertisements. The broadcast of these advertisements is received and rendered by each of a corresponding group of television receivers. Each such television receiver that can receive the hyperlocal geo-targeted merchant advertisement will preferably correspond to respective viewers located in a vicinity. The hyperlocal geo-targeted advertisement is accomplished, this implementation, by operating a broadcast method that has an extensible mode of communication in an intelligent heterogeneous network. In an alternative of this implementation, a Next Generation Broadcast Platform (NGBP) Intelligent Heterogeneous network broadcasts content that is interleaved with an advertisement corresponding to a merchant and addressed for broadcast delivery exclusively to a logical address of a television receiver determined to be within the same vicinity as the merchant, where the logical address is coordinated with the local broadcaster so that the television receiver is able to receive and render the hyperlocal geo-targeted advertisement.

Implementations of the Next Generation Broadcast Platform (NGBP) are enabled via the Advanced Television Systems Committee (ATSC) 3.0 standard. ATSC 3.0 is a version of the ATSC standards for television broadcasting created by the Advanced Television Systems Committee (ATSC). Its capabilities include hyperlocal targeted advertising (geotargeting). Stated otherwise, ATSC 3.0 allows advertisers to run targeted advertising. The targeted ads allow advertisers to track more directly viewer ratings, rather than indirectly by companies such as Nielsen ratings. Next Gen TV (ATSC 3.0) enables television broadcasters to collect data about consumer's viewing habits. That information gives broadcasters the ability to sell targeted advertising against their programming, to help broadcasters understand who is watching the programming, and from where. A used herein, geo-targeting refers to the practice of delivering different content or advertisements to a TV viewer based on his or her geographic location. Geo-targeting is an active response to Geo-location: Having identified the visitor's location according to the IP, and/or WiFi/GPS data (="geo-location"), content specific to that location is served (="geo-targeting").

In one alternative of this implementation, the broadcast method includes the steps of: (i) using an extensibility tool to provide an extensible framing structure; (ii) combining a centralized radio access network topology with an intelligent IP core network to enable sharing of spectrum resources; (iii) providing a supplemental return channel to facilitate paging; (iv) gathering user data at the intelligent IP core network and enabling personalized services through paging based on the gathered user data where the personalized services are further enabled based on geographical awareness or geographical location; and (v) providing a hyperlocal service based on geographical awareness via functionality enabled by the intelligent heterogeneous network.

In another alternative of this implementation, there is employed a Next Generation Broadcast Platform (NGBP) that uses Orthogonal Frequency Division Multiplexing (OFDM). Such an alternative of this implementation is disclosed by the Applicant Sinclair Broadcast Group, Inc. of Hunt Valley, Md. as set forth in: (i) U.S. patent application Ser. No. 15/001,014, titled "Next Generation Broadcast Platform Radio Frame Extensibility Broadcast/Unicast TDD In Intelligent Heterogeneous Networks"; and in part in (ii) U.S. patent application Ser. No. 15/679,739, titled "Band Segmented Bootstraps and Partitioned Frames", filed on Mar. 9, 2016, each of which, both collectively and individually being referred to hereinafter as the "Broadcast Technology".

Figure 12:
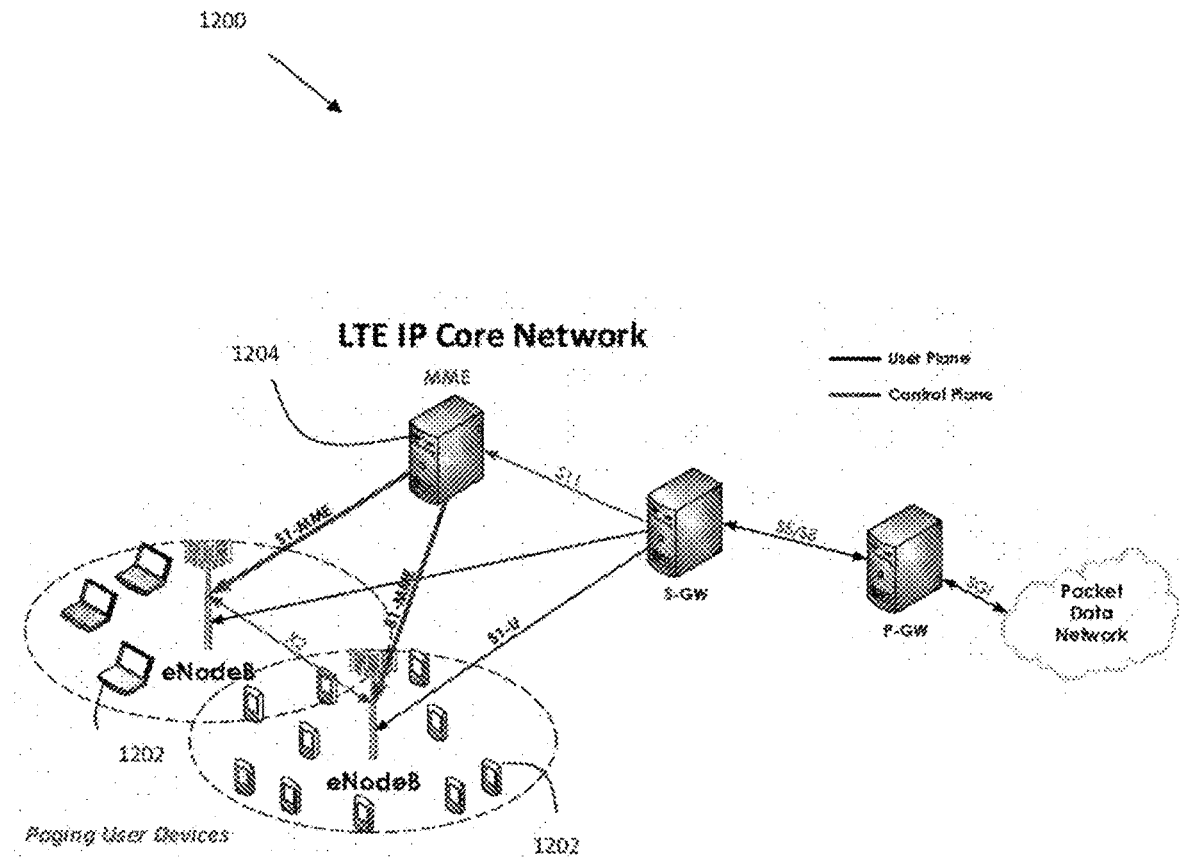
FIG. 12 illustrates an example Network using paging in the Advanced Long Term Evolution (LTE-A) standard.

Referring now to FIG. 12, an exemplary illustration is shown of an intelligent heterogeneous network 100. In particular, hyperlocal services 102, such as personal and geo-fenced merchant advertisements for example, are communicated via an intelligent heterogeneous network using Time Division Duplex (TDD) mode blended synergistically into a tall tower broadcast service 104.

Figure 13:
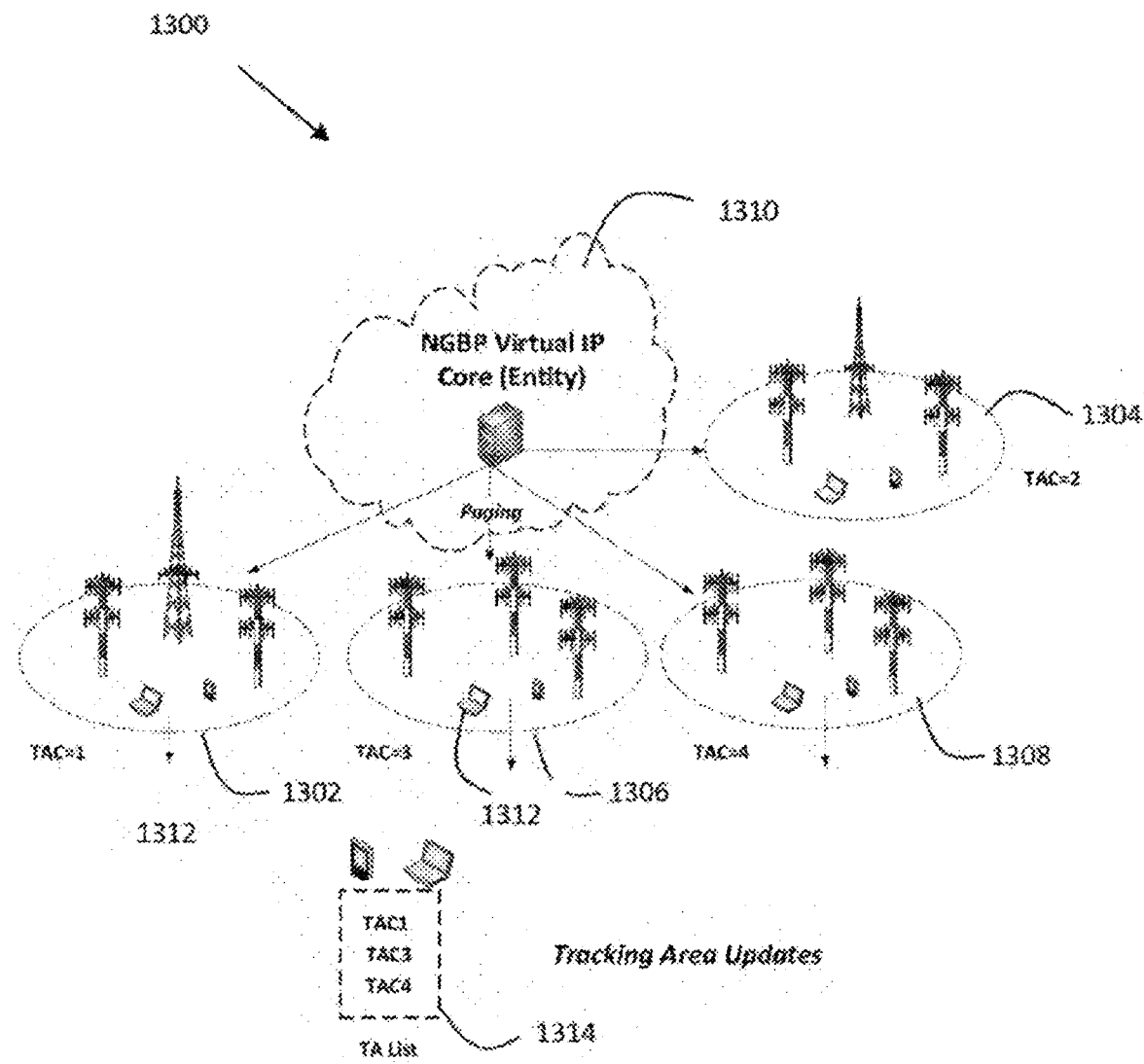
FIG. 13 illustrates an example Next Generation Broadcast Platform (NGBP) Intelligent Heterogeneous network.
Figure 14:
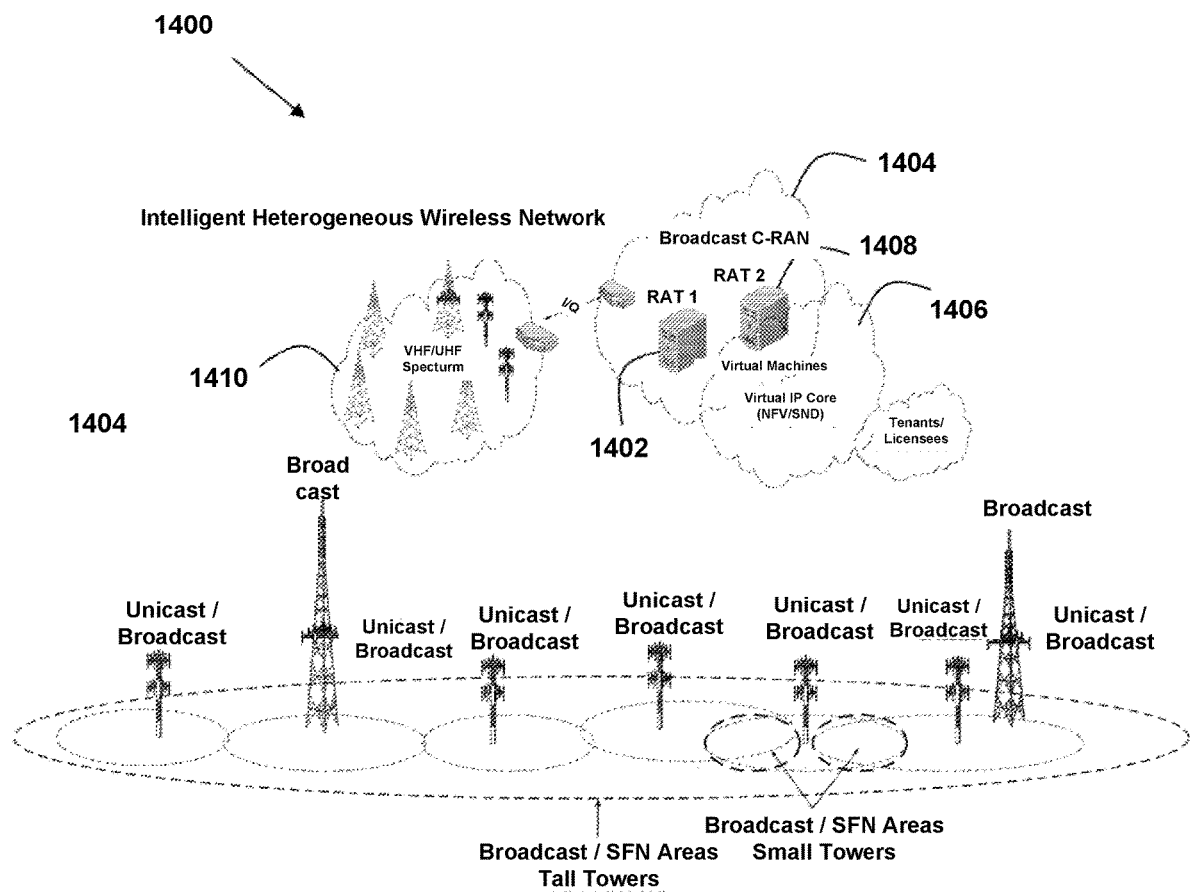
FIG. 14 illustrates an example NGBP Intelligent Heterogeneous network by which broadcast content is interleaved with an advertisement corresponding to a merchant and addressed for broadcast delivery exclusively to a logical address of a television receiver determined to be within the same vicinity as the merchant.

In a still further alternative of the exemplary NGBP implementation, such as is illustrated in FIGS. 12-14, there is employed a LTE Paging/Location Area Updates that enable personalization and geo-targeting in a hyperlocal service in NGBP. This enables more value to a broadcaster, in addition to just returning data via a return channel to the Intelligent IP Core in hyperlocal services and other use cases. Such an intelligent IP Core construct in the broadcast architecture enables richer meta data collection on consumers (IP Core) than possible on public Wi-Fi, and can enable broadcast-like use cases.

FIG. 12 is an exemplary illustration of a Network 1200 using paging in LTE-A. In LTE paging, a message originates from an MME entity or an IP core 1204 to notify a terminal 1202 about incoming connection requests. This paging mechanism forms the genesis for an implementation of the NGBP to geo-targeted a merchant's advertisement that is broadcast over a television broadcast network that has been enabled for hyperlocal geo-targeting of merchant's advertisements to viewers located in a vicinity by operating a broadcast method that has an extensible mode of communication in an intelligent heterogeneous network. In this alternative implementation, by using paging on the schedule controlled by a broadcaster, the location of a customer will reside in the IP Core database along with other data specific to a registered user Referring now to FIG. 13, an exemplary illustration is shown of an example Network NGBP Intelligent Heterogeneous network 1300. In this embodiment, a data terminal 1312 is located in Tracking Area (TA) 1306. It should be appreciated that Tracking Areas 1302, 1304, 1306, and 1308 are planned by broadcasters. Next, the entity in NGBP IP Core network 1310, which is responsible for paging, considers that the Terminal 1312 is located in, say, TA 1306. When the network 1300 sends a wake-up signal to signify data is on the way, it sends a paging message to terminal 1312 in TA3 1306 via IP Core entity 1310 as shown. Data terminal 1312, which is in idle state, wakes up at certain periods, which may be defined by Broadcasters, in one example, to check for a paging message to see if there is any incoming data. If data terminal 1312 finds it has been paged by NGBP IP Core network 1310, it turns back to active state to receive the data. Otherwise, data terminal 1312 conserves energy usage in the idle mode.

As illustrated in FIG. 13, the NGBP network 1310 has updated location information about data terminals 1312 in the idle state to find out in which of TA 1302, 1304, 1306, and 1308 a particular data terminal 1312 is located. For this, the protocol is for the data terminal 1312 to notify the NGBP network 1310 of its current location by sending a TAU message every time it moves between defined Tracking Areas 1302, 1304, 1306, and 1308. The data terminal 1312 also maintains an active Tracking Area List 1314.

Referring now to FIG. 14, an exemplary illustration is shown of an example Intelligent Heterogeneous Wireless Network (NFV/SDN) 1400 for terrestrial broadcast topologies. The network 1400 is designed for "Service" and not just "Coverage", where the blending of terrestrial off-air and Internet-delivered video and media leveraging is enabled for both wireless and wireline (heterogeneous) networks. As such, TV Everywhere can be accommodated by network 1400.

TV service Everywhere implementations include "hyperlocal" implementations to enhance news and other programming by including within broadcasts the broadcast of a merchant's advertisement. In particular, the merchant's advertisement is broadcast over a television broadcast network that is enabled for hyperlocal geo-targeting of the merchant's advertisements to viewers located in a vicinity. The hyperlocal geo-targeting of the merchant's advertisements is accomplished by operating a broadcast method that has an extensible mode of communication in an intelligent heterogeneous network. Such Next Generation Broadcast Platform (NGBP) implementations advantageously allow broadcasters to increase advertising revenue by including local targeting down to a particular vicinity, such as at a neighborhood level. If a viewer residing in the neighborhood provides a personal profile that includes personal preferences, for example, and this is known in the IP Core network, then geo-targeted hyperlocal advertisements of merchants located in the neighborhood can be directed to the viewer directly to match the viewer's personal preferences. With the benefit of each viewer's personal preferences, a local TV station can enable a TV show that is being broadcast to include a merchant's advertisement so that it will be viewed by some, but not all, viewers that are located in the same vicinity, even though the viewers are watching the same broadcast content (e.g., the same TV show).

A still further implementation involves the use of the physical resources of the Intelligent Heterogeneous Wireless Network abstracted and under centralized NFV/SDN software control and orchestration and using, in part, the extensible tools described the Broadcast Technology. The Broadcast Technology enables a broadcast optimized network with supplemental unicast added to deliver the TV Everywhere experience regardless of the device and in specific geographic areas. As such, with the Intelligent Heterogeneous Wireless Network, hyperlocal or local services targeting specific geographic areas for entertainment are enabled so as to include the broadcast of a merchant's advertisement over a television broadcast network that is enabled for hyperlocal geo-targeting of merchant's advertisements to viewers located in a vicinity.

The Sinclair Broadcast Group Technology, as well as other implementors of the Next Gen TV (ATSC 3.0) technology standard and variations on and enhancements thereof, enable a local broadcaster (e.g., TV station) to targeting a specific hyperlocal advertisement to a local consumer via the Next Gen TV (ATSC 3.0) technology. Next Gen TV, among other things, enables the local broadcaster to collect data about a consumer's viewing habits—such as knowing who is watching a broadcast and when the broadcast is being watched.

The Next Gen TV technology enables hyperlocal geo-targeted advertisements to be placed on a broadcaster's internet webpage, where the advertisements feature local advertisers (e.g., a local merchant). Each such advertisement can correspond to an advertisement that is also to be broadcast over the broadcaster's television broadcast medium (e.g., a local TV show). A browser user (e.g. a consumer) can 'click on' that advertisement to follow up on an incentive in the advertisement from a merchant.

The Next Gen TV technology is particularly advantageous in its ability to coordinate with specific local broadcast television receivers. This coordination allows the television receivers to both receive and render the corresponding hyperlocal geo-targeted advertisement during its broadcast over the broadcaster's broadcast medium (e.g., during a local TV show). Note that a local merchant's hyperlocal geo-targeted advertisement, when broadcast by use of the Next Gen TV technology, will target the advertisement to each of particular coordinated group of television receivers (e.g., set top boxes, smart TVs, web enabled mobile computing devices, smart phones, etc.) As such, the local merchant can arrange for the broadcast of an advertisement that features an offer for which local consumers in the same vicinity as the merchant will have a propensity to transaction with the merchant. By geo-targeting the consumer's specific local broadcast receiver by way of a media broadcasting environment having the capability to target the specific local ad to the specific local broadcast receiver via the Advanced Television Systems Committee (ATSC) 3.0 standards, the merchant's advertising spend with the local broadcaster is made more efficient. Stated otherwise, the broadcaster's technology is such that it can validate that the consumer was likely to have watched the broadcast of the local merchant's ad. Thus, a measured result of the merchant's advertising spend on broadcasting hyperlocal geo-targeted advertisement can be derived by linking customers viewing the ad to sales to those customers by the merchant via the View-To-Sale technology disclosed and enabled in this Application.

Information about consumers that has been passively or actively acquired to identify each consumer can identify each consumer with a physical location that is a known distance from the physical location of the local advertiser. The consumer's residence and broadcast receiver (e.g., set top box) will preferable be located near the merchant's physical address such that each such identified local consumer will be likely to have a propensity to transact with the local merchant due to the close proximity of the merchant to the consumer.

The local and proximate consumer, within a predetermined time period, will conduct a debit or credit transaction with the local advertiser (e.g., a local merchant) after having viewed the merchant's hyperlocal geo-targeted advertisement in local broadcast that was received and rendered by the consumer's television receiver (e.g., set top box and/or web enabled mobile computing device. The transaction between the local consumer and advertiser is traceable to the viewing the merchant's ad by the consumer.

In alternative of the foregoing implementation, the cost that the broadcaster charges to the local advertiser can be inversely proportional to the distance between the physical location to which the merchant's ad was targeted and the physical location of the local merchant who was advertising in the broadcast. Stated otherwise, an ad will cost less to broadcast if it is geo-targeted physically farther way from the merchant's brick and mortar store, and an ad will cost more if it's geo-targeted physically closer to the merchant's brick and mortar store.

By tracking the merchant's transactions with a consumer to the television viewing of the merchant's advertisement by the consumer, a measured result of the effectiveness of the advertising spend with the local broadcaster can be derived. Thus, the local advertiser can compare (i) revenue derived from the transaction between the local consumer and advertiser that is traceable back to the viewing of one or more broadcasts of the corresponding geo-targeted local advertisement to the consumer's specific local broadcast receiver.

The hyperlocal geo-targeting of merchant's advertisements to viewers located in a vicinity may include advertisements for various community programs that pertain to a particular community or vicinity. As such, implementations include a system, data access management utility, and a method of generating links between local merchants and community programs, whereby the merchant may provide incentives to customers in relation to community programs. Implementations may track community programs, as well as customer transactions, including both online and offline transactions, that occur between participants and that make use of the incentive, as further detailed below. Implementations may include as participants: customers, merchants, community organizations, intermediaries, and other groups or individuals, including merchants, members and intermediaries of the marketing system. Participants may have participant identifiers. The participant identifiers may be generated by the marketing system or may be linked to a payment source. Data may be collected about all participants, either expressly, or from offline or online transactions between participants utilizing a participant identifier, and this data may be stored in a data storage area. All data in the data storage area may be accessed by a data mining tool, a transaction linking utility, and an analytic mode, which may provide results that include information, such as details of consumer behavior and analytic reporting. Matches between transactions and members may be identified by the transaction linking utility, and a level of certainty that the match is accurate may be determined.

For the purpose of this patent application, the term "community programs" may be understood to define an ongoing community program (such as a shelter in a community), a term community program (such as a charity funding drive), or a community event (such as a festival). The term "community programs" may further be understood to define a community program serving a specific area (such as a festival held in a local park), a community program serving a neighborhood (such as a neighborhood clothing drive), a community program serving a larger area (such as a city-wide hosting of a sporting event), or a community program serving a still wider area (such as a national literacy program, or an international development program).

For the purpose of this patent application, the term "vicinity" may be understood in various implementations to reference concepts of community, including but not limited to a region, a local community, a community group, a community shopping region, and a geo-fenced shopping community, and a geographic community. These referenced implementations of community and the like, as used herein, are defined, characterized, and enabled in U.S. patent application Ser. No. 13/748,459, titled "Authorized Transaction Incented By Merchant Donation," filed Jan. 23, 2013, and published May 15, 2014, as US Patent Application Publication No. US 2014/0136300A1, hereinafter the "Community Definition Reference", which is incorporated herein by reference.

By way of example of one such implementation in the Community Definition Reference, a community is defined, characterized, and enabled as those merchants and account holders with whom the merchants conduct transactions that have respective physical addresses. These physical addresses are used with a navigation time algorithm to determine the navigation time from the physical address of an account holder to the physical address of a merchant. The determined navigation time is within a predetermined input minimum and a predetermined maximum navigation time for one or more transportation nodes. The date and time of a transaction between the account holder and the merchant are determined to be within a time period as provided by the merchant. The merchant and the account holder are deemed to be within the same community if the determined navigation travel time does not exceed a predetermined threshold. Note that the physical address of the account holder is typically the as the physical address of a television receiver with which the account holder views the merchant's advertisement that is broadcast for rendering on the account holder's television receiver. Note also that, in TV Everywhere implementations discussed herein, the physical address of the account holder's television receiver will be that of the geo-located address of a web enabled mobile computing device (e.g., a smart phone) on which the account holder views the merchant's advertisement that is broadcast for rendering on the account holder's television receiver.

By way of other example implementations in the Community Definition Reference, the merchant and a customer will not be determined to be in the same local community unless the respective physical addresses of merchant and customer are in the same community or neighborhood according to a predetermined algorithm. Any such local community determination can be made in any of several different methods, or combinations thereof, according to the merchant's preference as to what algorithm is mostly likely to attract the most favorable foot traffic to the merchant's brick and mortar store. One such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same or within a predetermined proximity as that of its customer's residence. Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community. In still another implementation, the merchant and customer will be deemed to be in the same local community if the customer provides an advertisement from the merchant, either electronically or on paper, showing a matrix code, that is a machine-readable optical label (e.g., barcode, Quick Response (QR) code, etc.), that contains information confirming that the advertisement is representative of the local community of the merchant, referred to hereinafter as the "Merchant Advertisement Matrix Code".

In some implementations, a merchant provides an incentive to a customer that the merchant will make a donation that will benefit the merchant's local community but only if the customer resides in that local community and conducts a transaction with the merchant. In such implementations, the obligation for the merchant to donate can be tested in a variety of ways. One test for the customer's residence can be made by calculating the duration of a trip to navigate from a geographic location associated with community resident to a geographic location associated with the merchant. This calculation can be made by using one of more navigation time estimation algorithms. Stated otherwise, the duration of a trip to navigate from a geographic location associated with an account holder to a geographic location associated with the merchant can be calculated by using one of more navigation time estimation algorithms. By way of example, and not by way of limitation, any of the following algorithms, either alone or in combination, can be used when calculating a navigation time between places respectively associated with customer and merchant: (i) Depth-First-Search (DFS); (ii) backtracking search; (iii) Dijkstra's algorithm; (iv) Krushkal's algorithm; (v) Prim's algorithm, (a.k.a. DJP algorithm); (vi) the Jarnik algorithm or the Prim-Jarnik algorithm; (vii) Reverse-Delete algorithm; (viii) Borvka's algorithm; (ix) a navigation algorithm now conceived; (x) a navigation algorithm both conceived and reduced to practice; and/or (xi) a navigation algorithm that is developed in the future.

Another way to calculate navigation time between places respectively associated with customer and merchant is to outsource calculations to a public or private web service by transmitting the respective geographic place identifiers to an online navigation service for calculation of navigation time and receive by the navigation time estimate. By way of example, the pair of places can be sent to an online service for subsequent return of a navigation time estimate as are provided by a Google® maps service, a Bing® maps service, a Garmin® maps service, a Delorme maps service, a TomTom® maps service, a Mapquest® maps service, etc. The navigation time estimate calculated, or received back from a web mapping service, can be a time that was calculated for one or more transportation modes, including walking, automobile or taxi, bicycling, mass transit, or a combination thereof.

A merchant can designate, for each of several different time periods during each calendar day, the navigation time under which the merchant will make a donation to one or more charities designated by a customer who transacts with the merchant, as well as the corresponding percentage of the transaction amount that the merchant will donate. As such, a merchant can input data corresponding to higher and lower incentives, such that a greater or lesser donation is made as depends up the time, the day, and the navigation time, by any of several different modes of transportation, between locations respectively associated with the merchant and the customer who transacts with the merchant.

In the case of a geographic area having a high-density population (e.g., a borough of a large city), a merchant may input small navigation times because local shoppers live close to the merchant's location. As such, the merchant is thereby committing to donate only those charities designed by customers who live close to the merchant's physical location—such as in 'walking distance'. Alternatively, in rural and sparsely populated areas, the merchant may input larger navigation times because local shoppers are likely to drive in an automobile as the most reasonable transportation mode to arrive at the merchant's store. As such, the merchant is thereby committing to donate only those charities designed by customers who live close enough to drive a reasonable distance to the merchant's store.

A merchant may choose not to make a donation to any customer who is identified with a residence or location that is too far from the merchant's location to represent potential frequent repeat business. As such, input by the merchant would be unfavorable towards any donation to the designated charities of a shopper who is unlikely to regularly shop at the merchant's business.

The navigation time input by the merchant might preferably be dependent upon the types of goods and services provided by the merchant. Merchants offering only commodity items, such as grocery stores, would be like to input shorter navigation times that merchants typically providing rare and hard-to-find items for which customers are more likely to be willing to make longer commutes in order to make purchases (e.g., a grand piano).

A merchant can input different navigation time thresholds for any of several different kinds of transportation modes, such as walking, driving, mass transit, and their combinations. For instance, if at least one of the navigation times from a customer's residence to the merchant's store for different transportation modes is less that an input threshold, then the merchant will make a donation to the customer's identified charities after the customer's transaction with the merchant has been authorized.

A merchant can input an identifier for one or more customers (e.g., an account or member number), where the merchant will donate to each such customer's identified charities. Note that, in this implementation and variations thereof, the merchant's obligation to donate is fixed regardless of any navigation time that may apply for the customer to travel from the customer's resident to the merchant's store, although other criteria may apply, such as a date and time parameter which must be satisfied by the date and time of the transaction. Alternatively, input can be made by the merchant such the merchant will donate to each identified customer's charities regardless of navigation time or time of day, though within the merchant's limits of donation.

Businesses in the marketing program are referred to as "merchants", while customers are referred to as "members". An entity granted limited participation in a marketing program, such as for a specific term, or only granted the ability to participate in specific activities, such as an advertising associate, may be referred to as an "intermediary". The term "participants" may reference any entity participating in a marketing program, including merchants, members, intermediaries, system administrator(s) and any other participant in the marketing system.

Implementations may involve an Internet, intranet or other networked environment. Therefore, any reference to any of Internet, intranet or other networked environment should be understood broadly to encompass not only the referenced term, but all of Internet, intranet or other networked environment. In the same manner terms indicating aspects of either the Internet, an intranet or another networked environment, such as a webpage in an Internet environment, should be understood broadly to include the equivalent available in the Internet, intranet or other networked environment.

The marketing system of the implementations may be particularly advantageous for local or regional participant merchants. These merchants typically do not have a significant, if any, online presence (e.g., they may be strictly a "brick and mortar store"). Implementations may enable such merchants to benefit from the broadcast of their advertisements so as to be geo-targeted for a hyperlocal viewing limited to viewers located in a particular community, as well as access to, and/or generation of, real-time analytic information relating to members, community programs, and other information that would not otherwise be available to them. For example, the transaction linking utility, and the data mining tool, sometimes with an analytic mode, may be used by a local participant merchant store to derive actual or projected customer behavior information, such a TV viewing habits, and other reporting. As an example of the function of the marketing system, such information or reports may be utilized to design future incentive programs to be implemented by merchants and to generate links between local merchants and community programs operating in a nearby location.

Such links may include, for example, incentive programs that provide a donation to a community program based upon a purchase between a customer, such as a member of the marketing system, and merchant of the marketing system, incentive programs that occur during a community program event, such as a festival, or other incentive programs that link community programs and merchants. The links may be formed because the activities of the community program and the merchant become intertwined and/or inter-reliant. Returning to the prior examples of incentive programs, the link between the merchant and the community program occurs in the former example because donations are provided to the community program upon a purchase from a merchant, and in the latter example because the merchant incentive is only offered during the time of a community program event. The activities of the community program and the merchant become inter-reliant. A skilled reader will recognize that a variety of other links may be formed between merchants and community programs through a variety of other means or other types of incentive programs as well.

Overview

In one implementation a system administrator of a marketing system may facilitate the collection of information regarding community programs. This may involve community programs providing information to the system administrator of their own volition and/or the system administrator searching for, and requesting, community program information. Such community programs may be occurring in the immediate, near or distant future. The information may be collected via an online search, a search of one or more community databases, from information sent by community programs to the administrator, or other means. Information regarding community programs may be stored in a data storage source, such as a database. Merchants, members and other groups or individuals may become participants in the marketing system. Each participant may have a participant identifier. Upon joining the marketing system, or after joining, the participants may provide information regarding themselves, including the location of the participant (e.g., a merchant's store(s) location(s), a customer's home and/or work address, etc.) to the marketing system. The marketing system may store the information as data in the storage area.

The data in the storage area may be mined by a data mining tool. The data mining tool may be utilized by any participant of the marketing system. For example, the data mining tool may be used to match a community program to a participant merchant in the area where the community program is to occur, or is occurring. The result may be that a local participant merchant may be made aware of an upcoming local festival. The participant merchant may devise a merchant incentive in relation to the community program, such as a discount, a donation to the community program, a giveaway, a sweepstakes entry, rewards (such as reward points) or any other incentive.

The data mining tool may also be utilized to identify members of the marketing system who are identified as existing near the participant merchant store location. For example, the data mining tool may identify participant members living and/or working in the area of the merchant store location and/or one or more community programs, in accordance with member profile information and other data stored in the data storage area and any linked data sources. The data mining tool may also be utilized to identify participant members who may be likely to visit the merchant store and/or make use of the incentive, in accordance with demographic information or preferences derived from data stored in the data storage area and any linked data sources. A skilled reader will recognize that other information regarding a member, for example, such as transactional behavior, may also be utilized to identify participant members who may be likely to visit the merchant store and make use of the incentive.

The merchant, or another marketing system participant working with the merchant, may advertise the merchant's one or more incentives and/or the community program to at least the members identified by the data mining tool. Such advertisements, which may include a Merchant Advertisement Matrix Code, may be communicated to an identified member and/or other potential customers by a variety of online and offline means, including a hyperlocal geo-targeted advertisement for a local merchant that is interleaved into television broadcast content, a webpage, an email, a communication sent to a mobile device, a print advertisement, a radio advertisement, etc.

In an implementation that involves cross-selling or cross-loyalty, as described in more detail below, implementations may facilitate consecutive, or simultaneous, communication of related incentives. For example, incentives of two merchants involved in a cross-selling program may be communicated either immediately one after the other, or together. The communication may further indicate a link or other connection between the incentives based upon the cross-selling program. A skilled reader will recognize that a variety of ways to indicate cross-selling or cross-loyalty incentives may be provided. In one alternative of this implementation, a member may view a display of incentives on a webpage when the member logs onto the marketing system website. The display may be immediately presented after login, or may be presented upon a selection by the member, such as the selection of a particular webpage, a link, or an incentive display option.

In another implementation, a merchant may have an option regarding setting the prominence of the communication of an incentive to a member or other participant. For example, a merchant may make a request, and may pay a fee, for a particular prominence of an incentive in a communication to a member, other participant or any third parties. A merchant may also be given the opportunity to bid for a more prominent communication or display of an incentive to a member, participant of the marketing system, or third party. A skilled reader will recognize that prominent communication or displays of an incentive may involve a variety of criteria, such as, for example: the time of day when a communication occurs via radio; the positioning of an incentive within a hyperlocal geo-targeted advertisement for a local merchant that is interleaved into television broadcast content, the positioning of the incentive on a webpage, printed page, or list showing one or more incentives; the typeface or graphics (e.g., bold, colored, etc.) of an incentive on a webpage or printed page; etc.

A participant and/or third party may redeem an incentive, through an online of offline transaction. Transaction details of transactions occurring between a merchant and a participant or third party, may be stored in the data storage area. At the time of the transaction a member, or other participant, may provide a marketing system participant identifier to a merchant.

Transaction details may be transferred to the marketing system for storage and mining by a variety of means and at a variety of times. For example, transaction details may be transferred to the marketing system in real-time (e.g., as a transaction occurs and concludes), near real-time (e.g., almost immediately after a transaction concludes), and/or after a time lapse (e.g., at the end of a time period, such as a set time(s) during a day, at the end of the day, at the end of a week, at month-end, or at any other time after a transaction is finished, information regarding one or more transactions may be provided to the marketing system). The data mining tool may be utilized collect data from the storage area, and possibly other data sources, to generate specific information, for example, such as information regarding consumer behavior data that may provide: one or more reports pertaining to a particular incentive (e.g., success of an incentive); information to be utilized to create a new incentive; suggestions of new incentives; or other information.

In particular, the data mining tool may be utilized to determine if a transaction occurred as a result of an incentive. For example, the data mining tool may be engaged (and optionally the analytic mode may also be engaged) to recognize particular pre-transaction behavior by a participant, for example, such as the participant viewing a broadcast containing a hyperlocal geo-targeted advertisement of a merchant, communication of an incentive to a participant, or other information. The pre-transaction behavior, if followed by a transaction with a particular period of time, may be assumed by the marketing system to indicate that the transaction occurred based upon the incentive—such as when the transaction occurred due to the viewing by the participant of a broadcast containing the merchant's advertisement. It is also possible for a post-transaction survey to be provided to the participant who engaged in the transaction, and data collected from the survey may establish that the transaction occurred due to the participant viewing a broadcast containing the merchant's advertisement and/or the incentive. Such data may be utilized by the marketing system, merchant, and/or other participants to make determinations about future incentives, success of past incentives, marketing strategies, and other decisions.

Implementations may include a transaction linking utility to access the data in the data storage area or data extracted or analyzed by the data mining tool and the analytic mode, and to utilize this data to identify links between a transaction and a member. For example, the transaction linking utility may analyze the data to recognize the existence of links or matches between transactions and other behavior or activities of members or users. As such, the transaction linking utility may be operable to identify a match between a hyperlocal geo-targeted advertisement, which may include a Merchant Advertisement Matrix Code, for a local merchant that is interleaved into television broadcast content that is viewed on a television receiver by a member and a later transaction when the member purchases a product or service at a merchant's store. The transaction linking utility may further determine a likelihood or level of certainty that a transaction resulted from the member viewing a broadcast containing the merchant's advertisement. This operability of the transaction linking utility is described in more detail below. A skilled reader will recognize that the transaction linking utility may utilize a wide variety of data to undertake its function and may link a transaction to a wide variety of behaviors or activities by a member, and may determine the link to be of varying degrees of likelihood or certainty. The transaction linking facility may also involve data such as member profile data, including a member's financial card information, or a member's identification, to determine a link between a member and a transaction.

Participants of the marketing system, other than the administrator, may not be provided with direct access to the data stored in the data storage area. Thus, any personal information regarding a participant stored in the data storage area will not be accessible by participants. Additional security measures may be included in the marketing system to ensure that personal information regarding a participant stored in the data storage area will not be disseminated to participants. Such security measure may further include means whereby the data mining tool, transaction linking utility and analytic mode may generate information in a manner so that such information is devoid of personal information regarding specific participants. In this manner, privacy of information, including personal information, may be maintained by the marketing system. Privacy of information of the marketing system may meet or exceed any regulations regarding private information in a specific location or wider area.

Benefits Over the Prior Art

Implementations may offer many benefits over prior art. For example, many local merchants lack the ability to access information sources that offer both: information regarding community programs local to a merchant store location; and customer participant information. The data and other information either stored in the data storage area of the marketing system, or in other data sources that are accessible by the marketing system, may be queried to identify members likely to make use of a merchant incentive. Implementations permits local merchants to become participants of the marketing system and to access this information. Implementations also offer a greater level of control to the merchant to create specific incentives related to community programs and to track the use participant members make of the incentives. Merchant store locations can be easily linked into community programs in the same locality.

Implementations provide an additional benefit, in that the tracking of participant customer transactions that make use of an incentive does not require a Point of Service (POS) terminal. The prior art generally utilizes a POS terminal to track transactions made by a customer having a rewards number or card at a store. POS terminals are expensive and may lack compatibilities with other point of sale systems utilized by other merchants. In various implementations, as tracking of transactions between merchants and members does not occur by way of the POS terminal, it is not necessary for a merchant to install an expensive point of sale system having tracking capabilities required by the prior art. Thus, implementations may provide a cost-effective means of tracking transactions as compared to expensive prior art systems. Additionally, implementations allow for transaction tracking to occur whether the transaction occurs online or offline. For example, a participant customer making a transaction in a brick and mortar location of a participant merchant may be trackable in accordance with the implementations. Moreover, any participant merchant incentive may be applied to a participant customer transaction that occurs either online or offline.

Still other benefits of implementations include the wide range of information that is collected in a common data storage area for use by the data mining tool, the transaction linking utility and the analytic mode, and the operability of the data mining tool, the transaction linking utility and the analytic mode to prevent dissemination of private and/or personal information.

Prior art does not involve the collection of the breadth of information into a single location that is accessible by a data mining tool, a transaction linking facility and an analytic mode, that the disclosed implementations achieve. Nor does prior art limit the accessibility of private and/or personal information as effectively as the disclosed implementations.

Yet another benefit of the disclosed implementations over the prior art is the seamless linking to mobile devices. Consequently, an individual is not required to visit the marketing system's website necessarily to participate in activities of the marketing system. For example, advertisements of incentives, which may include a Merchant Advertisement Matrix Code, may be provided via TV Everywhere broadcasts to mobile devices, as may surveys, information entry, and other facilities.

Another benefit of the disclosed implementations over the prior art, is that, should the incentive involve a donation to a community program, the donation is reportable by the data mining tool in a clear manner. The result may be that the implementations offers accountability in its reporting of donations. This accountability may also be the standard for donations to community programs made by participants of the marketing system by other means than incentives. The donator can see that the donation amount has been passed by a payment source to the community program.

Still another benefit of the disclosed implementations over the prior art is that the implementations may have several results for participants not achieved by prior art inventions.

Implementations may increase revenues of merchants by increasing transactions of the merchants that are participants of the marketing system due to customer (including participants) interest in, or loyalty to, community programs.

Implementations may increase customer (including participant) awareness of a local participant merchant store by broadcasting a hyperlocal geo-targeted advertisement for the local participant merchant store that is interleaved into television broadcast content, communicating incentives from the merchant to members, mapping features showing merchant locations, and other features of the implementations.

Implementations may also increase merchant goodwill by promoting the merchant's support of one or more community programs. The implementations may increase support of community programs by making it easier for merchants to become cognizant of community programs occurring near merchant stores in the same locality as the community programs. The support of community programs by merchants may be financial, or may be by increasing participant consumer awareness of community programs occurring in a particular location.

Marketing System

Implementations may include a marketing system involving a web server accessible by an administrator, one or more merchants, and one or more members registered with the marketing system. The web server may also be accessible, by way of specified and possibly limited access, by one or more intermediaries registered with the marketing system and third parties. The web server may be linked to a data storage area. Data pertaining to the administrator, merchants, members and/or intermediaries may be stored in the data storage area. Some data pertaining to third parties may also be stored to the data storage area in some implementations. At least one participant identifier may be stored in the data storage area for each registered participant of the marketing system.

The web server may be operable so that a merchant may provide information to the web server regarding one or more transactions between a merchant and a customer. The customer may be a member of the marketing system. A skilled reader will recognize that data pertaining to a transaction between a merchant and a member, or other customer, may be transferred to the web server by a variety of means, for example, such as via manual entry, via another communication means, etc.

In one implementation, a POS terminal may also be utilized by the marketing system in some implementations. The POS terminal may be in communication with the web server, and may pass information regarding a transaction occurring between a merchant and a customer to the web server. The customer may be a member of the marketing system.

In another implementation, data, or other information, may be transferred regarding a member or other participant from a separate data source, such as a data base, to the marketing system. For example, a member may be a financial card holder, and all financial card holders may be given the option to become members of the marketing program. The financial card company may also become an intermediary of the marketing system. Once a financial card holder agrees to become a member of the marketing system, information and other data regarding the financial card holder, as gathered by the financial card company, may be either transferred to the marketing system, or may be made accessible by the marketing system.

A skilled reader will recognize that other groups may become members, such as, for example store card holders, members of a community group, such as a co-op, bank card holders, or any other group, and that the persons involved in the group may become members of the marketing system. The group may gather information independently from the marketing system and this information regarding persons who become members of the marketing system may be made available to the marketing system via a transfer, or via access to the data source of the group.

The persons involved in the group may be granted an identification, such as a numeric identification. This identification may be acknowledged by the marketing system, so that when a person involved in the group becomes a member of the marketing system, the marketing system stores the identification provided by the group. The identification may be stored in the marketing system as the participant identifier. In some implementations more than one participant identifier may be stored in the marketing system for a member, or a participant identifier may be stored and other identifications may also be stored. Any transaction that occurs and utilizes the identification may be recognized by the marketing system as a transaction involving the member whom the identification represents.

For example, a financial card holder may be granted a financial card number. The financial card holder may become a member of the marketing system. Upon becoming a member of the marketing system the financial card number of the member may be transferred, or otherwise provided, to the marketing system. The marketing system may utilize the financial card number as an identification for the member.

The one or more identifications, or one or more participant identifiers, identified as pertaining to a member of the marketing system may be utilized by the member during a transaction. For example, a member may utilize a financial card during the transaction and the financial card number may be an identification, or participant identifier, identified as pertaining to the member by the marketing system. The marketing system may therefore recognize that the transaction involves the member due to the use of the financial card number. A skilled reader will recognize that other identifications, or participant identifiers, may be utilized by a member, that such identifications may be stored by the marketing system, and that use of an identification, or participant identifier, during a transaction may provide a means of identifying a transaction as involving a particular member. As described above, the identification may be stored as a participant identifier by the marketing system.

As shown in FIG. 1, the marketing system may be operable in accordance with a web-based computer program product that provides a loyalty engine 10, linked to the web server. The loyalty engine may provide a marketing system interface to enable specific features, for example, such as surveys, incentive communications, data mining and other features. Transactions occurring between members and merchants, including transactions utilizing a point of sale facility 12, may be recorded or otherwise linked to data storage means. For example, a data storage means may be a database that may be included in one or more servers. As another example, a server farm may be included in the system in various implementations and one or more linked databases may be included as a data storage area. A skilled reader will recognize that implementations may utilize a combination of stored data and real-time data (the real-time data may or may not be stored), and that both of these types of data may be utilized by the data mining tool. The data mining tool 14 may be operable by the loyalty engine, and may be utilized by members, merchants, the administrator, an intermediary, or any third party that is provided specific access to the data mining tool.

In one implementation, transaction linking utility 16 may be utilized to compare transaction details regarding a merchant and/or member with stored data, for example, such as a member or merchant profile. In this manner a transaction may be confirmed to be between a specific merchant and a specific member. Details of the transaction may be stored in the data storage area as corresponding to the merchant and/or member involved in the transaction. For example, details of the transaction may be stored in the member profile, merchant profile, as historical transaction and/or as preferences.

The transaction linking utility may also be utilized to identify a specific member that may be eligible for one or more merchant incentives based upon a transaction. For example, the transaction linking utility may utilize data representing the broadcasting a hyperlocal geo-targeted advertisement for a local merchant that is interleaved into television broadcast content, member information including other recent transactions between the merchant and the member (e.g., assume member is likely to engage in future transactions with the merchant), frequency of transactions between the merchant and the member (e.g., member may be eligible for an incentive, which may be an increased discount or other augmented incentive, based on either frequent transactions with a merchant, or a particular number of past transactions with the merchant), and the amount of money spent in any transaction between the member and the merchant (e.g., member may be eligible for an incentive, which may be an increased discount or other augmented incentive, based on an amount of money spent in a transaction with the merchant), as well as any other post-transaction comments. Such parameters may be incorporated into a rule and the transaction linking utility may function in partnership with an analytics mode to identify member eligibility for an incentive.

An incentive may be communicated to a member through a variety of means, including broadcasting a hyperlocal geo-targeted advertisement for the local participant merchant store that is interleaved into television broadcast content, a communication to a mobile device (e.g., a text, twitter, etc.), an email, a mailing, a telephone call, or any other means. The incentive, which may include a Merchant Advertisement Matrix Code, may also be in many different forms, a sweepstake entry, a discount, a donation to a charity, rewards points, a coupon, or any other incentive form or combination of incentive forms (e.g., a donation to a charity and a discount, etc.).

Figure 8:
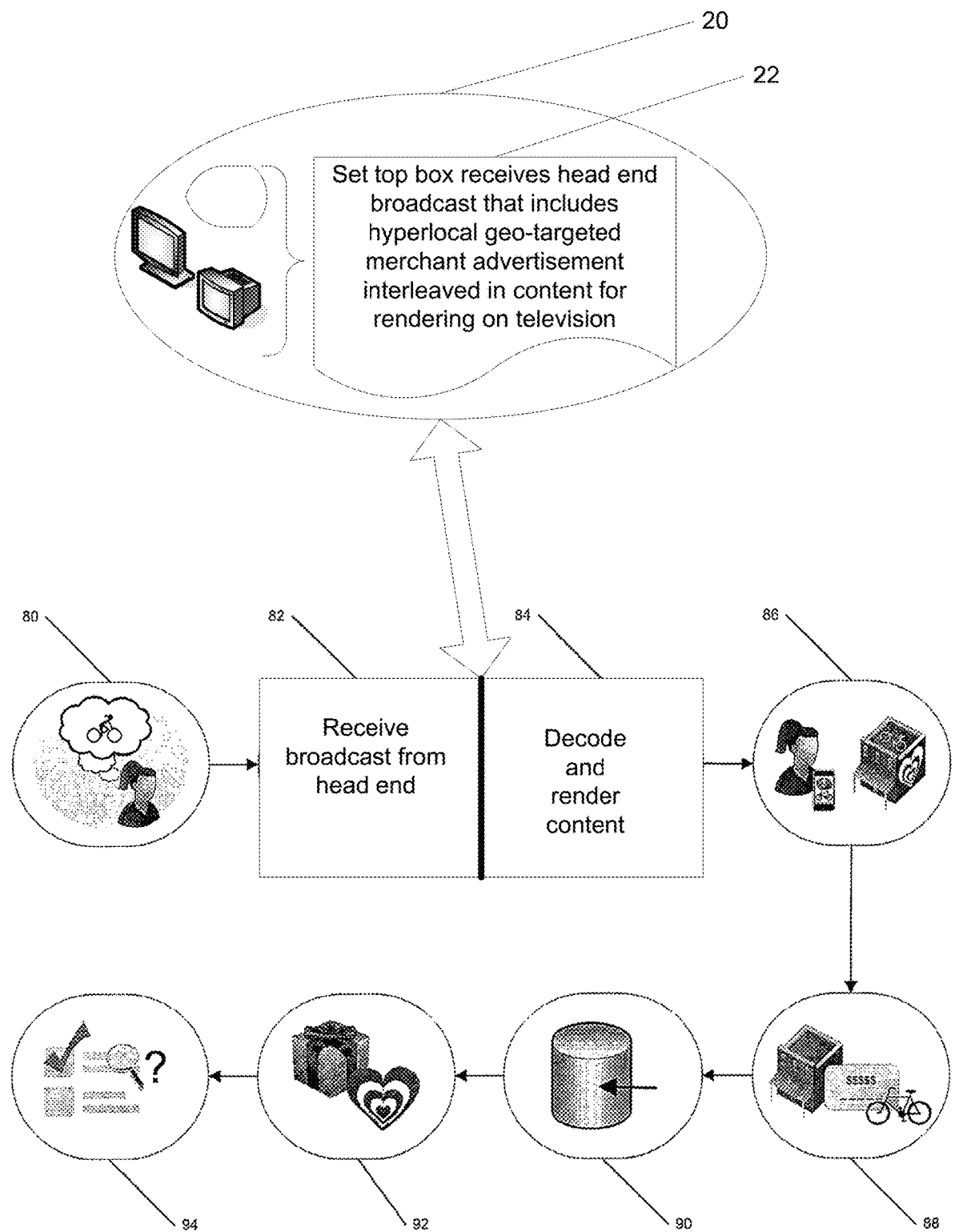
FIG. 8 is a flowchart showing the steps in one implementation for a transaction to occur between a merchant and a resident of the same vicinity after the resident has viewed an advertisement on a television receiver, where the advertisement is for the merchant's offer of an incentive to conduct the transaction at the merchant's bricks and mortar store location in the vicinity.

As shown in FIG. 8, in one implementation a television viewer 80, such as a member, receives at processes 82-84 a broadcast for display on a television 20. The broadcast includes a hyperlocal ad 22 that is rendered only to televisions located in a particular vicinity, where the advertisement is for a merchant who is located in the particular vicinity. An advertising cost is assessed by the broadcaster, such as a local TV station, to the merchant in the particular vicinity. In one implementation alternative, the advertising cost is inversely proportional to the navigation time from the location of the television in the particular vicinity (e.g., from the television viewer's physical or residential geographic address) to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store that is located in a vicinity where the television viewer 60 is also located. The advertisement may include an incentive from the merchant. For example, the incentive may be a discount on the price of a bike and/or an agreement that the merchant will donation a certain percentage of the currency amount of the transaction to a charity in the vicinity if the television viewer 60 purchases a bicycle in a transaction at the merchant bicycle store. The television viewer 60 may accept the merchant's incentive by going to the merchant's bike store 86. The user may utilize the incentive and redeem it for a discount on a bike 88, and/or for the merchant's agreement to make donation to the charity in the vicinity by conducting the transaction at the merchant's bike store. Details regarding the transaction may be transferred to the marketing program 90. A further incentive may be triggered when the details regarding the transaction are received and processed by the marketing program. For example, the further incentive may be an incentive such as a prize entry (e.g., the customer wins), or a donation 92 to a community program (e.g., the community benefits). The marketing program may match the transaction details to the behavior of the user if the user is a member of the marketing program, where such behavior includes the user viewing a broadcast containing the merchant's advertisement. For example, based upon the transaction details that indicate that the member acquired an incentive that was communicated via the broadcast of a hyperlocal geo-targeted ad for the merchant's bike store, it can be assumed that the transaction resulted from the viewing of the broadcast of the merchant's bike store advertisement.

A post-transaction survey 94 may be generated and communicated to the user if the user is a member of the marketing program. For example, the survey may be communicated to the member the next time the member logs into the marketing program, such that the survey appears as a pop-up on the sign-in page after log-in, or the survey is accessible by a link shown on the sign-in page, or so that the survey is available to a member that is signed into the marketing program via some other means. Alternatively, communicated to a communication means belonging to the member or a user that is not a member, and be available to the user on that communication means, for example, such as a communication means indicated by the member in the member's profile or a communication means indicated by the user at another point, such as during the transaction, that is capable of accessing a communication, such as a blackberry message, an email, a text, or some other communication.

The post-transaction survey may be completed by the member and the information included in the survey may be processed by the marketing program. For example, the post-transaction survey information may be processed to indicate a link between the transaction and any earlier activity, such as the query by the user, or any other activity. The information in the post-transaction survey may be utilized to confirm the transaction behavior of a user. This information may be stored by the marketing program and may be provided to the merchant, or other participants of the marketing program, in a variety of forms upon a variety of events, for example, such as the generation of a report by the merchant. The merchant may use this information to develop effective incentive programs, to evaluate the success of incentive programs, or for other purposes.

In one implementation, the time elapsed between member having viewed a broadcast that interleaves a hyperlocal geo-targeted advertisement for a merchant, and a transaction between the member and the merchant may be evaluated by the transaction linking utility. A maximum time lapse between a user's having viewed a broadcast of the hyperlocal geo-targeted advertisement for the merchant and a subsequent transaction by the user at the merchant's store may be recognized by the marketing program. The maximum time lapse may be input by the merchant, or may be generated by the marketing program, or may be otherwise set in the marketing program. For example, the maximum time lapse may be generated by the marketing program in accordance with the merchant type, the item or merchant that was advertised in the hyperlocal geo-targeted merchant advertisement that was broadcast, the merchant preferences, or any combination of these. Other rules for matching a query or search to a transaction may be set, stored and utilized by the marketing program. Such rules may be modified at any time. In particular, the rules may be modified in accordance with the experience of a merchant. A merchant may also override the rules in specific circumstances.

The amount of time allowed for a maximum time lapse may further be member specific. For example, the marketing program may recognize that a longer period of time elapses between a member having viewed a broadcast of the hyperlocal geo-targeted merchant advertisement and a transaction for the merchant than the maximum time lapse allows. This extended period of time may indicate that a member has a reason which prohibits him or her from travelling to a store in a timely manner after viewing a broadcast of the hyperlocal geo-targeted merchant advertisement. For example, the member may be a professional who has a work-schedule that prohibits frequent shopping. If the marketing program determines that transaction occurs following the broadcast of the hyperlocal geo-targeted merchant advertisement outside of the maximum time lapse for such a member, the marketing program may determine that there is still a likelihood of a match between the member having viewed a broadcast of the hyperlocal geo-targeted merchant advertisement and the transaction in the case of this specific member based on past member behavior. Therefore, the marketing program may adjust the maximum time lapse to a longer period relative to the historical data relating to the particular member.

The location of a member in relation to the location of the merchant store may also be a factor that is considered when determining a reasonable time lapse between the member having viewed a broadcast of the hyperlocal geo-targeted merchant advertisement and the transaction. For example, if the store is identified by the marketing program as being a significant distance away from the location of the member, the maximum time lapse may be extended to recognize broadcast ad viewing and transactions occurring at periods in time more distant than the maximum time lapse as having a likelihood of matching.

The time and date that the member viewed a broadcast of the hyperlocal geo-targeted merchant advertisement in relation to a transaction may also be a factor that is considered when determining a reasonable time lapse between the broadcast ad viewing and the transaction, in accordance with historical data relating to broadcast merchant advertisements and transactions by a member. For example, a member's viewing of a broadcast of a hyperlocal geo-targeted merchant advertisement may take place on a Sunday night and a transaction occurring on the following Saturday, or at another day that is beyond the maximum time lapse, may be recognized as having a likelihood of being a match if the member transaction history shows the member only shops on alternate weekends, or in another such pattern of time.

The type of communication devices utilized for viewing a broadcast that interleaves a hyperlocal geo-targeted advertisement for a merchant prior to a transaction may also be a factor that is considered when determining whether there is the advertisement having been viewed and a transaction. For example, if the ad viewing occurs on a communication device that is portable, such as via a Television Everywhere broadcast model, where the device is a smart phone, a cell phone, a PDA, a tablet, or other types of portable communication means, this may indicate that the ad was viewed 'on-the-fly'. This may further indicate that the ad that was viewed is related to a need that is recognized while a user or member is travelling. Therefore, the use of the device may indicate an increased intent to purchase a product or service, or to shop at a particular merchant's store. For example, the ad may have been viewed when a user or member is already out shopping and has realized that they need another product or service. Therefore, the use of certain portable communication devices to a view a broadcast that interleaves a hyperlocal geo-targeted advertisement for a merchant may indicate a different level of purchase intent and may also indicate a different reasonable time lapse for a user or member to make a transaction based upon the ad that was viewed. Such an application of the marketing program may further recognize the distance between the user and/or member and the location of the merchant store that was advertised in the broadcast. If the distance is determined to be significant, then a longer period of time lapse between the viewing of the merchant's ad and a transaction may be deemed acceptable to indicate that the transaction is a result of the viewing of a broadcast of the merchant's hyperlocal geo-targeted advertisement.

A skilled reader will recognize that a variety of factors may be utilized to determine if a transaction is likely to have been the result of the viewing of a broadcast that interleaves a hyperlocal geo-targeted advertisement for a merchant. These factors may differ for specific members, based upon prior data collected by the marketing program and analysis of this data to indicate member behaviors. A skilled reader will also recognize the richness of rules and tools that the marketing program may utilize to undertake the analytics involved in matching transactions and the participant's viewing of a broadcast containing a merchant's advertisement and indicating likelihoods or certainties of relationships therebetween.

In implementations a transaction may occur online (e.g., via a website) or offline (e.g., at a brick and mortar store location, or at another physical location where the merchant is selling products or services such as, for example a kiosk, booth or other location). The tracked information may be utilized by the transaction linking utility to determine if the transaction represents a sale that occurred as a result of the viewing of a broadcast that interleaves a hyperlocal geo-targeted advertisement for a merchant by the member that resulted in the member transacting with the merchant at the merchant's brick and mortar store. A post-transaction survey may also be provided to verify that the transaction occurred as a result of the advertisement having been viewed. A skilled reader will recognize that a variety of variables may be utilized by the transaction linking utility to determine if a transaction occurs as result of a member's advertisement viewing, and that these variables may be governed by rules, or other means implemented by the marketing system.

In one implementation, the marketing program may utilize the transaction linking utility to estimate matches between a member's, or other user's, advertisement viewing and the member's or user's transactions at the merchant. Such an estimate of the matches may be undertaken to produce variable degrees of certainty for each match, or likelihood of a match between a transaction conducted by a member with a merchant and data confirming that the member viewed a broadcast containing the merchant's advertisement. Examples of the certainty that may be indicated by varieties of broadcasts that interleave hyperlocal geo-targeted advertisements for merchants, where such viewing is followed by a transaction at the merchant's store (either an online or offline store) and a post-transaction survey is not provided corresponding to the transaction may be considered to indicate a low level of certainty that the transaction occurred as the result of the ad viewing by the member or other information pertaining to that merchant or the merchant's products and/or services In one implementation, it may be possible for the marketing system to recognize that items purchased with a hyperlocal geo-targeted advertisement for a merchant that was broadcast. For example, a user or member saw a broadcast that interleaved a hyperlocal geo-targeted advertisement for a merchant in which ad was for a coat sold by the merchant. Later the user or member may purchase the coat through a transaction at the merchant's store. Other items may be purchased in the same transaction by the member or user. The other items purchased with the coat may be recognized by the marketing program to have occurred as a result of the broadcast ad for the coat. Tracking the purchase of the extra items besides the coat may provide a means of capturing information related to the purchasing behaviors of the user or member purchasing the coat and the other items. This information may be utilized for the purpose of other analyses conducted by the implementations.

In one implementation, an analytic mode may be engaged to function in connection with the transaction linking utility to produce reports, reviews or other feedback for participants interested in identifying instances where a transaction occurred as a result of a member viewing a broadcast containing a merchant's advertisement.

Figure 2:
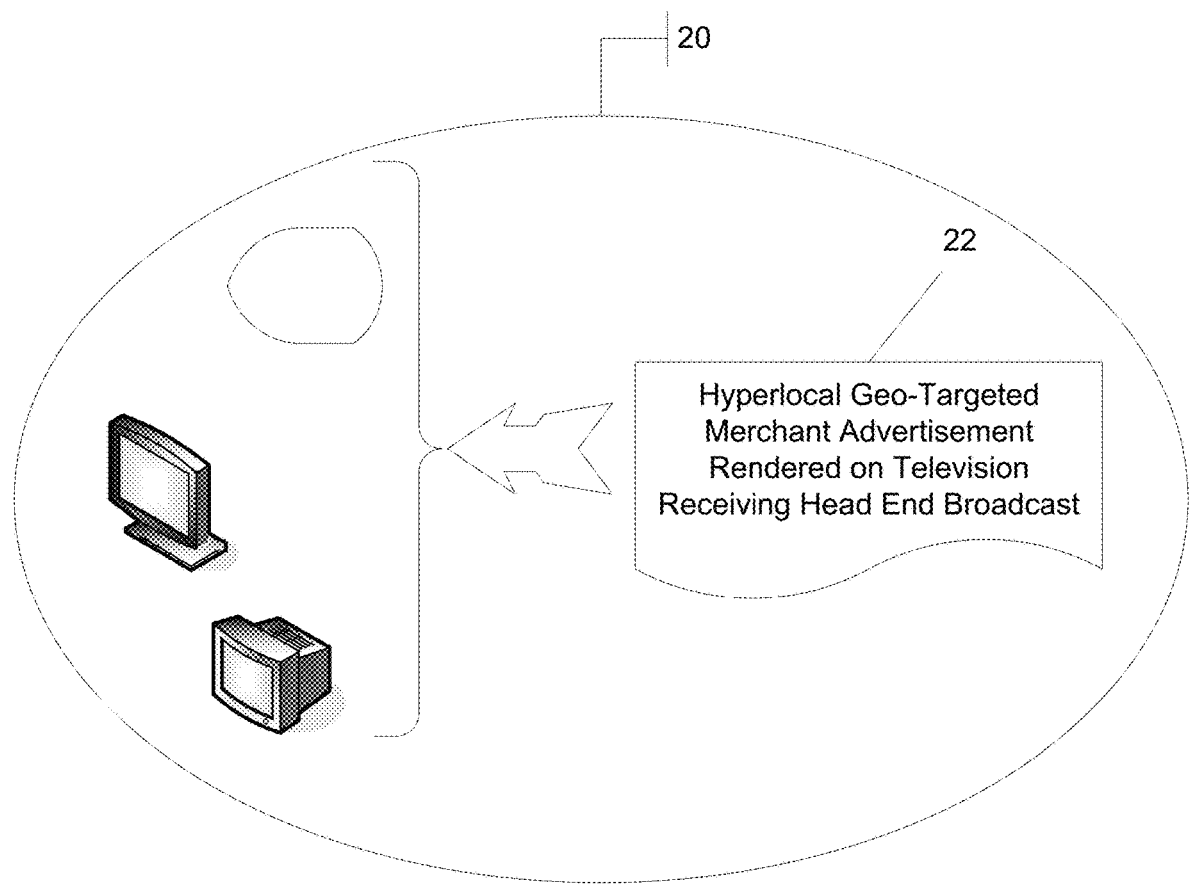
FIG. 2 is a view of a merchant incentive communicated to a television receiver.

As shown in FIG. 2, the system may be linked to a variety of communication means 20, for example, such as a television receiver, a smart phone, a cell phone, a PDA, a tablet, a laptop, or other type of communication means, whereby details of a merchant's advertised incentive may be viewed in a broadcast that is received and rendered for viewing. For example, the system may be linked to a smart phone belonging to a member, whereby incentives may be disseminated to the member via the smart phone. In this manner the merchant's hyperlocal geo-targeted advertisement 22 may be disseminated to a member and communicated by the loyalty engine to the member's smart phone. The advertisement may further include a Merchant Advertisement Matrix Code, a unique reward identifier, or other intelligent information.

Additionally, information entered into a communication means, such as a smart phone, may be transferred to the loyalty engine and ultimately stored in the data storage area. For example, a survey may be disseminated to a member whereby the survey is available to the member on the member's smart phone. Responses to the survey made by the member via the smart phone may be transferred to the loyalty engine and thereby stored in the data storage area. A skilled reader will recognize that data may be transferred to and from the loyalty engine, to merchants, members, intermediaries or any other third party.

Administrator Registration, Interface and Functionalities

In one implementation, the marketing program may be hosted by an administrator. The administrator may be an individual or an organization. Access to the marketing program, including access to some and/or all data may be provided to an administrator. Generally, the administrator access to the marketing system may differ from access provided to others: access to the marketing system, including access to anonymized data may be provided to merchants and members; and limited access to the marketing program may be provided to third parties and/or intermediaries. The marketing system may be operable to allow an administrator to input particular data, including data pertaining to community programs.

The administrator may undertake a search for community programs. This search may utilize information available via the Internet, other databases, telephone services (such as those provided by some municipalities, media outlets, etc.), and other data sources. The administrator may also be provided information regarding community programs by third parties.

All details relating to the community programs may be stored in the data storage area of the marketing program. The data mining tool may be utilized to provide reports or lists providing information related to the community programs, for example, such as a list of community programs in a specific location (e.g., a town, a city or a borough, etc.).

In one implementation, the administrator may utilize the administrator access facilities of the marketing system to provide information to a merchant regarding community programs occurring, or about to occur, in a location nearby to one or more of the merchant's stores, or information regarding members. A merchant may utilize this information to develop incentives relating to one or more of the merchant's stores. The incentive may be an opportunity for potential customers to save, win, and/or benefit community, for example by the incentive of a coupon, a sales discount, a give-away, a sweepstakes entry, the merchant's offer to make donation to a community program, or any other incentive. The incentive or information regarding the incentive may be disseminated to a member.

The marketing system may also be operable to allow the administrator to generate lists, reviews, reports or other information to be provided to prospective merchants, members and/or intermediaries to cause them to consider registering with the marketing program.

In some implementations, a fee may be charged for any request for information, lists, reviews, reports generated by an administrator. A skilled reader will recognize the variety of types of fees that could be charged, such as, for example a fee for each request, a fee per lines on a report, and other types of fees.

Merchant Registration, Interface, and Functionalities

A merchant may join the marketing program by registering. A merchant may be an online merchant, a merchant having one or more brick and mortar locations, or any other merchant. A merchant may identify the location of any bricks and mortar locations to the marketing system along with other merchant profile information. Merchant profile information may be provided to the marketing system at the time of registration as well as at points in time after the initial registration occurs.

A registration interface may be provided to the merchant via a web page, via a mobile device, or via any other means. The merchant information may include a variety of information, for example, such as a merchant participant identifier, the location of the merchant's store(s), the merchant's target clientele, etc. The merchant information may allow the marketing program to link a financial card or other billing system to the merchant.

Figure 3:
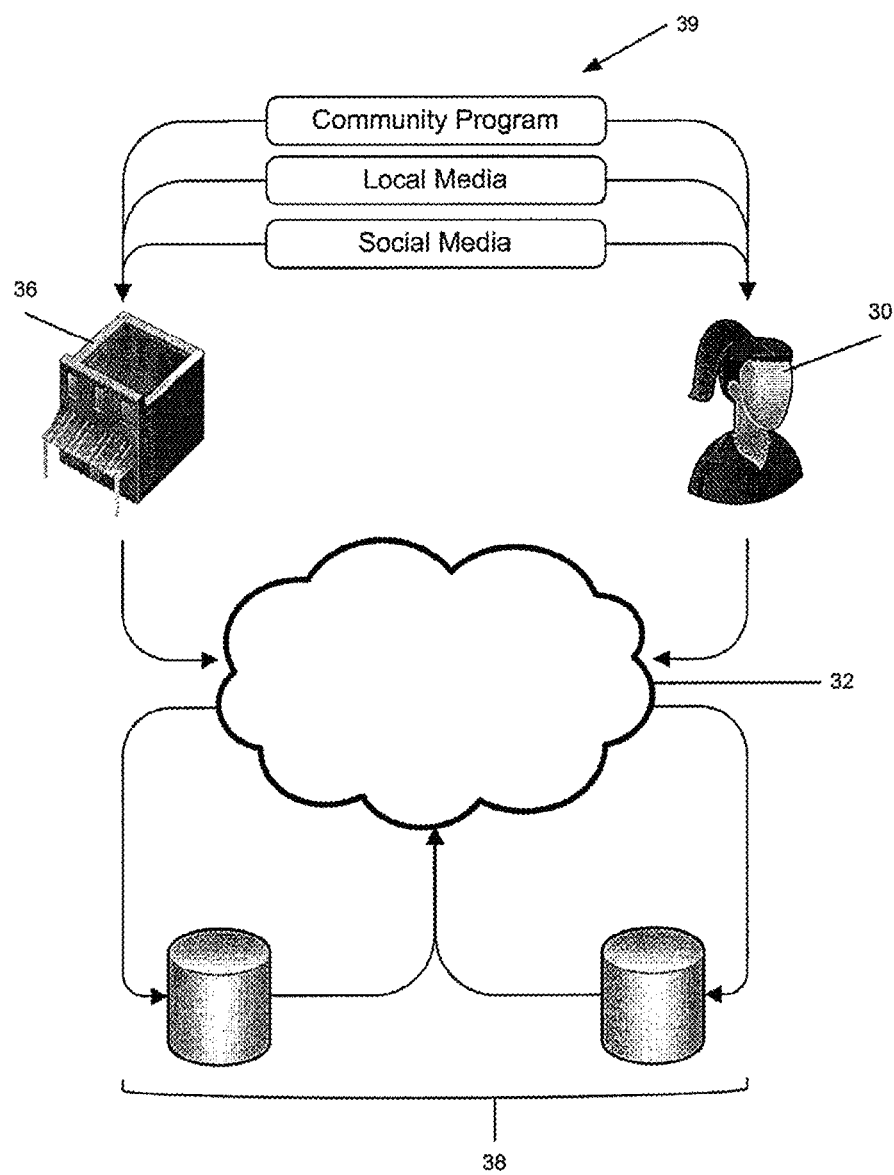
FIG. 3 is a systems view of a data transfer between a merchant, a member, the marketing system, and a data storage area.

As shown in FIG. 3, a merchant 36 may register with the marketing program of the implementations to become a participant. Registration may be facilitated by one or more registration means as described in more detail below. Registration may further occur through an interface 32, for example, such as a web page, etc. Information regarding the merchant, for example, such as the merchant's name, its store locations, its website and web page information, and other details may be provided by the merchant at registration, or at any later point, and stored in the data storage area 38. A merchant may develop merchant incentives, and may communicate these to members through a variety of means 39, including the marketing system web-pages, any merchant and/or intermediary web pages, social media (e.g., web pages, Facebook™, Twitter™, etc.), local media (e.g., radio advertisements, print media, television broadcasts, etc.) and through relationships with community programs (e.g., the community program promotes the merchant, for example, such as through a link from the community program website to the merchant's website, use of the merchant's logo or brand on community program materials, announcements of merchant incentives at a community program event, etc.). A skilled reader will recognize the variety of options that may be used to communicate an incentive to participants and/or third parties.

In one implementation, the marketing program may provide an automated online boarding means or a manual boarding means. For example, a merchant having an existing registered merchant identification with another pre-registered financial program may be provided with a registration interface by the present marketing program, for example, such as a web page. The interface may include a means whereby merchant transactional information and preferences may be imported from the pre-registered financial program to the marketing program. The imported information may be stored in the data storage area as part of the merchant profile.

As an example, the imported information may include the merchant identification (such as an identification number), credit card information, or automated clearing house billing information already linked to a database. Additionally, the one or more forms of payment used with the pre-registered financial program may also be linked to the marketing program as tokens. the tokens may be used to track transactions made with the associated forms of payment.

The information regarding the location of one or more bricks and mortar locations of the merchant may be utilized to determine relationships between one or more community programs and the merchant, in particular any merchant location in the vicinity of the community program. The data mining tool, and in some instances the analytic mode, of the implementations may be utilized to provide a list of community programs occurring in the same location as one or more of the merchant's locations. A merchant may request a more general list as well, showing all community programs in a city, province, country, or other information.

A merchant may also request a list of members, based on a variety of criteria, including proximity of the location of a member to one or more locations of a merchant, member preferences, member age, or other member information. A skilled reader will recognize the variety of criteria that may be applied to a member search undertaken by a merchant, such as, for example, demographic or preference information as reflected in the marketing system data stored in the data storage area. This information may be utilized to determine the members that an incentive will be communicated to. The information may also be used to create new incentives.

In some implementations, a fee may be charged for any request for information or search submitted to the marketing system and/or administrator by a merchant. A skilled reader will recognize the variety of types of fees that could be charged, such as, for example a fee for each request, a fee per lines on a report, and other types of fees.

In one implementation, the data mining tool, and in some instances the analytic mode, may be utilized to provide suggestions of possible new incentives to merchants. The transaction linking facility may be utilized to provide analysis or evaluations that may also be applied by the data mining tool or analytic mode to generate new incentives and suggestions of new incentives for merchants. This feature of the implementations may utilize any of the data and/or information in the data storage area, it may also: recognize incentives utilized by merchants in the past; recognize the success of some past incentives; evaluate the success of an incentive and the community program that the incentive is to be used with; and further incorporate other information and criteria. The result may be one or more suggestions of incentives that a merchant may utilize at a particular point in time. It may be at the discretion of the merchant to adopt and utilize one or more of the suggested incentives, or not to adopt or utilize any of the suggested incentives. For example, a merchant may allow automatic approval of system generated incentives, and whereby the marketing system undertakes the approval of system generated incentives. A skilled reader will recognize that a variety of criteria and information may be utilized by such a feature of the implementations.

The incentive may provide an inducement for the member, or other customers, to visit the merchant's store locations (or online website) where the incentive is offered and redeemable. The merchant may thereby increase the number of customers, the notoriety of the merchant's store, sales, goodwill, etc. The incentive may also produce a benefit for the community program if it is linked to a community program by, increasing awareness of the community program, increasing attendance at a community program, increasing donations to the community program, etc. Specific benefits accruing to any of a community program, merchant, member and/or any intermediary may be recognized by a report, review, results, list, etc., provided by the data mining tool, or the transaction linking utility in some instances.

Incentives may be created to be redeemed upon a variety of events and/or activities. For example, an incentive may be provided to a member and/or an intermediary based upon a transaction. In this example, the incentive may be provided upon a transaction occurring, or may be provided to attempt to cause a transaction to occur. Such an incentive may be an opportunity for potential customers to save, win, and/or benefit community, for example by the incentive of a discount on a purchase price of a product or service to a member, a give-away to a member, a sweepstakes entry and/or a donation to a community program.

In one implementation, it may be possible for the incentive that is provided to a participant based upon a transaction to be different depending on various circumstances. For example, the incentive may be different for a participant who has had frequent transactions and/or recent transactions (e.g., frequent and/or recent transactions with a merchant, or group of merchants, or frequent transactions as a marketing program participant), then the incentive provided to a participant who is making a first transaction, makes infrequent transactions, or has not made a recent transaction. It may also be possible for a different incentive to be provided to participants based upon the total amount of the transaction (e.g., the money spent in the course of the transaction). Yet another possibility may be that a different incentive may be provided to a participant based upon the time of day when a participant makes a transaction. Basing an incentive on the time of day may help a merchant with products or services near the end of the business day to encourage the purchase of those products or services by participants. A different, augmented incentive may also be offered based upon other criteria, such as, for example volunteer hours with a community program, etc. A skilled reader will recognize that a variety of other events or activities may cause different incentives to be communicated to a participant.

As another example, incentives may also be provided based upon the completion of a survey by a participant. Such an incentive may be: a coupon that is electronically, or otherwise, provided to a participant after a survey is completed; a donation that is made to a community program upon the completion of a survey; and/or entry in a sweepstakes. It may be possible that more than one incentive may be provided to one or more participants upon the completion of a survey. It may also be possible for particular post-transaction surveys to even result in different incentives being provided to one or more participants in accordance with the answers provided in the survey. For example, the response to an experience rating question (e.g., a request to rate an experience as excellent, satisfactory or poor) could result in a participant responding that his or her experience was poor may receive a different incentive than a participant responding that his or her experience was excellent. In particular, a participant who has ranked his or her experience as poor on several post-transaction surveys (as may be recognized by use of the data mining tool of the implementations searching for data in historical surveys) may receive a different, augmented incentive. A skilled reader will recognize that a variety of other incentives may be provided to participants upon the completion of a survey.

As yet another example, incentives may be provided based upon a member having being geo-located, such as by a communication with the member's smart phone), as having entered and situated within a specific geographical location and/or zone. Such an incentive may be provided to one or more participants upon a member entering the parking lot of a shopping center, or any other geographical location and/or zone. The incentive may be related to the geographical location and/or zone, such as, for example a coupon for a merchant near to the zone, or a donation to a community program near the location. When this incentive from a particular merchant located within the zone is coupled with data indicating that the participant recently viewed a broadcast of a hyperlocal geo-target advertisement of the merchant, the certainty is increased that there is a link between the ad viewing by the participate and the participant conducing a transaction with the merchant in the zone. A skilled reader will recognize that a variety of other incentives may be provided upon a member entering a specific geographical location and/or zone. A skilled reader will further recognize that incentives may be provided to one or more participants based upon other events or activities as well.

The marketing system of the implementations may be operable by the merchant to generate incentives, to track transactions, and to provide other information relating to participants and community programs. The marketing system of the implementations may further be operable by the merchant to generate analytic information providing an evaluation of the success of past incentives and other activities of the merchant.

Intermediary Registration, Interface, and Functionalities

In one implementation, one or more intermediaries may register with the marketing system and thereby become participants. In one implementation, a participant, and particularly an intermediary, may be a search provider, financial card provider, one or more advertising associates, one or more charities, one or more public or private interest groups, marketing specialists, one or more community programs, or other groups or individuals.

Particular participants may offer unique and specific means of communicating an incentive to participants and/or third parties. Intermediaries may either work with such participants, or may provide unique and specific means of communicating an incentive to participants and/or third parties themselves.

In one implementation, particular marketing program access may be configured to benefit one or more intermediaries. The access provided to intermediaries, or groups of intermediaries, may differ. For example, an advertising associate may be granted access to parts of the marketing program that are necessary for the advertising associate to work with a merchant to produce an incentive. As another example, a marketing program interface may be configured to provide access to a charity to part of the marketing program. That interface may enable a member, or other participant, to select one or more charities and allocate contributions or donations to a charity, for example, such as in percentages or contribution tiers (where the first X dollars benefit supported organization A, the next Y dollars benefit supported organization Y, etc.), or a combination thereof, to one or more charities. A skilled reader will recognize that Implementations may involve a variety of other contribution priority schemes and/or a variety of marketing program interfaces to provide specific access to particular intermediaries.

In an implementation, one or more intermediaries may also disseminate intermediary affiliate information to the marketing program, or information regarding the marketing program and/or any merchant incentive to its affiliates. For example, an intermediary may send direct mail to its affiliates, which may represent its existing contributor base if the intermediary is a charity, or financial card holders if the intermediary is a financial card provider. A skilled reader will recognize that the affiliates of an intermediary may be different groups in accordance with the type of intermediary. The direct mail may contain a website address and a participant identifier which may be generated for and associated with the intermediary by the marketing program when the intermediary registers with the marketing program. Upon receipt of the direct mail, an affiliate may navigate to the website address, which may be a portal to the marketing program. The affiliate may thereby be granted temporary, and possibly limited access to the marketing system for a specific purpose.

The direct mailing from the intermediary may also provide the affiliate with the opportunity to register as a member of the marketing system. During the registration process, the affiliate may enter the participant identifier. The act of entering the participant identifier may cause the marketing program to automatically configure the new member's preferences in accordance with rules created to cause specific operations upon the entry of the participant identifier. For example, entry of the participant identifier may cause the member's preferences to include information to provide for specific interaction between the intermediary and the new member, the new member and a merchant, the new member and a community program, or any other interaction. The interaction may include a contribution by the member of certain benefits to the intermediary, or to another participant, at a specific period in time, or upon a specific event. The entry of the participant identifier may further have the result that it signals to the marketing program that new member's personal information may be transferred via an electronic link to information regarding the new member available from another data source. The transferred information may be stored as part of the new member's profile in the data storage area.

In one implementation, at the point of registration with the marketing program, a member may identify a relationship to the intermediary. In another implementation, the intermediary may post a list of validated people affiliated with its organization and the marketing system may match any registering member to an intermediary list.

Members Registration, Interface, and Functionalities

Individuals may register with the marketing program to become members. Registration could be facilitated by one or more registration means. For example, the individual may already be associated with a pre-registered program, such as, for example a financial program or a program of an intermediary whereby the individual is an affiliate of the intermediary. The pre-registered program may have one or more pieces of personal (identification) or demographic information associated with the individual available in a data source. A registration interface may be provided, this may include a page, for example, such as a web page, a page sent to an individual's mobile device (e.g., such as a smart phone, etc.), etc., whereby the individual approves joining the marketing program of the implementations. The registration interface may include a means for importing all personal or demographic information and preferences from the pre-registered program to the marketing program of the implementations.

In one implementation, if the pre-registered program involves one or more identifications the one or more identifications may also be transferred to the marketing program. For example, if the pre-registered program is a financial program one or more forms of payment linked to the pre-registered financial program could also be linked with the marketing program of the implementations to enable the marketing program to track transactions made with those forms of payment. In this manner the one or more forms of payment, or other identifications, may provide one or more participant identifiers linked to the new member for use by the marketing program. All registration data, including the one or more participant identifiers, may be stored in the data storage area, and may be accessible by the data mining tool.

As shown in FIG. 3, in another implementation, an individual 30 may register with the marketing program of the implementations by providing, through an interface 32, for example, such as a web page, a page provided on an individual's mobile device (e.g., such as a smart phone, etc.), or other interface, the individual's personal or demographic information. This information may include the individual's gender, the individual's age, the individual's location (e.g., home, workplace, or other location), as well as other demographic or personal information. The information may be stored in the data storage area and may be stored as a member profile. The marketing program may generate a participant identifier number for the new member. All registration data, including the participant identifier, may be stored in the data storage area 38 of the implementations, and may be accessible by the data mining tool.

In one implementation, a participant identifier card may be sent to the new member bearing the participant identifier number. A skilled reader will recognize that the participant identifier card need not be a physical card, but could be any form of payment device, including for example an RFID chip, a mobile phone, etc. depending on, for example, the supporting infrastructure of merchants.

The marketing program of the implementations may be operable to receive information from the member, at the point of registration, as well as at any other point while the member is a member of the marketing program of the implementations. Profile data may be collected by way of a variety of means, for example, such as a web page, a mobile device, a survey, transactions between members and merchants, or any other means. the profile data may include a set of rich data including information that is additional information to that which is gathered at the point of initial registration. the rich data may include a variety of information, for example, such as a list of the social networks the member is linked to, authentication information for those social networks (e.g. member names, passwords, etc.), preferred supported organizations and merchants (as described more fully below), transaction details for transactions undertaken by the member, survey data, any reviews generated by the member (e.g., merchant reviews, product reviews, or other reviews), updated location data, broadcasts that interleave hyperlocal geo-targeted advertisements for merchants that are viewed by the member, or other information. The information may be relevant to enabling optimal usage of the marketing program.

In one implementation, the data mining tool may be operable to identify members who may be inclined to utilize incentives defined by merchants. For example, the data mining tool may identify members who are likely to respond to sweepstakes (e.g., a merchant's offer for the member to win), who are likely to respond to discounts (e.g., a merchant's offer for the member to save), and/or who are likely to response to a merchant offer to make a donation to a charity located in the member's vicinity (e.g., a merchant's offer to benefit the local vicinity). This identification process may occur in accordance with the rules of the marketing program and/or the analytic mode, and may be based on administrative criteria, for example, such as demographic targeting of incentives.

The loyalty engine of the implementations may be operable to communicate the merchant incentive to the identified members.

A skilled reader will recognize that the architecture of the marketing program may enable shielding of the personal information of all members from individual merchants. Shielding may be the result of the application of a security system linked to or otherwise integrated with the architecture of the marketing program and in particular with the transaction linking facility, the data mining tool and the data storage area. The marketing program administrator may be in control of the personal information and may be the sole party having direct access to such personal information. The personal information of a member may be accessed by the data mining tool, but any review, report, list, results or other data generated by the transaction linking facility, data mining tool or analytic mode, may be devoid of identifiable personal information, for example, any results of the data mining tool may be anonymized.

The loyalty engine of the implementations may be operable to permit a member to create a review of a merchant or product. The loyalty engine may further be operable to permit other participants to create reviews as well. The reviews may be created based upon a template, or in response to rules of the loyalty engine, so that the member views a template, or a set of questions and merely responds to the template or questions. The template or questions may be accompanied by an option for free-form creation of a review, such as a space where the member may type a review, or portion of a review. Reviews may be available through the marketing program so that other participants may access the reviews. For example, reviews may be available on an electronic bulletin-board, via specific webpages, via a search, or through any other means. In some implementations a member may be provided with an incentive or other reward by the marketing system upon the creation of a review.

In one implementation, one or more questions on a survey may be dynamic and may be generated to be specific to a member. For example, one or more survey questions to be included on a survey to be provided to a specific member may be generated based on data relating to that specific member stored in, or accessible by, the marketing program. As an another example, one or more survey questions to be included on a survey to be provided to a group, class or category of members (for example, such as a group of boarded members, or other groups, classes or categories of member) may be generated based on data relating to the specific group, class or category of member stored in, or accessible by, the marketing program. In still another example, one or more survey questions may be generated to gather information regarding behavior of users or members and may be used as a source of information that provides a richer underpinning to consumer behavior analytics of the marketing program, in particular behavior relating to a transaction that may facilitate the analysis of the likelihood of a link between behavior of a member or a user, such as the member's broadcast ad viewing activity, and a transaction. A skilled reader will recognize the other uses of survey questions directed to extract information that may be analyzed to produce behavioral data relating to a member or a user.

Yet another example of specifically generated survey questions may include questions relating to a member's broadcast ad viewing activity that the marketing program matches to the transaction with a low, moderate, high or other level of certainty, as described above. As another example of specifically generated survey questions these may include questions generated after a member provides negative review regarding a merchant. A survey generated upon a subsequent transaction involving the member and the merchant may include questions that are devised to indicate whether the experience of the member during the transaction with the merchant improved during the subsequent transaction as compared to the transaction for which the member provided a negative review.

In implementations, the marketing program may be operable to support contribution priority schemes. The following represent examples of possible contribution priority schemes that may be provided in implementations. As one example, the marketing program interface may be operable to allow a member to modify his or her contribution preferences either at any time, or after particular periods of time. Another example is that the marketing program interface may be operable so that a community program, a foundation or other disseminating entity may register as an intermediary of the implementations. A member may provide a benefit (e.g., a donation or other benefit) to one or more intermediaries (e.g., the community program, the foundation or other disseminating entity), either directly, or through a merchant.

Figure 4:
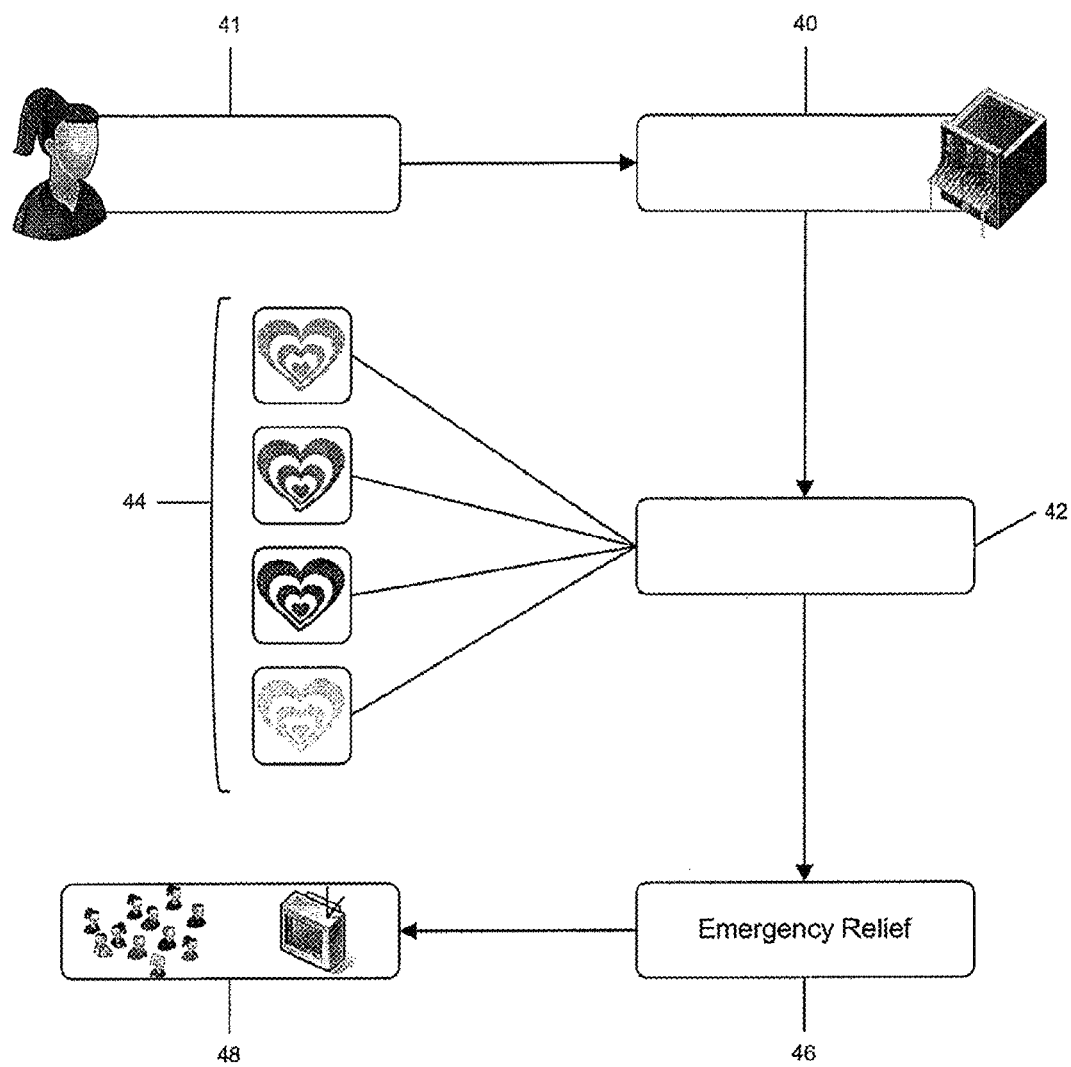
FIG. 4 is a systems view of a transfer of donations by the marketing system.

For example, as shown in FIG. 4, the benefit may be generated based upon a transaction between a member 41 and a merchant 40 in accordance with a merchant incentive, such as an incentive that provides a donation to an intermediary based upon a transaction. Once the benefit is received by the intermediary 42 (e.g., the community program, the foundation or other disseminating entity) the intermediary may either accept the benefit, for example if the intermediary is a community program. Or, if the intermediary is not a community program or other group that is to receive any benefit, then the intermediary may disseminate portions of, or the whole of, the benefit to one or more organizations 44, for example, such as charities, community programs, etc. The intermediary may also determine in some instances to redirect portions of, or the whole of, the benefit to an organization such as an emergency relief organization. The decision to redirect the benefit, or portions thereof, in this manner may be due to an emergency (e.g., such as the Haiti earthquake). Information outlets 48, for example, such as the media and social networks, etc., may disseminate information about the support for the organization 46 and build goodwill for the merchant.

In another implementation, a member may choose to match one or more donations that are generated based upon transactions with merchant stores. For example, the member may indicate to the marketing program that: all donations based upon transactions involving the member should be automatically matched by the member through the operation of the marketing program; that donations based upon transactions involving the member pertaining to one or more specific community programs, to one or more specific merchants, or to all community programs and/or merchants, during a specific period of time (such as during a period of emergency, during a particular campaign of a community program, or during any other period of time) should be matched automatically by the member through the operation of the marketing program; or that donations based on transactions between the member and one or more specific merchants should be automatically matched by the member through the operation of the marketing program. A skilled reader will recognize that other options for a member provide a matching donation through the operation of the marketing program may also be possible.

In yet another implementation, an intermediary may choose to match donations generated in one or more regions. For example, the intermediary may indicate to the marketing program that: all donations based upon transactions involving all merchants should be automatically matched by the intermediary through the operation of the marketing program; that donations based upon transactions pertaining to one or more specific community programs, to one or more specific merchants, or to all community programs and/or merchants, during a specific period of time (such as during a period of emergency, during a particular campaign of a community program, or during any other period of time) should be matched automatically by the intermediary through the operation of the marketing program; or that donations based on transactions involving one or more specific merchants should be automatically matched by the intermediary through the operation of the marketing program. A skilled reader will recognize that other options for an intermediary to provide a matching donation through the operation of the marketing program may also be possible.

As yet another example, the marketing program interface may provide to the member one or more intermediary codes that, when entered by the member into the interface, could automatically configure particular dissemination rules whereby one or more specific benefits may accrue to one or more intermediaries, charities, community programs, etc. The dissemination rules may be recognized by the loyalty engine.

A skilled reader will recognize that these examples are not exhaustive, and other possible contribution priority schemes and specific interfaces for particular intermediaries may be provided. The contribution priority schemes of the implementations may be operable to produce a transparent, accountable transfer of donations or other benefits.

Survey, Review, List, Report, Etc. Generator

To aid in the collection of data stored in the data storage area, and the generation of reviews, reports, lists, results and other data generated by the transaction linking utility, data mining tool or analytic mode, the loyalty engine may generate surveys to be completed by members or other participants of the marketing program of the implementations. Such surveys may provide questions specifically created to derive information directed to the function of the marketing system, to particular transactions or transactions generally, to any merchant, intermediary or community programs, or to any other information relevant to the marketing system. Such surveys may be provided when a participant registers with the marketing system, or at any other point in time, such as after a transaction, following a merchant incentive offering, etc. Surveys may be provided to participants by a variety of means, including through web-pages, upon logging into the marketing program, via a mobile device, as a printed survey at the merchant location, or via any other means.

In one implementation, a post-transaction survey may be provided to a member involved in a transaction. The post-transaction survey may include a variety of questions, but may particularly include questions regarding the influences that led to the transactions. For example, was the transaction influenced by any incentive offered by the merchant by way of having viewed a broadcast of a hyperlocal geo-targeted advertisement for the merchant's brick and mortar store. A skilled reader will recognize the variety of questions that may be included in a post-transaction survey.

Reviews, reports, lists, results, etc., based on the surveys can be generated for merchants. For example, survey results that indicate particularly good or bad service by a specific merchant, or particularly good or bad quality of a product, or any other information, may be identified by the data mining tool and the information may be summarized, or consolidated into a review of the merchant, product, or other element to be reviewed. In this manner reviews may be automatically generated by the marketing system, alternatively reviews may be generated upon request by a participant or third party. Reviews may also be created by participants, based upon a template or in a free-form manner.

Another example of a use of such information is that when other members are searching for a merchant these members may access or be provided with a copy of a review regarding a particular merchant. A skilled reader will recognize that the use of reviews, reports, lists, results, and other documents may be wide and varied.

Local, Regional, and/or National Applications

In some implementations, the marketing programs may operate to produce local benefits, regional benefits and/or national benefits to the participants. For example, the implementations may be operable to permit a member to participate in the marketing program in one location, region, nation, etc. Yet the implementations may further permit a member who is travelling, relocating, or is otherwise interested in another location, to participate, automatically, or upon request, in the marketing program in another location, region, nation, etc. Merchants that have an international, national, multi-regional, or multi-locational presence may be associated with the marketing program. Specific store locations associated with a merchant may be recognized as existing within a specific location, so that in the locational, or regional operation of the marketing program the stores locations may be associated with the corresponding community programs of the marketing program.

For example, an incentive may be applicable to one or more store locations of the merchant. An international incentive may be applicable to a community program that is international, such as Right to Play™, and the international incentive may be honored by all of the merchant's store locations in the world. A national incentive may be applicable to a national community program, such as the Canadian Olympic Torch Relay™, and the national incentive may be honored at all of the merchant's store locations within a particular nation (e.g., all Canadian store locations of The Bay™). A regional incentive may be applicable to a regional community program, such as the Vancouver Olympic Games™, and the regional incentive may be honored at all of the merchant's store locations within a particular region (e.g., all store locations of The Bay™ in the City of Vancouver, British Columbia, etc.). Smaller locational incentives may also be provided that are applicable to a more localized location, such as a festival held in a park, and the localized incentives may be honored at all of the merchant's store locations within the specified location (e.g., store locations bordering the park where the festival is held, store locations on a street where a street festival is held, etc.).

A skilled reader will recognize that merchants of various sizes may participate in the marketing program of the implementations. The marketing program may be operable to permit a community program and/or specific merchant store(s) to associate with the marketing program and receive benefits. Neither the community program nor the merchant need have a national presence. Merchants and community programs that do not have a national presence may enjoy lower national public recognition. This lower public recognition may have resulted in reduced benefits to the community program and/or local merchant store(s), since neither may be recognized beyond a small location and therefore a small number of donators/contributors/attendees/consumers/etc. Participation in the marketing program of the implementations may provide participants with the benefit that members gain awareness of community programs and/or merchant store(s) occurring in their local area. This awareness may augment the notoriety of the community program and/or the merchant store(s). The awareness may further have other benefits, described herein, including increased attendance at a community program and/or increased sales at a merchant's store.

As described in this patent application, the implementations may have a variety of implementations, one such embodiment may involve a merchant committing to donate a portion of its revenue from transactions at one or more store locations involving members to a community program, the community program being local to the merchant store(s) where the transactions take place. The donation portion of the revenue amount may be based on various parameters. These parameters may be tracked by the marketing program. The marketing program may operate so as to utilize the tracked transaction information to calculate the amount a merchant is to pay to a community program in accordance with the promised donation. The donation amounts may additionally be trackable and reportable in a clear manner upon request, so that the transfer of the donation amount is obvious and is possibly unencumbered by transfer fees. In this manner this implementation may enable community programs and merchants to participate in the marketing program in a manner that is cost effective to all parties of the marketing program.

In another implementation, the marketing program may be operable to permit a merchant to offer different contributions to designated community programs. This may involve a merchant providing multiple incentives at one or more store locations to members, and at least two of the multiple incentives being associated with different community programs. The marketing program may be operable to track the multiple incentives and/or the different contributions by merchants to designated community programs. The factors that may be tracked by the marketing program, the factors may determine the type of contribution to be made by the merchant to a community program and/or the merchant incentive to be applied to a transaction, may include one or more of the following: the time of day when a transaction occurs; the day of the week when the transaction occurs; any member demographics; any transaction history; any incentive details, for example, such as a coupon, provided at the time of the transaction; and the community program details. A skilled reader will recognize that other factors may be utilized by the marketing program to define and track contributions by merchants to community programs and/or merchant incentives.

Boarding Means

In one implementation, to facilitate batch customer acquisition a boarding means may be provided to operate to allow a third party and/or intermediary to associate itself with the marketing program. The intermediary may be, for example, an online retailer having a customer base with user accounts, an online payment provider also having a customer base with user accounts, an online advertiser and/or search provider, a cable or satellite broadcast subscription service having a customer base with subscriber user accounts that include viewing habits, demographics, and personal preferences of each subscriber household and of each individual within the subscriber household, or any other online presence having a customer base with user accounts. The intermediary could also be a company and the members to be acquired by the marketing program could be the employees of the company. The marketing program may make the boarding means accessible to the intermediary by, for example, a user interface for creating the association. The intermediary may desire to associate with the marketing program for a plurality of purposes, including: increasing its own customer base to include the marketing program's members; altruistic purposes; to increase its own charitable giving for tax purposes; or to appeal to consumers and generate marketplace goodwill.

In one implementation, the boarding process may operate so that once the intermediary associates with the marketing program, the user accounts of the intermediary may automatically become associated with the marketing program. Once the user accounts are associated with the marketing program each of the users is recognized as a new member of the marketing program. The marketing program may then be operable to provide a user interface for these new members, whereby the new members may complete their profiles. The provision of this user interface may occur in any of the manners described above, for example, such as through the provision of a survey, through the provision of a particular web page, or other means. A skilled reader will recognize that It this boarding process, and the acceptance of new members generally into the marketing program, may increase the awareness of the marketing program and may significantly increase its member base. As described above, this may produce benefits for the merchants, community groups, and other intermediaries participating in the marketing program.

Participant Location Facilitator and Mapping Function

All members of the marketing program may be identified by the loyalty engine of the implementations as existing in a particular location. This location may be recognized as being in the vicinity of areas associated with particular community programs. In accordance with the scope of the community programs this area may have a perimeter that encompasses a wide or narrow territory. For example, the member may be recognized as existing in a location that is within an area that is a neighborhood, or an area that is a country. In implementations, it may be possible for the marketing program to recognize a member as existing in a single location (e.g., a home address), or multiple locations (e.g., a home address, a work address and/or other addresses, such as a cottage address).

In one implementation, a mapping means may be operable to allow a member or other participant to request a map showing merchants that are participants of the marketing program located in, or near to, an area that encompasses a location of the member. The marketing program may utilize the data mining tool to identify a location of the member from the member profile (e.g., the home address of a member), the marketing program may ask the member to choose a location if multiple locations are in the member profile (e.g., choose a home address or a work address of the member), or the marketing program may accept a location inputted by the member as the location of the member. The area of the map may be adjustable to show various sized areas. The marketing program may also be operable to allow a member to specify categories or types of merchants to be shown on the map (e.g., restaurants, clothing stores, hardware stores, etc.). A skilled reader will recognize that other parameters may be included in the requested query.

The implementations may generate a map based upon the member map query. The data mining tool may be utilized to identify any merchants and/or community programs located within the area of the map.

Figure 5:
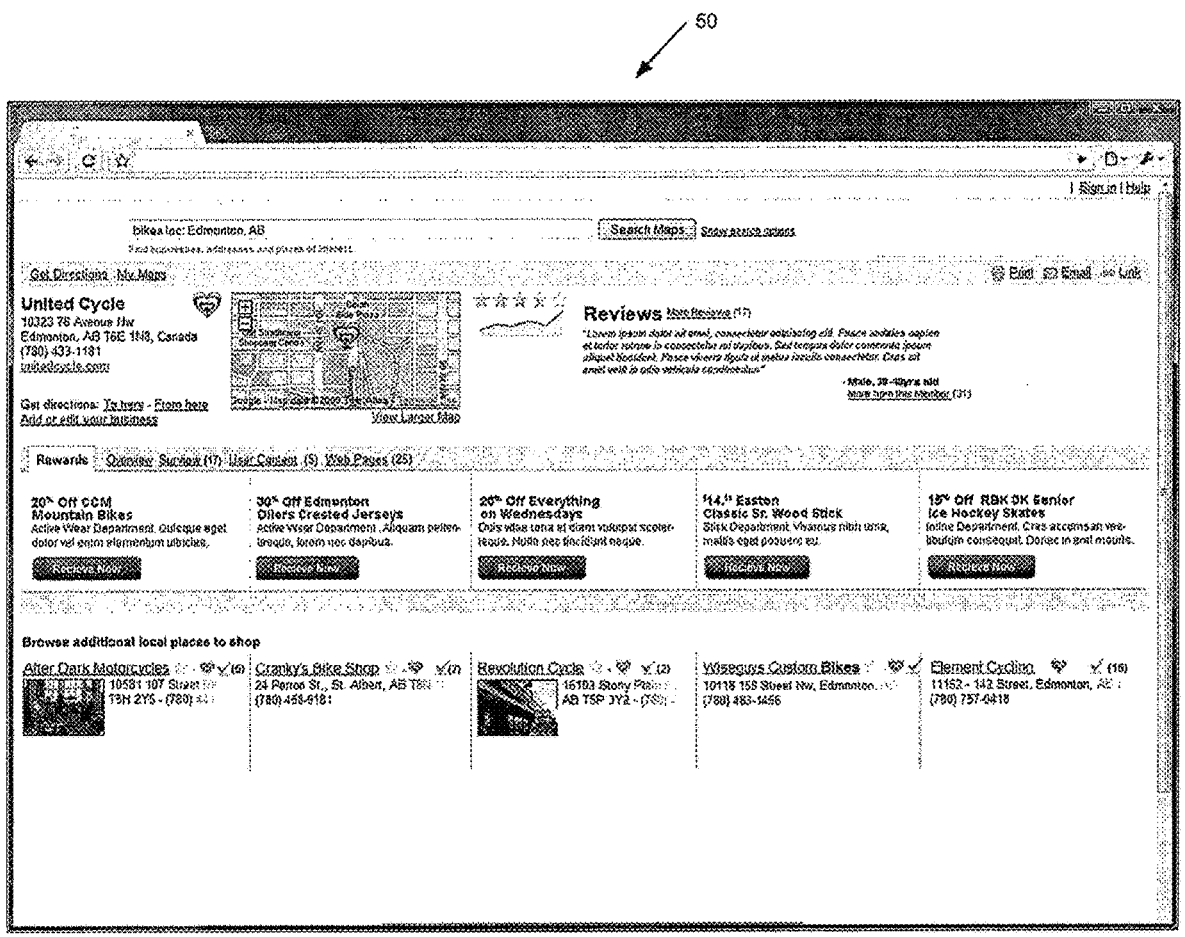
FIG. 5 is a screen view of a merchant information web page.

An example of a map 50 of the implementations showing merchant information is shown in FIG. 5. This is just one example of possible maps that may be generated by the implementations, and a skilled reader will recognize that other map displays or other map outputs may be possible.

Maps generated by the implementations may show the merchant store(s) existing in, or near to, a location or area.

The map may additionally show the location of any community programs occurring at the time when the query is sent (e.g., such as a street festival in the area, or a clothing drop-off located on a street). The map may have other facilities as well. For example, the map may indicate, may be by way of a symbol or color indicator, that particular merchants are offering merchant incentives.

The map may also permit information regarding merchants, community programs and/or merchant incentives to be accessed by a participant, for example, such as by a display that appears when a mouse is held over where the merchant and/or community program is shown on the map, or by a clickable access to information (e.g., clicking the merchant location accesses the merchant web page or a summary of merchant information, etc.), or other information access and/or display means. The displayed or accessed information may include the location of a merchant store and/or a community program, the dates when a community program is occurring, the date(s) for a merchant incentive, and any other information. The displayed or accessed information may be provided in accordance with rules of the marketing program. A skilled reader will recognize that Implementations may include other options of visually displaying or accessing information regarding merchants, community programs and merchant incentives in a specific location.

Still other implementations may be operable to recognize the location of a member at a point of time. For example, a GPS system on a mobile device in the possession of a member or other participant, such as may have a TV Everywhere app for viewing a broadcast of a hyperlocal geo-targeted merchant advertisement, may send location information to the marketing program. In this embodiment the marketing program may provide a member with information regarding merchant incentives pertaining to the location of the member at a point in time. (For example, a member who travels on vacation to New York City may be recognized by the marketing program as existing in New York City because the marketing program can read the location of the member based on a GPS feature or application linked to the smart phone in the possession of the member. The member may then submit a query to the marketing program requesting information about merchant restaurants local to the location of the member in New York City at the time of submitting the request. The marketing program may generate a map showing merchant restaurants in the vicinity of the location of the member submitting the request in New York City. The function and capabilities of the map may be as are described above.)

Data Storage Area and Data Mining Tool

The data mining tool of the implementations may be utilized to generate a wide variety of reports, reviews, lists, results, search displays and other data from the data stored in the data storage area. In some implementations, in order to produce certain outputs, the data mining tool may also engage the transaction linking utility to generate some information to be provided as part of the output.

The data stored in the data storage area may include information pertaining to past, present and/or future community programs. This information may be gathered by the administrator, as described above. The community program information may link a community program to a specific area or location, and may include details of the community program (e.g., dates, times, location(s), events, summary of community program, etc.).

The data may also include information regarding participants in the marketing program (e.g., merchants, members and intermediaries). This participant information may include information generated at the point of registration, as well as information collected at later points in time, for example, such as through surveys, tracking of participants that viewed a broadcast containing a merchant's advertisement, etc.

The data may further include details of transactions between members and merchants. Such transaction details may include any merchant incentive that was applied to the transaction. If an incentive was applied the community program that the incentive was applicable to may also be included in the data.

In one implementation, a link may be produced between the transaction data and the community program information already existing in the data storage area. The data mining tool may be operable to limit information appearing on any report, review, list, results, etc., so that such information cannot include any personal information pertaining to any participant of the marketing program. Alternatively, the data mining tool may generate reports, reviews, lists, results, search displays, etc., in accordance with rules whereby the data mining tool anonymizes any personal information utilized to generate the reports, reviews, lists, results, etc. A skilled reader will recognize that other methods and means may be utilized to ensure that personal information is not disseminated in any report, review, list, results, etc. Additionally, a skilled reader will recognize that the rules for limiting the dissemination of personal information may be in accordance with privacy legislation pertaining to a particular jurisdiction, may provide limitations representing several levels of security, or may be set to a standard that is stricter than privacy legislation. The standard of privacy imposed on the information may be chosen and applied at the discretion of the administrator.

A skilled reader will recognize that other information regarding the transactions, participants, merchant incentives, donations, and community programs relating to the merchant program may be collected by the loyalty engine and stored in the data storage area.

In one implementation, a data access management utility may be utilized to organize the collection of data, the storage of data in the data storage area, and the access of data in the data storage area. The data access management utility may be operable to restrict direct access to the data to the administrator, for the purpose of protecting data integrity and privacy of personal information. The data access management utility may further restrict access to particular data by the data mining tool for particular types of information generation and/or for specific participants. In particular, the data access management utility may recognize that intermediaries have limited participation in the marketing program and therefore that any query or request for information instigated by an intermediary may not access, even for reporting purposes, particular data stored in the data storage area.

In one implementation all of the information existing in the data storage area may be accessible by the data mining tool for the purpose of generating reports, reviews, lists, results, summaries, overviews, and any other information. The reports, reviews, lists, results, search displays, summaries, overviews, and other information may be generated in accordance with rules of the loyalty system. For example, rules may be created whereby a merchant transaction report is generated at a regular interval (e.g., monthly, etc.) for each merchant showing the transactions between merchants and members during a specified period of time.

Rules may also be created to be used for the generation of reports, reviews, lists, results, summaries, overviews, and other information upon request. For example, rules may be created whereby a merchant may request a list of members existing in the vicinity of a merchant's store location.

In some implementations, free-form queries may also be undertaken by the data mining tool, whereby specific information may be gathered for a particular purpose or application. For example, after a merchant incentive is completed a free-form query may be created to generate information pertaining to the merchant incentive. This information may be reviewed to glean important understanding of the success of the merchant incentive. A report, review, result, etc. may be further utilized to develop new merchant incentives.

Figure 6:
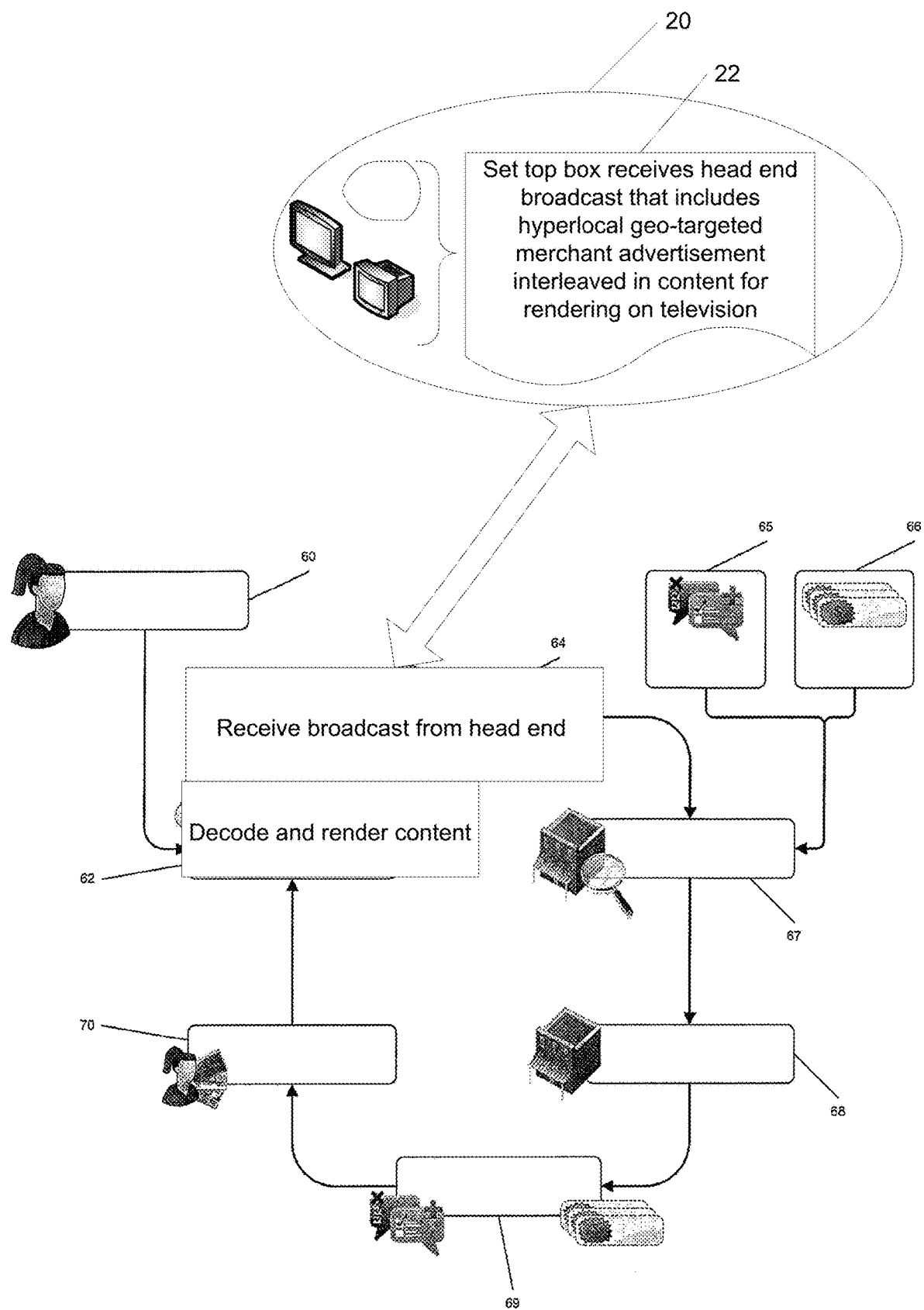
FIG. 6 is a systems view of a process to link a transaction between a merchant and a resident of the same vicinity to the resident's viewing of the merchant's broadcast advertisement on a television receiver.

For example, as shown in FIG. 6, a participant 60 views at processes 62-64 a broadcast for display on a television 20. The broadcast includes a hyperlocal geo-targeted advertisement 22 that is rendered only to televisions located in a particular vicinity. The advertisement is for a merchant who is located in the particular vicinity. In one implementation, an advertising cost is assessed by the broadcaster, such as a local TV station, to the merchant in the particular vicinity. In one alternative of this implementation, the advertising cost is inversely proportional to the navigation time from the location of the television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

It may be possible for a participant to conduct a transaction 70 with the merchant, such as a transaction whereby a participant purchases an item from a merchant, and the transaction may involve a merchant incentive. A skilled reader will recognize that this is just one example of how the request for information or data query may function and that other functions are possible.

Analytic Mode

In one embodiment the data mining tool may include an analytic mode. The analytic mode may be operable to cause the data mining tool to perform an analysis based upon the data that the data mining tool accesses. The analytic mode may incorporate rules of the marketing system, or may be distinct from rules of the marketing system.

The analytics may cause the data mining tool to produce information that provides more than a display of a subset of the data stored in the data storage area. The analytic mode may access and incorporate any of the information collected and gathered by the marketing program and stored in the data storage area. The analytic mode may therefore be utilized to reflect information: in response to a particular advertisement, merchant incentive or other aspect of the marketing program; providing behavioral data relating to member transactions; and/or pointing to member interests which may be the basis for directing particular advertisements or merchant incentives to individual members or member groups. The analytic mode may be utilized to provide information to be used to develop new merchant incentives, marketing and philanthropic strategies for the marketing program participants and/or the wider community. Analytic mode results may reflect results for a particular area, which may be a city block, a neighborhood, a city, a street, a region, a county, a province or state, a nation, etc., to reflect results for widening ranges of participants and locations.

For example, the data mining tool may produce a list of members existing in a particular location based upon a query, the query being either a free-form query or a rule(s)-based query, if the analytic mode is not engaged for the data mining tool. If the analytic mode is engaged the data mining tool may analyze or otherwise filter, re-represent, consolidate or manipulate prior to presenting the generated data in a report, review, list, overview, summary, result, etc. A skilled reader will recognize that the analytic mode can undertake a variety of data analysis techniques, including algorithms, calculations, reviews, filters, consolidation, manipulation, re-representations. The analytic mode may further involve one or more rules of the marketing program. Additionally, the analytic mode may be utilized to produce reports, reviews, lists, overviews, summaries, results, etc. on a regular basis, or upon demand, as described for the data mining tool generally above.

The benefit of the analytic mode may be to generate particular data, provided in a specific format, that may be utilized for a precise purpose. For example, the analytic mode may generate information that provides customer demographics for a particular merchant incentive. The customer demographics may be utilized to develop new types of targeted merchant incentives. A skilled reader will recognize that variety of types of information may be generated by an analytic mode and that a variety of uses may be made of such generated information in the context of the marketing program.

The data mining tool, with or without the analytic mode engaged, may be utilized to provide information to participants of the implementations that may aid in creating links between merchants, customer programs and/or specific customer demographics. For example, the data mining tool may be utilized to generate a list of members who may make use of a particular merchant incentive offered in one or more specific merchant store locations. Such a list may be utilized to provide instructions to the loyalty engine to disseminate a communication (e.g., via email, to a smart phone, etc.) to the members included in the list regarding a merchant incentive. Alternatively, the loyalty engine may recommend that the incentive be disseminated in a broadcast of a hyperlocal geo-targeted advertisement that is likely to be viewed on television receivers by a select from of member in a particular vicinity.

As another example, the data mining tool may be utilized to generate a list of members and/or merchants existing in a particular location who may be interested in attending a specific community program event. Such a list may be utilized by a community event to produce a guest list to whom invites may be disseminated (e.g., via email, to a smart phone, via the regular post, etc.) to the member invitees. Alternatively, the data mining tool may produce a result that suggests that information pertaining to the specific community program event be disseminated in a broadcast of a hyperlocal geo-targeted advertisement that is likely to be viewed on television receivers by a select from of member in a particular vicinity.

As yet another example, the data mining tool may generate a display of a set of reviews of a particular merchant to a third party considering becoming a member of the marketing program. Such a list may be utilized by the third party to decide whether to become a member of the marketing program or not, or whether to visit a particular merchant or not.

A skilled reader will recognize that a variety of information may be generated by the data mining tool, with or without the analytic mode engaged, and that the breadth of the information generated may be directly affected by the depth of information stored in the data storage area. Storing a wide variety of information in the storage data area, which may be portioned for storage purposes, but wholly accessible by the data mining tool, provides data having significant depth for the data mining tool to utilize. The implementations is therefore operable to provide not only a wide variety of information, but also detailed information and specific targeted information to be utilized for many purposes.

Transaction Linking Utility

A transaction linking utility may be operable to determine links between a transaction with a merchant and a member or user viewing of a broadcast that interleaves a hyperlocal geo-targeted advertisement for the merchant. In some implementations, the merchant's advertisement may a Merchant Advertisement Matrix Code. The determination of links may be qualified, to indicate a level of likelihood or certainty of a match between the member or user TV viewing and a transaction. For example, the transaction linking utility may be operable to determine that the merchant's ad for a product that was viewed by a member via a broadcast may have resulted in a particular transaction occurring. In this manner the transaction linking utility identifies a link or a match between the ad viewing and the transaction by the member. The match may not be wholly certain in each case and therefore the transaction linking utility may further be operable to indicate a level of certainty or likelihood that the match or link between the ad viewing and the transaction is accurate. Many factors can be utilized to determine the level of certainty or likelihood. A skilled reader will recognize that a variety of member or user behaviors or attributes may further be factors in the determination of the transaction linking utility.

The transaction linking utility may be operable in some implementations to generate behavioral data regarding activities or behaviors of members or users in relation to transactions. The transaction linking utility may be utilized in conjunction with the data mining tool and in some cases the analytic mode to generate specific data for a variety of purposes relating to transactions.

Method

A skilled reader will recognize that a variety of methods may be applied in the implementations. The description below provides some possible examples of methods of the implementations.

Registration of Participants and Data/Information Collection

The method of Implementations may involve an administrator collecting information regarding community programs. The administrator may utilize automated search means and/or manual search means to locate community programs. Information regarding the community programs, for example, such as the dates, times, events, purpose of the community program, may be stored in the data storage area. The information collected regarding each community program may include details necessary for an individual to attend a community program, as well as details regarding the purpose, history or aims of the community program. All community program information may be stored in the data storage area. The information collected and stored for each community program may include details regarding the location where the community program operates or events relating to the community program are held.

The community program information may be displayed in a variety of means, such as in a list of community programs, a calendar showing the dates of community program events, or in any other means.

Members and merchants may register with the marketing program of the implementations. The process of registration may involve the members and/or merchants providing certain information to the marketing program. This information may be saved in a profile for each member and/or merchant. The profile information may include a variety of types of details, but may also include a participant identifier. The participant identifier may be retrieved from organizations or programs the merchant and/or member is previously involved in, for example, such as a BIN number, a financial card number, an identifier for a set top box or like component by which a participant receives and views television content that is broadcast from a cable or satellite head end, or a transaction number. Alternatively, the participant identifier may be randomly generated and applied to the profile by the marketing program. Additional information may be collected regarding participants due to activities (e.g., transactions, broadcasts of interleaved hyperlocal geo-targeted advertisements for merchants that were viewed by members, reviews, etc.), and/or the provision of additional information by participants (e.g., by direct input, survey responses, etc.).

Some members may be automatically boarded (i.e., auto-boarded) into the system, so that such members are not required to individually enter initial profile information. Profiles information may be transferred to the marketing program for members that have previously been involved with other organizations or programs form the organizations or programs. If boarding occurs the individual member will be required to activate the profile in order to register with the marketing program.

Figure 7:
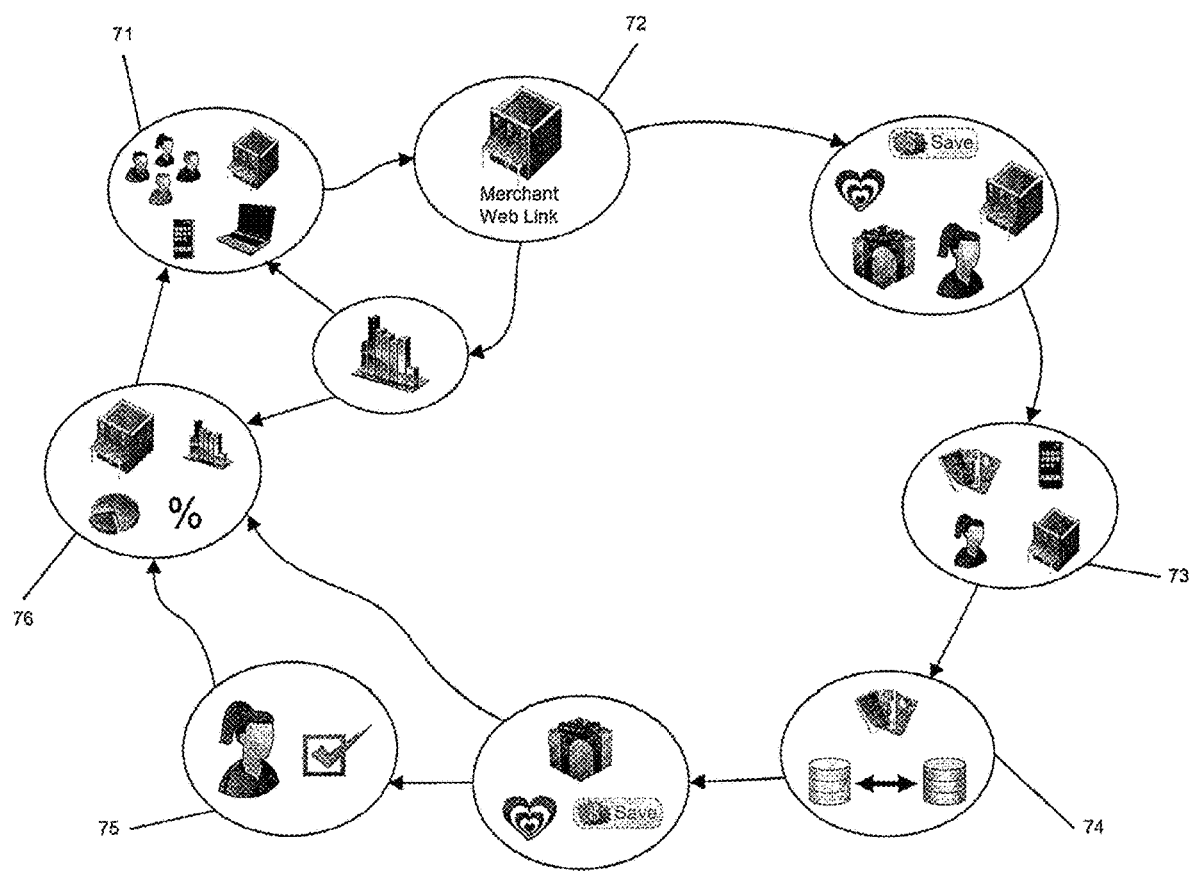
FIG. 7 is a view of the flow of one embodiment of the marketing program generating members through a boarding process.

A boarding process, such as is shown in FIG. 7, may be utilized for example for employees of a company or a financial card provider. In this example, the company or financial card provider may decide to join the marketing program, for example, the company or financial card provider may join as an intermediary and thereby have partial participation in the marketing program. The company or financial card provider may make available information regarding all of its employees or financial card holders for boarding purposes. The employees or financial card holders may be provided with a registration activation code. Once the employee or financial card holder provides the registration activation code to the marketing program the member registration is complete for the employee or financial card holder who then becomes a member 71 of the marketing program. In this example, the participant identifier for the members could be an employee number or a financial card number. This information would be transferred in the boarding process. Alternatively, an employee or financial card holder may be required to watch an informational video regarding the marketing program, or view other information prior to becoming registered as a member. A skilled reader will recognize the variety of means of registration that may be utilized to register a boarded member with the marketing program.

After registration members may access merchant information 72 regarding one or more merchants through the marketing program, as described in this specification. The member may request and access specific information regarding a merchant, for example, such as information regarding merchant products, services and/or incentives. The member may also review information pertaining to the member, such as any amount of rewards (such as reward points) accumulated by the member, member profile information, etc. The member may engage in transactions with the merchant 73, as a result of accessing information regarding a merchant or for other reasons, and the transactions may occur online or offline. Information regarding the transaction may be transferred to the marketing program 74, and the transaction linking utility may be utilized to confirm that a member is eligible for a merchant incentive. The matching may utilize details of the transaction or other member details stored in the data storage area in conjunction with the transaction details, for example, such as merchant incentive information, the identification of a member, financial card information, or other information, to identify when a member is eligible for a merchant incentive.

The transfer of information from a merchant to the marketing program for an online transaction may occur in a variety of ways. For example, the information may be transferred via an information link existing between the marketing program and the online site where the transaction occurred. If the online site where the transaction occurred is accessed through the marketing program website, or through a search engine linked to the marketing program, an information link may automatically transfer the information regarding the transaction to the marketing program. In other instances, the marketing system may be capable of searching the merchant online transaction information stored in the merchant's server to identify transactions involving members of the marketing program or any merchant incentive. In one embodiment, upon a merchant transaction a notification may be sent to the marketing system to search the merchant's transaction information, or the search may occur at any interval or time after the transaction. It may also be possible for the merchant site to transfer information to marketing system at regular intervals when there is relevant transaction information reflecting transactions involving either members or merchant incentives. Any transfer of transaction information or search of transaction information may occur either in real-time in relation to the transaction, or at any time after the transaction occurs. A skilled reader will recognize that a variety of other means and/or methods of transferring transaction details to the marketing program during or after an online transaction occurs may be applied in the implementations.

The transfer of information from a merchant to the marketing program for an offline transaction may occur in a variety of ways. A POS terminal in a brick and mortar store of the merchant may be operable to transfer transaction details to the marketing program, either during a sale, for example in real time, or after one or more sales as an upload. Alternatively, the merchant may have a system whereby an electronic report of the transactions is generated and transferred to the marketing program either automatically or upon a specific activity of the merchant. As yet another option, the marketing system may provide a screen whereby a merchant may fill-in transaction details and thereby provide the transaction details to the marketing system. A skilled reader will recognize that a variety of other means and/or methods of transferring transaction details to the marketing program during or after an offline transaction occurs may be applied in the implementations.

Implementations may involve other means of transferring online and/or offline transaction information to the marketing program. For example, a transfer means may be integrated with a POS terminal used in the transaction, whereby the information is captured by the POS terminal and transferred to the marketing program by the POS terminal. As another example, data feeds may be generated by one or more merchant acquirer or payment processor (for example, such as Moneris™) and the merchant acquirer or payment processor may transfer the data feeds to the marketing program. As yet another example, data feeds may be generated by one or more card issuers (for example, such as the Royal Bank of Canada™, Toronto Dominion Bank™, etc.) and the card issuer may transfer the data feeds to the marketing program. As still another example, data feeds may be generated by one or more card associations (for example, such as Visa™, MasterCard™, etc.) and the card association may transfer the data feeds to the marketing program. As yet another example, data feeds may be generated by one or more data aggregators and the data aggregator may transfer the data feeds to the marketing program. A skilled reader will recognize that other options may be available for transfer of information to the marketing program, including any combination of any of the examples provided above.

As the capture and storage of transaction details, for both online and offline transactions, may be critical to the effectiveness of the implementations, the marketing program may incorporate a means of obligating and/or otherwise requiring merchants to provide transaction details to the marketing program. For example, the provision of full and complete transaction details to the marketing program may be written as an obligation in any contract whereby the merchant becomes a participant of the marketing program. The administrator may check whether a merchant is meeting this obligation, for example by checking incentives against the transactions, or by any other checking means. A skilled reader will recognize that other means of requiring merchants to provide transaction details may also be applied.

Moreover, a merchant may consider itself to be obligated to provide transaction details due to a recognition that the marketing program is significantly more effective when robust transaction details are provided by all participating merchants, as the transaction details can be utilized to assist merchants to derive information regarding consumer behaviors, and other information. As is described herein, the information of the marketing program may be utilized for a number of purposes, including attracting a larger clientele, creating new incentive programs and other uses. These uses can create significant benefits for merchants, and for this reason, or to meet other obligations or requirements, the merchants may be inclined to assist by providing transaction details to the marketing program.

In one embodiment, a member may decide after accessing information regarding a merchant, a product, or receiving one or more incentives to undertake a transaction. As described in this application, the information may be accessed by way of a member viewing a hyperlocal geo-targeted broadcast containing the merchant's advertisement. Such an ad viewing and a transaction occurring after the ad viewing may be assumed to have occurred as a result of the ad viewing, in accordance with criteria of the marketing system, such as the time-lapse between the ad viewing and the transaction. If the viewing of the merchant's advertisement in a broadcast causes an incentive to be communicated to the member that is redeemable based upon a transaction, the transaction may also be assumed by the marketing system to be based upon the incentive.

In another implementation, a member may not have seen a broadcast that interleaves a hyperlocal geo-targeted advertisement for a merchant, but may be assumed by the marketing system to have engaged in a transaction due to an incentive if: the incentive is advertised in the merchant location (e.g., a balloon is provided as an incentive with every purchase); the member acknowledges in a post-transaction survey that the transaction occurred due to the incentive; the member receives a communication about an incentive through electronic communication directed to a personal information area belonging to a member (e.g., a text, an email); the member attends an event (e.g., a community program event, or other event) where the incentive is communicated and the attendance of the member at the event is made known to the marketing system and this information stored in the data storage area; and/or other communication means that is trackable by the marketing system so that the marketing system can evaluate the time between the communication of the incentive to the member and the transaction. In such cases, the marketing system can provide helpful information to the merchant by taking into account that a broadcast of the merchant's hyperlocal geo-targeted advertisement was not linked to the transaction with the member.

After the transaction is completed the transaction data may be processed. This may involve accruing a donation to a community program, if a donation was incorporated into a merchant incentive generated by the transaction.

In one implementation, a post-transaction survey 75, as seen in FIG. 7, may be generated and disseminated to the member. The member may respond, and in particular may confirm whether the transaction occurred as a result of the member reviewing the merchant information through the marketing program.

At any point it may be possible for participants to request information from the marketing program 76, as a report, result, review, search display, etc. This request for information or other data query may engage the analytic mode in some circumstances. A skilled reader will recognize that the results of the request for information or other data query may be utilized for a variety of purposes, including for example, identifying transactions occurring in a manner that indicates the transaction occurred as a result of the member receiving information regarding the merchant through the marketing program.

Intermediaries may register with the marketing program of the implementations and thereby gain limited access to the program functions and the marketing program data. For example, an intermediary may be a community group interested in limited access for the purpose of looking at the merchant incentives offered pertaining to the community group event. Or the community group may be interested in limited access for the purpose of generating lists of merchants and/or members that may be invited to attend a community program event (such as a fund-raising dinner). The list may include local merchants and/or members, or merchants and/or members who have characteristics in their profile that suggest they may be interested in supporting the community program. As another example, an intermediary may be a marketing associate who is working with one or merchants to create merchant incentives relating to community programs. The marketing associate may be granted limited access to some of the data and a certain activities of the data mining tool, to generate information to aid the marketing associate in creating a feasible merchant incentive relating to a community program. As yet another example, an intermediary may be an organization, such as a company or a financial card provider. The organization's participation in the marketing program as an intermediary may provide a link whereby the organizations its associates direct involvement in the marketing program as merchants and/or members.

After the point of registration additional information pertaining to participants in the marketing program may be gathered through a variety of means. For example, a survey may be provided to a participant and completing the survey may generate data that is transferred and stored in the data storage area. Other means of entering information into the marketing program may also be provided to a participant, such as a web page. Surveys and other data input means may be provided to a participant through a variety of means, for example, such as a mobile device, a web page, or other means.

Possible Data Mining

After registration, a merchant may consider possible incentives to implement at a merchant location and/or online. This decision may involve considerations of relevant community programs, possible incentives, cross-loyalty and/or cross-selling groups.

The marketing program may provide query and/or searching assistance whereby a merchant may use a template search query, and the search query may include drop down menus showing search options, to derive information from the marketing system. The template may be utilized by the data mining tool and/or analytic mode to generate a particular result, such as a report, list, incentive suggestion, community program link suggestion, cross-selling suggestion, cross-loyalty suggestion, or other results. A skilled reader will recognize the variety of results that may be derived from the data and/or information in the data storage area, as well as the variety of search query templates that may be provided to a merchant by the marketing system. The results may be utilized by the merchant to make decisions, such as, for example choosing incentives to implement, choosing to form cross-selling groups, choosing to form cross-loyalty groups, choosing community programs to link with, choosing incentives to be broadcast in a hyperlocal geo-targeted advertisement for viewing by a select group of members who are likely to conduct a transaction due having been made aware of the incentive via the ad, etc.

Information and other data collected by the implementations may be stored in a manner whereby the information is easily mineable by a variety of participants and/or third parties, including local businesses. The data mining tool, and optionally the analytic mode, may be utilized to generate or otherwise derive results that may be utilized by merchants or other business owners to determine indicators of successful incentives and other business generators in a specific geographic area. For example, the results of the implementations may indicate why one merchant location may get more business than another merchant location or other business location, such as the type of incentive offered (e.g., balloons are offered as an incentive at one merchant location and since these appeal to kids the mothers shopping with their kids will frequent that merchant location which is significant because mothers represent the majority of shoppers in that geographical area; or people living in a particular area may be likely to leave on extended vacations to their cottages during the summer months and on weekends during the rest of the year and therefore may be unlikely to visit some types of merchants during these times; etc.). A skilled reader will recognize the many uses that may be made of the information and data collected by the implementations and the fact that such information is generally available for data mining and analytic uses.

In one implementation, the data mining tool may access information and/or data in the data storage area, and may also access information and/or data from other data sources, which may be outside the marketing system, such as data sources (e.g., databases, hard disks, etc.) controlled by intermediaries, other participants, or third parties. Access to these other data sources may be recognized by the template, by the analytic mode, or by other rules utilized by the marketing system.

A merchant may utilize the data mining tool to identify community programs occurring or to occur in the future, in the vicinity of one or more merchant store locations. The merchant may then devise and develop a merchant incentive for the one or more stores that are local to the community program, the merchant incentive being created to specifically relate to the community program. For example, the relation between the community program and the merchant incentive may function so that upon a transaction between a merchant and a member, a donation may be made to the community program. The transaction between a merchant and a member may be the point at which a merchant incentive is honored, which may involve providing a tangible benefit to a member (such as a prize, sweepstakes entry, or a discount), transferring a benefit to a community program (such as a donation), or another activity. The transaction information may be transferred by the merchant, for example, such as by the merchant's POS terminal, to the marketing program, and a transaction linking utility may be utilized to confirm that the merchant and member are participants of the marketing program, and that the member qualifies for one or more merchant incentives. A skilled reader will recognize that the merchant incentive may be of various types, a coupon, a discount, entry in a sweepstakes, a prize, a donation to a community program, and that a variety of other merchant incentives are possible.

The merchant incentive may be tailored to reflect the specific relationship between a community program and a merchant, aspects of either the merchant or the community program, demographics of local members, etc. Information generated by the data mining tool may assist with the tailoring of a merchant incentive.

A variety of links may exist between participants of the marketing program and these links may be recognized in the data storage area. The links may also develop relationships between participants. Additionally, the links and/or relationships may guide and direct the experience of participants of the marketing program. Links may further be created whereby a merchant may be linked to the marketing program brand. Another possibility is that links are created between the merchant program and social media (e.g., Facebook, Twitter, etc.), whereby social media may be utilized to promote merchants, merchant incentives, community programs and/or the marketing program.

In one implementation, to allow participants to access information regarding the marketing program, the marketing program functions, and to generate queries and/or requests for information, the marketing program may be presented as a website, having a main page and several pages attached thereto. The pages may reflect particular functions of the program, such as reward look-ups, maps of merchants and/or community programs, calendar pages showing community events and/or merchant incentives, links to merchants and/or community programs, access to merchant incentives available to a member, etc. The web pages may facilitate presentations viewable by participants and/or non-participants of the marketing program.

In one implementation, certain triggers may be set to initiate particular activities of the marketing program. For example, triggered activities may include: data mining in accordance with set rules; sweepstakes processing; donation distribution to community programs or other intermediaries (e.g., such as charities); post-sale feedback; and enhanced analytic mode of the data mining tool. Additionally, particular reports may be produced at regular, specified intervals. Any activity of the marketing program may be initiated upon request, whether a trigger or a specified interval is set for that activity or not.

Figure 9:
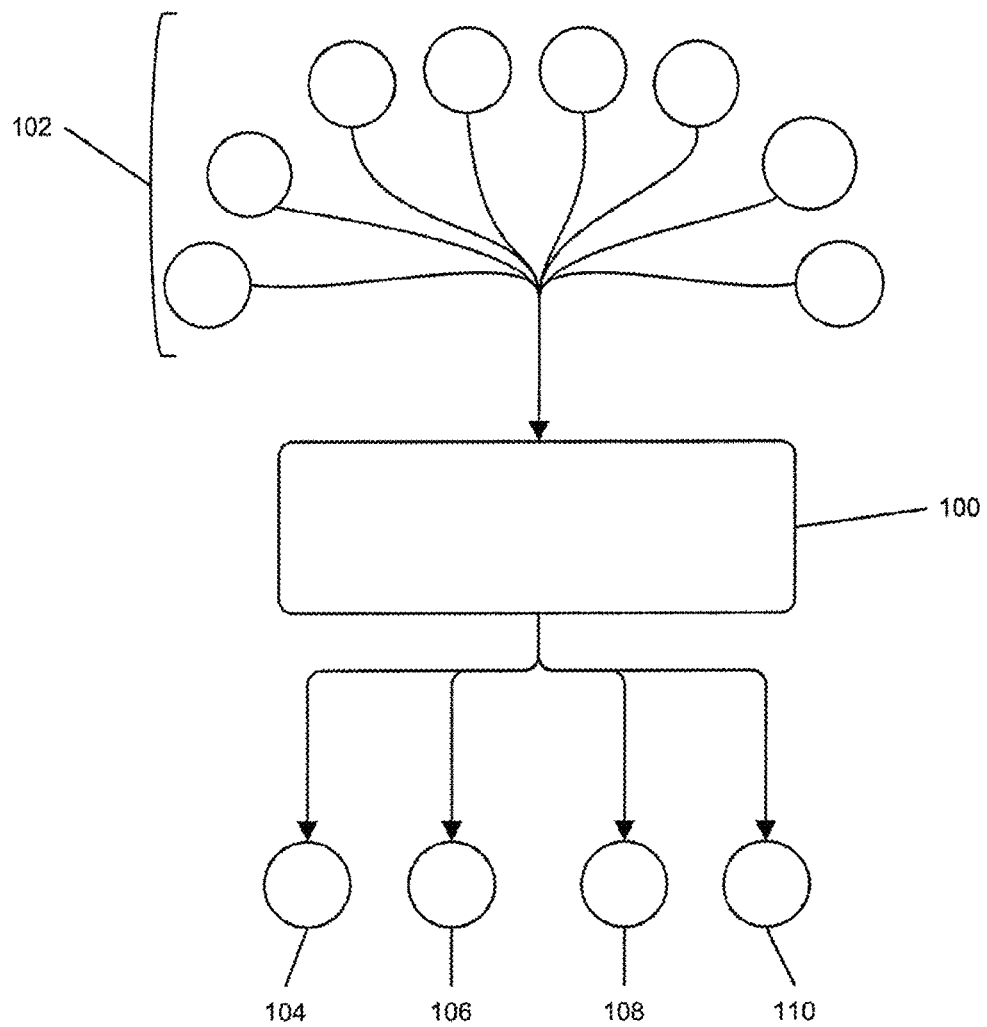
FIG. 9 is a system diagram showing the marketing system outputs that may be generated by the data mining tool, and sometimes the analytic mode, in various implementations.

As shown in FIG. 9, in one implementation, a variety of inputs and outputs may be provided to and generated by the data mining tool. The inputs and outputs may also be affected by whether the data mining tool engages the analytic mode. For example, the data mining tool, and possibly the analytic mode, may access data or other information that is either stored in the data storage area of the marketing system 100, or may access information from other data sources 102, such as remote databases of intermediaries, merchants or other third parties that the marketing system is permitted to access. The data mining tool, and possibly the analytic mode as well, both of which are elements of the marketing system, may be operable to provide an output 104 that provides suggestions of incentives to a merchant, or group of merchants. The data mining tool, and possibly the analytic mode as well, may also provide other types of reports 106 or other documents as an output. The data mining tool, and possibly the analytic mode as well, may further be operable to generate one or more survey questions 108 as an output to be directed to members. Such survey questions may be dynamic questions. For example, a dynamic question could include the following or any other question: a question asking a member if the member had viewed a broadcast containing the merchant's advertisement prior to a transaction influenced the transaction if the marketing system identifies a suspected correlation between the viewing and a transaction; or a questions that are different depending on whether the transaction occurred on a weekend or a weekday.

A skilled reader will recognize that other results 110 may be generated by the data mining tool, and that these other results may be any of a wide-variety of results.

The data mining tool may access and utilize a variety of information in the course of it processing, such as any of the following, or any combinations of the following: transaction details; member demographics; member broadcast ad viewing activities that are linked to the marketing system or that are not linked to the marketing system, but that provide data to the marketing system; post-transaction survey responses; responses from any other survey provided by the marketing system, for example, such as market research surveys, etc.; merchant details, including any merchant preferences, merchant store geographical locations, merchant capacity, merchant inventory, merchant target markets, or any other merchant information; seasonal behaviors of any participants of the marketing program, or any other users that data is collected for and transferred to the marketing system; weather trends of forecast information provided to, or accessed by, the marketing system; and any other information or data. A skilled reader will recognize that a variety of other data or information may also be available from the marketing system data storage area and may be utilized by the data mining tool, and in some instances by the analytic mode as well.

The information and data may be processed by the marketing system, and in particular by the transaction linking utility, the data mining tool, and in some instances by the analytic mode as well, to provide specific outputs. For example, the outputs may be any of the following: feedback regarding any success and/or failures of incentives associated with a merchant; feedback regarding any success and/or failures of incentives associated with similar merchants in non-competing geographical areas, if sufficient information regarding similar merchants is provided to, or accessed by, the marketing system; comparisons of incentives associated with a merchant and incentives associated with similar merchants in non-competing geographical areas, if sufficient information regarding similar merchants is provided to, or accessed by, the marketing system; feedback regarding success rates and trends from associated platforms, such as broadcast advertisers, traditional media (e.g., print, radio, etc.), if sufficient information regarding such associated platforms are provided to, or accessed by, the marketing system; and feedback regarding consumer behavior or members or users. A skilled reader will recognize that a data or information may also be provided to, or accessed by, the marketing system and utilized by the transaction linking utility, the data mining tool, and in some cases the analytic mode as well, to provide a variety of other outputs as well.

Analysis of data to predict behavioral data relating to members or users may be a particular output of implementations. The behavioral data may indicate consumer behavior of members or merchants specifically. Such behavioral data may be derived through a variety of analysis means undertaken by the transaction linking utility, the data mining too and in some cases the analytic mode. The analysis behavioral data output may be utilized in conjunction with specific rules to formulate determinations for a variety of purposes by the marketing program and the participants. For example, the behavioral data may be applied to rules or formula, such as rules based on a determinant outcome, for example, rules having the following structure: if x then y. For example, if a consumer exhibits x behavior then y is the outcome. As a further example, one rule may be that if a member or user views a broadcast of a hyperlocal geo-targeted merchant advertisement on a mobile communication device then that member or user is exhibiting interest in a transaction in the near future. Therefore, the time lapse between the viewing of the merchant's advertisement and the transaction with the merchant may be expected to be a shorter time period than is expected between other broadcast ad viewings and transactions to indicate a likely relationship between the transaction and the viewing of the merchant's advertisement. The basis for this rule may be that the viewing of a merchant's advertisement on a mobile device may be more likely to occur while a member or user is already shopping.

This is an example of one rule that may be used to evaluate or analyze behavioral data. Rules may be further narrowed to factor in certain demographics or attributes of members, such as age groups, genders, parenting responsibilities, etc. which may affect transactions undertaken by members. A skilled reader will recognize that a variety of other rules and factors within rules may be utilized for other evaluations and analysis of behavioral data. A skilled reader will also recognize that extraction of behavioral data, and the analysis and evaluation of such data may expand the member demographic and attribute data of the implementations. This expanded data may be used for many purposes, including generating specific incentives to increase purchases made at merchant stores (either online or bricks and mortar stores) and the good will ascribed to merchants.

A skilled reader will recognize that a variety of reports or other documents may be generated by the data mining tool and in some instances the analytic mode as well. For example, such as incentives statistics or incentive trends, to provide details of incentives communicated, incentives redeemed, incentive effectiveness on a cost/return basis, and incentive effectiveness on a traction basis. As another example, success of associated platforms that may include broadcast advertisers, traditional media (e.g., print or radio) may be provided if information or data regarding associated platforms is provided to, or accessed by, the marketing system. Still another example is output that provides analysis and behavioral data relating to consumer activities of members or users. As yet another example, survey statistics, trends and conclusions may be generated, so that the marketing system may provide comprehensive reporting of survey data acquired and any correlations that can be made from external factors provided to, or accessed by, the marketing program. Such a correlation may be for example, that a golf course has fewer transactions on cold days. The marketing system may be operable to generate suggestions of activities that may address the correlations, generally in the form of incentive suggestions. For example, the marketing system may suggest that an incentive be offered on golfing costs when the weather is below seasonal averages. A skilled reader will recognize that a variety of reports containing a variety of information, correlations and suggestions may be generated by the implementations.

Figure 10:
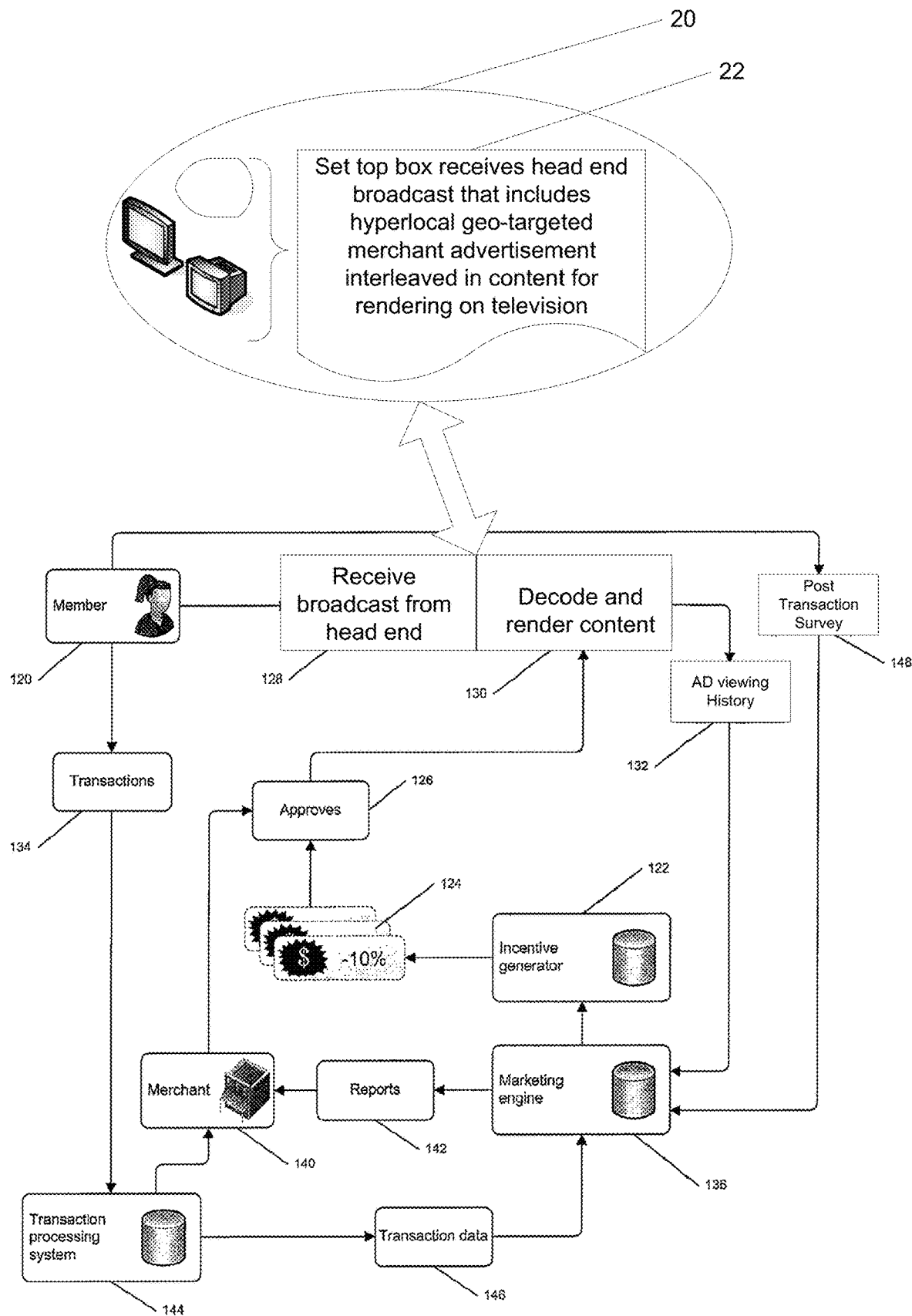
FIG. 10 is a flowchart showing the options for member interaction with the marketing program in one implementation.

As shown in FIG. 10, in one implementation, a television viewer 120, such as a member, receives at processes 128-130 a broadcast for display on a television 20. The broadcast includes a hyperlocal geo-targeted advertisement 22 that is rendered only to televisions located in a particular vicinity, where the advertisement is for a merchant who is located in the particular vicinity. In one implementation an advertising cost is assessed by the broadcaster, such as a local TV station, to the merchant in the particular vicinity. In an alternative version of this implementation, the advertising cost that is assessed to the merchant by the broadcaster (e.g., a local affiliate of a national broadcasting system) is inversely proportional to the navigation time from the location of the receiving television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store in located in a vicinity where the television viewer 120 is also located. The advertisement may include an incentive from the merchant. For example, the incentive may be a discount on the price of a bike and/or an agreement that the merchant will donate a certain percentage of the currency transaction amount to a charity in the vicinity if the television viewer 120 purchases a bicycle in a transaction at the merchant bicycle store 140. The television viewer 130 may accept the merchant's offer of the incentive by going to the merchant's bike store 140. The television viewer 130 may utilize the incentive and redeem it for a discount on a bike by conducting the transaction at the merchant's bike store, and/or for the merchant's agreement to make donation to the charity in the vicinity by conducting the transaction at the merchant's bike store. The television viewer 120's advertisement viewing history 132 may be provided to, or accessed by, the marketing system 136. The marketing system may use the television viewer 120's advertisement viewing history 132, in conjunction with other information to generate one or more reports 142 which may be provided to one or more merchants 140. The television viewer 120's advertisement viewing history 132 may also be utilized with other information to generate incentive suggestions 122, which may lead to the generation of a merchant incentive 124, such as a discount, that may be approved 126 by a merchant. The TV advertisement may include information that can be used by the member to obtain an approved incentive.

A member 120 may further engage in one or more transactions 134 with a merchant. Details of each transaction may be provided to a transaction processing system 144, such as the merchant's 140 POS terminal, or any other means. The transaction details may be provided by the transaction processing system to the merchant 140. The transaction processing system may generate transaction data record 146, which may be provided to the marketing system and utilized by the transaction linking facility in particular.

A member 120, may also complete a post-transaction survey 148. The survey itself, or the survey data may be provided to the marketing system. All of the data provided to the marketing system, including the survey details, the transaction details, and details about merchant's 140 advertisements that were viewed by members in broadcasts, may be utilized by the marketing system to generate reports, or other information, or certain activities, such as sales reports, suggestions for incentives, or incentive generation activities, as just a few examples of possible outputs of the marketing system.

Some implementations may be operable to generate incentives on an automatic basis. The marketing system may utilize information and data stored in the data storage area to perform particular analysis, including analysis of the effectiveness of prior incentives, as well as market trends, such as periods when sales are higher or lower. The marketing system may utilize the analysis results and other data to generate one or more new incentives. These incentives may be automatically generated and may be communicated by the marketing system pending merchant approval. Merchant approval may be manual or automatic approval. Upon approval the incentive may be auto-loaded to various media including any of the following: search engines, newspapers, brochures, flyers, specialty advertising (e.g., Val Pak™, etc.) or any other media.

A variety of information or data may be utilized by the marketing system to automatically generate one or more incentives. For example, any of the following data or information may be utilized: merchant type (e.g. merchant category, services and/or products provided, service vs. product based merchant, etc.); location of merchant stores and geographical location; history of a merchant's experience with past and present incentives (customer acceptance, feedback about the incentives, contribution margin, etc.), for example incentives that generate the most interest, as indicated by the incentives being rated highest by users and members in post-transaction surveys, or as indicated by a comparison of incremental sales data following the incentive being posted; successful incentives in areas that are non-competing geographical areas; indications of identified member's interest in an incentive; and member demographics tied to transaction history and trends.

Automated incentive generation may be based on a variety of criteria, for example it may be based on specific customer segments. Such customer segments may include as an example: targeted local neighborhoods; customer demographics (e.g., gender, age, etc.); financial card Bank Identification Number (BIN) range, as this may determine if the card is a regular card, gold card, platinum card, etc., and the type of card may provide details regarding the card holder and the likely transactions to be conducted by the card holder; buying history of users, members, or other customers; the TV viewing behavior of particular users, such as frequent exposures to broadcasts containing advertisement for a particular merchant undertaken by a user or a member.

The incentives that are automatically generated may be related to several elements and/or factors. As an example, automatically generated incentives may be related to any of the following: a season; one or more days of the week, or of the month; special events, including holiday seasons (e.g., the Christmas season, etc.) and celebrations (e.g., parades, a community event such a run for a cause, etc.); or local events (e.g., little league finals, town street festivals, etc.). The success or effectiveness of an incentive may be determined based on any of the following: the statistics regarding whether an incentive is redeemed; post transaction feedback regarding the incentive, such as feedback derived from a post-transaction survey; and increased sales from a group of consumers targeted by an incentive, or during a period of time that is targeted by an incentive.

Transactions

Transactions between merchants and members may occur online or offline. A transaction will be recognized as occurring between a merchant and a member because the member will utilize at least one of the identifications recognized as belonging to the member by the marketing program. The merchant may also utilize at least one of the participant identifiers recognized as belonging to the merchant by the marketing program.

As an example of an online transaction, such a transaction may occur in a website environment, whereby a member purchases an item or service from a merchant through a series of clicks, or other online means of purchasing an item or service. The website will transfer the transaction information to the marketing program. In some instances the information may be transferred to the marketing program by a third party. The marketing program will recognize the transaction as occurring between a member and a merchant due to the use of the participant identifiers.

As an example of an offline transaction, a member may visit a merchant's store location and may undertake a transaction to purchase an item or service from the merchant. The transaction may involve a POS terminal that will transfer information regarding the transaction, including the participant identifiers to the marketing program. A transaction that does not involve a POS terminal may be recorded by another means and the transaction details, including the participant identifiers, may be transferred or manually entered into the marketing program. The transaction details may be transferred to the marketing system by a third party in some instances.

Depending upon the form of transaction, the transaction may be recognized by the marketing program in real-time, near-real time or after a time lapse. Transaction details may be matched to a member profile by the data mining tool or other element of the loyalty engine, and the transaction details may be stored to the member profile in the data storage area.

Following a transaction, a post-transaction survey may be communicated to a member. In one implementation, the post-transaction survey may be communicated to a member who in turn completes the survey and returns the completed survey using broadcast-like services that provide of a feedback channel. By way of example of the feedback channel, a supplemental return channel that facilitates paging is provided by implementations of the Next Generation Broadcast Platform (NGBP) Intelligent Heterogeneous network as illustrated in FIGS. 12-14. As such the customer-completed survey can be received as input from the customer via a user device in network communication with the NGBP Intelligent Heterogeneous network. The content of the completed survey is from the customer who responded to an incentive from a merchant that was contained in a geo-targeted advertisement by the merchant. In this case, the merchant's advertisement was broadcast over a television broadcast network that has been enabled for hyperlocal geo-targeting of the merchant's advertisements to viewers located in a vicinity by operating a broadcast method that has an extensible mode of communication in an intelligent heterogeneous network. The feedback channel is thus used to track delivery of the broadcast hyperlocal geo-targeted advertisements as well as to receive the completed survey from the member who was a selected broadcast media consumer residing or otherwise located in a specific vicinity (e.g., within 1 to 100 km) after having transacted with a merchant after viewing the merchant's hyperlocal geo-targeted advertisement.

In other implementations, the post-transaction survey may be communicated to a member, for example, via a web page, via email, via a mobile device, etc. The post-transaction survey may gather feedback from the member. In some implementations the post-transaction survey may be anonymous, and the information collected from the survey may be stored in a manner linked to the merchant in the data storage area. This data may be utilized by the data mining tool and the analytics mode. Post-transaction survey results may be generated by the data mining tool and may be provided to participants of the marketing program.

A merchant may utilize information generated by the data mining tool and possibly the transaction linking utility, both of which utilize the data stored in the data storage area, to devise, define and develop a merchant incentive. In one implementation, an intermediary, such as a marketing associate, may be involved in developing or communicating a merchant incentive. Either or both of the merchant and the intermediary may access information generated by the data mining tool for the purpose of creating the marketing incentive, or analyzing the effectiveness of a marketing incentive once it is completed. A group of merchant incentives may further be analyzed for the purpose of creating more effective merchant incentives in the future.

Information may be collected pertaining to participants in the marketing program upon the event of transactions between a merchant and a member. Such information may be transaction details, and may further include details regarding any related merchant incentive. As described above a merchant incentive may be related to a community program and therefore may be available at one or more merchant stores that are within the vicinity of the community program. (The vicinity may be of various sizes, a community park area, a neighborhood, a city, a county, a province or state, a country, etc.) The merchant incentive, or information about the merchant incentive, may be communicated to a member, or a group of identified members, in a variety of means, including via a web page, via a mobile device, via an email or text, etc. A merchant incentive, or information about the merchant incentive, may include a Merchant Advertisement Matrix Code and may be communicated to a mixture of members and third parties by a variety of means, including broadcast of a merchant's incentive in a hyperlocal geo-targeted advertisement for rending on a member's television, print media, radio broadcasts, web pages, billboards, emails, text, mobile devices, etc.

The communication of the merchant incentive to third parties may introduce the third parties to the one or more merchant stores, the community program that the merchant incentive pertains to and/or the marketing program. In one implementation, transactions between third parties and merchants during a merchant incentive or a community program may be tracked and data regarding such transactions may be stored in the data storage area. the data may be utilized by the data mining tool and the analytics mode to produce analysis of the transactions to aid in the participation of the merchant in the marketing program, for example, such as to create new effective merchant incentives.

In one implementation, transactions may include transactions that do not occur at a physical (bricks and mortar) store location, but may include transactions occurring in a digital environment, such as via a website.

Example Method

A skilled reader will recognize that the marketing system and method of the implementations may function in a variety of ways. As an example of one implementation, a system administrator may cause a local community program to be stored in the marketing system, for example, such as Caribana, a festival celebrating Caribbean culture held in cities such as Toronto, Canada. One or more merchants registered with the marketing program may recognize that one or more Caribana events will occur near a store location. The one or more merchants may develop one or more merchant incentives related to Caribana. The one or more merchant incentives related to Caribana may be communicated to participants, for example, to members that are located near to one or more Caribana events, or to members that are located near to the one or more merchants offering Caribana related incentives. The one or more merchant incentives may also be communicated to third parties, and information regarding the marketing system may also be communicated to third parties so that third parties can know how to become a participant of the marketing system.

Transaction details regarding transactions with the one or more merchants whereby the one or more merchant incentives are redeemed may be transferred to the marketing system and stored in the marketing system. A skilled reader will recognize that the means of transferring transaction details to the marketing system may be varied and that the options may differ for online and offline transactions. Some of the possible means of transferring transaction details for online and offline transactions are discussed above, although a skilled reader will recognize that the discussion does not provide a complete list of all of the possible transfer options it merely provides some examples of transfer options.

A post-transaction survey may also be provided to participants and/or third parties redeeming merchant incentives to gather information relevant to the transaction and the participants and/or third parties undertaking the transaction.

The transactions may involve registered members of the marketing program. A member may be identified as a member during the transaction by using one or more participant identifiers and/or other identifications recognized by the marketing program as associated with the member. For example, the member may use a participant identifier or other identification that is a financial card, a number generated by the marketing system, or any other identification.

The data mining tool, and in some instances the analytic mode, may be utilized to search the transaction details and other marketing system data to provide results. The results may indicate success measurements for promotions and the results may also indicate information that may be applied to the creation of other incentives in the future. For example, the results may indicate demographic information regarding the persons redeeming incentives, including participants and third parties. In the case of an incentive created by a merchant in relation to a Caribana event, the results may indicate that participants and/or third parties wanting to redeem an incentive may not be local to the merchant location, but may have travelled from a specific area, for example, such as a specific town in the province, or a specific neighborhood in the city that is distant from the merchant location. In this manner the implementations may be utilized to draw assumptions regarding the relationships between transactions at a merchant location and a particular incentive offered at that merchant location. A skilled reader will recognize the variety of results that may be provided by the implementations and the ways that such results may be utilized by participants and/or third parties.

The data mining tool, and in some instances the analytic mode and/or the transaction linking utility, may also recognize that the activities of a participant may cause that participant to be eligible for specific incentives. For example, the frequency of transactions with a merchant, the time of day of a transaction with a merchant, the creation of a review, or other activities may cause a participant to be eligible for an incentive. The data mining tool may automatically apply the incentive, such as a donation to a community group, may automatically communicate the incentive to the participant, such as a coupon for a future purchase, or may apply or communicate the incentive based upon instructions by the administrator or merchant.

Cross-Sell

In another implementation, cross-selling relationships and programs may be created. A cross-sell involves at least two merchants, or at least two merchant stores, that are generally non-competing. A cross-sell occurs when a member completes transactions at each of the two (or more) merchants involved in a cross-sell relationship. A cross-sell may be required to include the transactions with the merchants involved in a cross-sell relationship occurring within a specified period of time. Events of cross-selling may be validated by a query sent to the transaction linking utility in accordance with particular rules that cause the transaction linking utility to identify valid cross-sells by members. For example, a transaction with one of two cross-sell merchants followed within the specified period of time with a transaction with the other cross-sell merchant may be recognized as a cross-sell.

As yet another example, a cross-sell may be refined based on the terms of the cross-sell incentive. Such terms may include specific times, specific day(s) of the week, minimum purchase restrictions, or other terms. So that if a transaction occurred at each of two cross-sell merchants and the transactions meet specific terms, for example, such as occurring on a Tuesday between 5:00 PM and 8:00 PM, then this may be recognized as a cross-sell. A skilled reader will recognize that other criteria may be utilized to define cross-sells.

Upon the completion of, or recognition of, a cross-sell a reward may be generated and communicated or distributed to the member. In one implementation, a member may be required to login to the marketing program to accept or otherwise obtain the reward. Specific steps may be required to accept the reward, or alternatively the reward may be transferred to the member's profile and be visible when the member accesses his or her profile information. Other means of accepting or obtaining the reward may be utilized with the implementations as well. The reward, which may include a Merchant Advertisement Matrix Code, may be of a variety of types, such as a coupon, bonus offer, prize, sweepstakes entry, etc. A reward may therefore be redeemed in accordance with the nature of the reward.

A cross-sell relationship could be created amongst merchants, or merchant stores for a variety of reasons. For example, a merchant that includes two or more stores could create a cross-sell relationship whereby a member would have to visit all the merchant stores before receiving a prize (e.g., such as a treasure hunt). As another example, a merchant having a single store may provide a reward after multiple visits (e.g. after nine transactions, a fifty percent (50%) discount will be applied to the next transaction).

As yet another example, a group of merchants could unite to provide a benefit to members that undertake transactions at all, or some, of the associated merchants. It may be possible for the benefit to increase as the member undertakes transactions with an increasing number of merchants. It may be possible the marketing program may define the group of merchants, for example, such as a group that includes merchants from the same category (e.g., sports stores) or from complimentary categories (e.g., clothing stores and shoe stores). It may be possible for the reward to involve a merchant outside the group of cross-sell merchants (e.g., transactions with a cross-sell group of three golf course merchants will generate a reward for a member that is a coupon for a free dinner at a restaurant merchant).

In one implementation chain cross-selling may occur between three or more merchants. Chain cross-selling may involve three or more merchants, generally non-competing merchants, deciding to create a chain cross-sell group. The chain cross-sell group may involve three or more merchants with related products and/or services that may offer incentives based upon a member frequenting three or more of the chain cross-sell group. A member in a chain cross-sell group may be outside of the marketing system. In a chain cross-sell group it may be possible for the incentive offered to a member or other participant to increase as more of the cross-sell group products and/or services are purchased. The member, or other participant, may be recognized by the provision of an identification that is stored in the marketing system, whereby the member is identified as a member of the marketing system, such as a participant identifier.

For example, a cross-sell group may include a hotel, golf course, restaurant, sports store and hiking guide in a particular location, such as Banff, Alberta, during a particular event, such as the summer golf months. A member, or other participant, who stays in the hotel and plays golf at the golf course in the cross-sell group may receive a ten percent (10%) discount or other incentive. Whereas, if a member books a hotel room, a round of golf and dinner at the restaurant that are part of the cross-sell group a twenty percent (20%) discount may be applied. And as the member purchases products and/or services from even more of the cross-sell group the incentives continue to increase. A member staying at the hotel, who golfed at the golf course and ate dinner at the restaurant, and who also purchases a product at the sports store may receive forty percent (40%) off the product purchased at the sports store. Should that member also book a hike with the hiking guide of the cross-sell group then the hike may be provided at a fifty percent (50%) discount and a donation may be given to the Banff National Park, or another community group. A skilled reader will recognize that a variety of cross-sell groups may be formed and that a variety of incentive options may be provided based upon the cross-sell groups.

Cross-selling incentives may be evaluated to determine the success of the cross-sell incentives. it may be possible for the cross-sell incentives to be evaluated as individual incentives, and as a group of cross-sell incentives. In this manner the marketing system may evaluate whether a particular incentive was successful on its own, and whether a group of incentives were popular. In this manner it may be possible to identify where cross-selling led to transactions frequently, including transactions that may not have otherwise occurred without the cross-sell incentive being offered. For example, did the offer of a hiking guide lead to more use of this service by members staying at a hotel, eating at restaurant and golfing at a golf club that are part of a cross-sell group than would have occurred if the hiking guide was not included in the cross-sell. A skilled reader will recognize the variety of evaluations that may be undertaken of the individual and collective incentives involved in a cross-sell.

Figure 11:
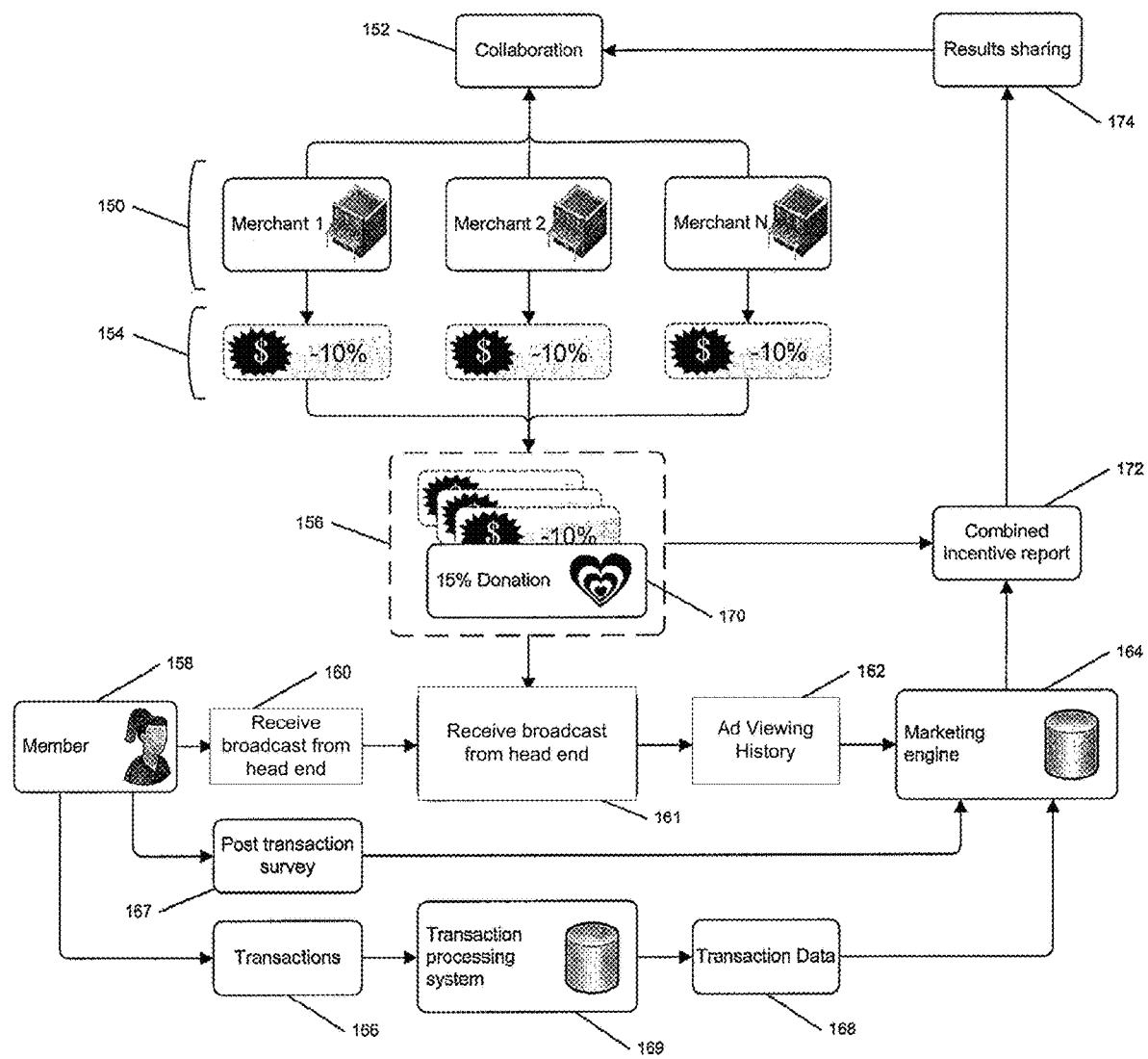
FIG. 11 is a flowchart showing the options for an implementation involving cross-selling.

In one implementation, as shown in FIG. 11, two or more merchants 150 may collaborate to produce one or more cross-sell collaborations 152. The collaboration may involve one or more incentives 154 provided by each merchant. The incentives of each merchant may be combined into a linked incentive 156. The linked incentive may include a further incentive 170, that is honored when transactions with each of the collaborator merchants are undertaken by a single member.

A member 158 may be a television viewer who receives at processes 160-161 a broadcast for display on a television. The broadcast includes a hyperlocal geo-targeted ad that is rendered only to televisions located in a particular vicinity, where the advertisement is for a merchant who is located in the particular vicinity. In an alternative of this implementation, an advertising cost is assessed by the broadcaster, such as a local TV station, to the merchant in the particular vicinity. The advertising cost is inversely proportional to the navigation time from the location of the television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store in located in a vicinity where the television viewer 158 is also located. The advertisement may include an incentive from the merchant. For example, the incentive may be a discount on the price of a bike and/or an agreement that the merchant will donation a certain percentage of the currency transaction amount to a charity in the vicinity if the television viewer 158 purchases a bicycle in a transaction at the merchant bicycle store.

The television viewer 158 who saw the merchant's advertisement on their television may undertake a transaction 166 with the merchant. The television viewer 158 may utilize the incentive and redeem it for a discount on a bike by conducting the transaction at the merchant's bike store, and/or for the merchant's agreement to make donation to the charity in the vicinity by conducting the transaction at the merchant's bike store. The television viewer 158 ad viewing history 162 may be provided to the marketing system 164.

Transaction details 168 for each of the transactions may be transferred a transaction processing system 169 that may generate transaction data 168, and the transaction data may be transferred to the marketing system 164. The marketing system may process the transaction details and any post-transaction survey 167 results provided by the member. The marketing system may generate a combined incentive report 172. For example, the generation of the combined incentive report may occur when a merchant undertakes transactions with all of the collaborative members and triggers the additional incentive, or at any other time. Results for sharing 174 may be generated from the combined incentive report so that results of each of the incentives in the linked incentive are shared with all collaborative merchants, so that each merchant receives results relating to its particular incentive and the additional incentive, results may be produced to share some of the results of two or more collaborative members, or results may be produced in any other configuration. Results may be compared to the collaboration, so that conditions of the collaboration, such as the additional incentive, may be evaluated. In particular the comparison may consider whether the conditions were fulfilled. In some implementations the marketing program may auto-generate suggestions for cross-sell incentives or auto-generate cross-sell incentives for approval by collaborating merchants.

Cross-Loyalty

The marketing program of the implementations may further involve cross-loyalty programs or cross-marketing programs. Such cross-marketing program may function in a manner as described in U.S. patent application Ser. No. 11/283,856, titled "Method, system and computer program for providing a loyalty engine enabling dynamic administration of loyalty programs," which is incorporated herein by reference. The cross-marketing programs of the implementations may further involve a variety of merchants and intermediaries, such as community programs. In this implementation the community program may work with the merchant to develop a cross-loyalty program. To aid a merchant in creating cross-loyalty and/or cross-sell relationships, the data mining tool may be utilized by the merchant to access information regarding other merchants and/or intermediaries (or groups of merchants and/or intermediaries) that are participants in the marketing program.

Any of the various implementations described herein may be realized in any of several various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some implementations, a non-transitory computer-readable memory medium may be configured so that it stores program instructions and/or data, where the program instructions, if executed by a computer system, cause the computer system to perform a method, e.g., any of the method embodiments described herein, or any combination of the method embodiments described herein, or, any subset of any of the method embodiments described herein, or, any combination of such subsets.

In some implementations, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or any combination of such subsets). The computer system may be realized in any of several various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept. Accordingly, it will be appreciated by those skilled in the art that other variations of the implementations described herein may also be practiced without departing from the scope of the invention. Other modifications are therefore possible.

What is claimed is:

1. A method comprising, for each of a plurality of members, operating an extensible mode of communication in an intelligent heterogeneous network by:
   gathering member data for the member over the intelligent heterogeneous network to enable personalized services for the member, based on geographical awareness, through paging based on the gathered member data, wherein the member user data for the member includes a physical address corresponding to a television receiver and a member profile that includes a participant identifier;
   providing a hyper local service for the member based on the geographical awareness via functionality enabled by the intelligent heterogeneous network;
   broadcasting, over the intelligent heterogeneous network, content interleaved with an advertisement corresponding to a merchant having a physical address, wherein:
      the advertisement interleaved within the broadcast content is addressed for broadcast delivery exclusively to a logical address of the television receiver;
      the merchant has a corresponding merchant profile that includes a physical address;
      and
      the respective physical addresses of the merchant and the television receiver are determined to be within the same vicinity as the merchant;
   receiving or accessing data associated with a transaction;
   determining the participant identifier of the member from the data associated with the transaction;
   determining a length of elapsed time between:
      the time of the transaction; and
      the time of the broadcast of the advertisement interleaved within the broadcast content;
   if the respective physical addresses of the merchant and the television receiver are in the same vicinity,
   then determining with a level of certainty whether the transaction is linked to the broadcast of the advertisement within interleaved the broadcast content, wherein the determined level of certainty varies based on:
      the length of the elapsed time;
      the data related to the broadcast of the advertisement interleaved within broadcast content and
      the data associated with the transaction;
   and
   based on the determined level of certainty and the data related to the broadcast of the advertisement interleaved within the broadcast content, generating an incentive for the member from the data associated with the transaction to conduct a future said transaction with the merchant, wherein:
      the incentive is a donation by the merchant to a predetermined charity designed by the member; and
      the donation is a percentage of the amount of the future said transaction.

2. The method as defined in claim 1, wherein the merchant and television receiver corresponding to the participant identifier of the member are determined to be within the same vicinity whenever their respective physical addresses are within the same geographic entity selected from the group consisting of a political division, a legal division, a province, a state, a county, a prefecture, a city, a city-state, and a borough.

3. The method as defined in claim 1, wherein:
   the merchant and television receiver corresponding to the participant identifier of the member are determined to be within the same vicinity whenever their respective physical addresses have a navigation time therebetween, as determined by a navigation algorithm, that is, for at least one predetermined transportation mode, within a predetermined minimum time and a predetermined maximum time; and
   the navigation time is determined by the navigation algorithm from the physical address of television receiver corresponding to the participant identifier of the member to the physical address of the merchant.

4. The method as defined in claim 1, wherein the broadcast content is interleaved with the advertisement corresponding to the merchant and addressed for broadcast delivery exclusively to the logical address of the television receiver determined to be within the same vicinity as the merchant by:
   operating an extensible mode of communication in an intelligent heterogeneous network to broadcast content to a plurality of said television receivers each corresponding to a physical address and one said participant identifier of one said member, by:
      using an extensibility tool to provide an extensible framing structure;

combining a centralized radio access network topology with an intelligent IP core network to enable sharing of spectrum resources;

providing a supplemental return channel to facilitate paging; and gathering user data, including the physical address of each said television receiver, at the intelligent IP core network and enabling personalized services through paging based on the gathered user data, wherein the personalized services are further enabled based on geographical awareness or geographical location; and interleaving the broadcast content with one said advertisement corresponding to one aid merchant having a physical address by:

providing a hyperlocal service based on geographical awareness of the physical address of the television receivers via functionality enabled by the intelligent heterogeneous network; and addressing the broadcast content interleaved with the advertisement for broadcast delivery exclusively to one or more logical addresses each corresponding to one said television receiver whenever the one said television receiver is determined to be within the same vicinity as the merchant.

5. The methods as defined in claim 1, wherein the television receiver is a web-enabled mobile computing device executing a mobile application to access the advertisement interleaved within the broadcast content through internet-based services.

6. The methods as defined in claim 5, wherein the television receiver is selected from the group consisting of a smart phone, a tablet, a phablet, and a lap top.

7. A non-transient computer-readable medium having encoded thereon software which, when executed by hardware, performs the method of claim 1.

8. A method comprising:

broadcasting content interleaved with an advertisement corresponding to a merchant having a physical address, wherein:

the advertisement interleaved within the broadcast content is addressed for broadcast delivery exclusively to a logical address of a television receiver;

the merchant has a corresponding merchant profile that includes a physical address;

the television receiver corresponds to a physical address and a member having a member profile that includes a participant identifier; and the respective physical addresses of the merchant and the television receiver are determined to be within the same vicinity as the merchant;

the broadcast content is interleaved with the advertisement corresponding to the merchant and addressed for broadcast delivery exclusively to the logical address of the television receiver determined to be within the same vicinity as the merchant by:

operating an extensible mode of communication in an intelligent heterogeneous network to broadcast content to a plurality of said television receivers each corresponding to a physical address and one said participant identifier of one said member, by:

using an extensibility tool to provide an extensible framing structure;

combining a centralized radio access network topology with an intelligent IP core network to enable sharing of spectrum resources;

providing a supplemental return channel to facilitate paging; and gathering user data, including the physical address of each said television receiver, at the intelligent IP core network and enabling personalized services through paging based on the gathered user data, wherein the personalized services are further enabled based on geographical awareness or geographical location; and interleaving the broadcast content with one said advertisement corresponding to one merchant having a physical address by:

providing a hyperlocal service based on geographical awareness of the physical address of the television receivers via functionality enabled by the intelligent heterogeneous network; and addressing the broadcast content interleaved with the advertisement for broadcast delivery exclusively to one or more logical addresses each corresponding to one said television receiver whenever the one said television receiver is determined to be within the same vicinity as the merchant;

receiving or accessing data associated with a transaction;

determining the participant identifier of the member from the data associated with the transaction; determining a length of elapsed time between the time of the transaction and between:

the time of the transaction; and the time of the broadcast of the advertisement interleaved within the broadcast content;

if the respective physical addresses of the merchant and the television receiver are in the same vicinity, then determining with a level of certainty whether the transaction is linked to the broadcast of the advertisement within interleaved the broadcast content, wherein the determined level of certainty varies based on:

the length of the elapsed time;

the data related to the broadcast of the advertisement interleaved within broadcast content; and the data associated with the transaction; and based on the determined level of certainty and the data related to the broadcast of the advertisement interleaved within the broadcast content:

generating an incentive for the member from the data associated with the transaction to conduct a future said transaction with the merchant, wherein:

the incentive is a donation by the merchant to a predetermined charity designed by the member; and the donation is a percentage of the amount of the future said transaction;

generating and communicating a post-transaction survey to the member;

receiving, via the supplemental return channel, a completed survey from the member containing an evaluation of the transaction with the merchant; and using the result of the post-transaction survey to make an adjustment to the determined level of certainty to compute the determined level of certainty.

9. The methods as defined in claim 8, wherein:

the respective physical addresses of the merchant and the television receiver are determined to be within the same vicinity as the merchant by a navigation algorithm, that is, for at least one predetermined transportation mode, within a predetermined minimum time and a predetermined maximum time;

the navigation time is determined by the navigation algorithm from the physical address of television receiver corresponding to the participant identifier of the member to the physical address of the merchant; and the navigation algorithm is a real time algorithm that accesses real time traffic information, for at least the one predetermined transportation node, in determining the navigation time.

10. The methods as defined in claim 9, further comprising generating an assessment of an advertising fee for each said advertisement, wherein the currency amount of the advertisement fee is inversely proportional to the navigation time from the physical address of the television receiver to the physical address of the merchant.

11. The methods as defined in claim 8, wherein the television receiver is a web-enabled mobile computing device executing a mobile application to access the advertisement interleaved within the broadcast content through internet-based services.

12. The methods as defined in claim 11, wherein the television receiver is selected from the group consisting of a smart phone, a tablet, a phablet, and a lap top.

13. The method as defined in claim 8, wherein the merchant and television receiver corresponding to the participant identifier of the member are determined to be within the same vicinity whenever their respective physical addresses are within the same geographic entity selected from the group consisting of a political division, a legal division, a province, a state, a county, a prefecture, a city, a city-state, and a borough.

14. A non-transient computer-readable medium having encoded thereon software which, when executed by hardware, performs the method of claim 8.

15. A method comprising, for each of a plurality of members, operating an extensible mode of communication in an intelligent heterogeneous network by:
    gathering member data for the member over the intelligent heterogeneous network to enable personalized services for the member, based on geographical awareness, through paging based on the gathered member data, wherein the member user data for the member includes a physical address corresponding to a television receiver and a member profile that includes a participant identifier;
    providing a hyper local service for the member based on the geographical awareness via functionality enabled by the intelligent heterogeneous network;
    broadcasting, over the intelligent heterogeneous network, content interleaved with an advertisement corresponding to a merchant having a physical address, wherein:
    the advertisement interleaved within the broadcast content is addressed for broadcast delivery exclusively to a logical address of a television receiver;
    the merchant has a corresponding merchant profile that includes a physical address;
    and
        the respective physical addresses of the merchant and the television receiver are determined to be within the same vicinity as the merchant by a navigation algorithm, that is, for at least one predetermined transportation mode, within a predetermined minimum time and a predetermined maximum time, wherein the navigation time is determined by the navigation algorithm from the physical address of television receiver corresponding to the participant identifier of the member to the physical address of the merchant;

receiving or accessing data associated with a transaction;
    determining the participant identifier of the member from the data associated with the transaction;
    determining a length of elapsed time between:
        the time of the transaction; and
        the time of the broadcast of the advertisement interleaved within the broadcast content;
    and
    triggering, as a result of detecting the occurrence of the transaction associated with the participant identifier, a determination of whether:
        the transaction is linked to the broadcast of the advertisement interleaved within the broadcast content; and
        the respective physical addresses of the merchant and the television receiver are in the same vicinity;
    wherein:
        if the transaction is linked to the broadcast of the advertisement interleaved within the broadcast content;
        and
        if the respective physical addresses of the merchant and the television receiver are in the same vicinity,
        then:
            determining with a level of certainty whether the transaction is linked to the broadcast of the advertisement within interleaved the broadcast content, wherein the determined level of certainty varies based on:
                the length of the elapsed time;
                the data related to the broadcast of the advertisement interleaved within broadcast content; and
                the data associated with the transaction;
            based on the determined level of certainty and the data related to the broadcast of the advertisement interleaved within the broadcast content, generating one or more incentives;
            generating and communicating a post-transaction survey to the member after the detection of the transaction with the merchant;
            receiving, via the supplemental return channel, a completed survey from the member containing an evaluation of the transaction with the merchant; and
            using the result of the post-transaction survey to compute the determined level of certainty.

16. The methods as defined in claim 15, wherein the television receiver is a web-enabled mobile computing device executing a mobile application to access the advertisement interleaved within the broadcast content through internet-based services.

17. The methods as defined in claim 16, wherein the television receiver is selected from the group consisting of a smart phone, a tablet, a phablet, and a lap top.

18. The method as defined in claim 15, wherein the navigation algorithm is a real time algorithm that accesses real time traffic information, for at least the one predetermined transportation node, in determining the navigation time.

19. A non-transient computer-readable medium having encoded thereon software which, when executed by hardware, performs the method of claim 15.

* * * * *